United States Patent
Croxford et al.

(10) Patent No.: US 10,733,789 B2
(45) Date of Patent: Aug. 4, 2020

(54) REDUCED ARTIFACTS IN GRAPHICS PROCESSING SYSTEMS

(71) Applicant: Arm Limited, Cambridge, MA (US)

(72) Inventors: Daren Croxford, Cambridge (GB); Ozgur Ozkurt, Cambridge (GB); Brian Starkey, Cambridge (GB)

(73) Assignee: Arm Limited, Cambridge (GB)

( * ) Notice: Subject to any disclaimer, the term of this patent is extended or adjusted under 35 U.S.C. 154(b) by 120 days.

(21) Appl. No.: 16/012,012

(22) Filed: Jun. 19, 2018

(65) Prior Publication Data

US 2018/0365882 A1 Dec. 20, 2018

(30) Foreign Application Priority Data

Jun. 19, 2017 (GB) .................................. 1709752.8
Oct. 6, 2017 (GB) .................................. 1716377.5

(51) Int. Cl.
*G06T 15/10* (2011.01)
*G06T 7/20* (2017.01)
*G06T 7/70* (2017.01)
*G06T 15/00* (2011.01)

(52) U.S. Cl.
CPC ............. *G06T 15/10* (2013.01); *G06T 7/20* (2013.01); *G06T 7/70* (2017.01); *G06T 15/005* (2013.01)

(58) Field of Classification Search
None
See application file for complete search history.

(56) References Cited

U.S. PATENT DOCUMENTS

| | | |
|---|---|---|
| 2010/0232770 A1 | 9/2010 | Prestenback |
| 2014/0354515 A1* | 12/2014 | LaValle ................ G02B 27/017 345/8 |
| 2017/0018121 A1* | 1/2017 | Lawson ................ G06T 3/0093 |
| 2018/0286105 A1* | 10/2018 | Surti .................... H04N 5/3696 |
| 2019/0033962 A1* | 1/2019 | Yakishyn ................ G06T 7/246 |
| 2019/0188828 A1* | 6/2019 | Aggarwal ............. G06T 3/0087 |
| 2019/0206115 A1* | 7/2019 | Tytgat .................... G06F 3/012 |
| 2019/0261000 A1* | 8/2019 | Oh ........................ H04N 19/146 |

FOREIGN PATENT DOCUMENTS

| | | |
|---|---|---|
| EP | 3051525 | 8/2016 |
| EP | 3065406 | 9/2016 |

OTHER PUBLICATIONS

GB Combined Search and Examination Report dated Nov. 28, 2017, GB Patent Application GB1709752.8.
Michael Antonov, "Asynchronous Timewarp Examined," Mar. 3, 2015, retrieved from the Internet on Oct. 17, 2017: https://developer3.oculus.com/blog/asynchronous-timewarp-examined/.

* cited by examiner

*Primary Examiner* — Jeffrey J Chow
(74) *Attorney, Agent, or Firm* — Vierra Magen Marcus LLP

(57) ABSTRACT

In addition to rendering a first frame representing a first forward view of a scene, a graphics processing system renders one or more further versions of the first frame, each representing a further view of the scene based on a different point in time and/or view orientation. The first frame and/or one or more of the one or more further versions may then be subjected to "timewarp" and/or "spacewarp" processing to generate an output "timewarped" and/or "spacewarped" image for display.

20 Claims, 24 Drawing Sheets

REDUCED ARTIFACTS IN GRAPHICS PROCESSING SYSTEMS

BACKGROUND

The technology described herein relates to graphics processing systems, and in particular to graphics processing systems that provide images for display for virtual reality (VR) and/or augmented reality (AR) (head mounted) display systems.

FIG. 1 shows an exemplary system on chip (SoC) graphics processing system 10 that comprises a host processor comprising a central processing unit (CPU) 1, a graphics processing unit (GPU) 2, a display controller 4, and a memory controller 6. The exemplary graphics processing system 10 may also comprise a video engine 3. As shown in FIG. 1, these units communicate via an interconnect 5 and have access to off-chip memory 7. In this system, the graphics processing unit (GPU) 2 will render frames (images) to be displayed, and the display controller 4 will then provide the frames to a display panel 8 for display.

In use of this system, an application such as a game, executing on the host processor (CPU) 1 will, for example, require the display of frames on the display 8. To do this, the application will submit appropriate commands and data to a driver for the graphics processing unit (GPU) 2 that is executing on the CPU 1. The driver will then generate appropriate commands and data to cause the graphics processing unit (GPU) 2 to render appropriate frames for display and to store those frames in appropriate frame buffers, e.g. in the main memory 7. The display controller 4 will then read those frames into a buffer for the display from where they are then read out and displayed on the display panel of the display 8.

The graphics processing system 10 will be configured to provide frames for display, and the graphics processing unit (GPU) 2 will correspondingly be configured to render frames, at an appropriate rate, such as 30 frames per second.

An example of a use of a graphics processing system such as that illustrated in FIG. 1 is to provide a virtual reality (VR) or augmented reality (AR) head mounted display (HMD) system. In this case, the display 8 will be a head-mounted display of some kind.

In a head mounted display operation, appropriate frames (images) to be displayed to each eye will be rendered by the graphics processing unit (GPU) 2 in response to appropriate commands and data from the application, such as a game, (e.g. executing on the CPU 1) that requires the display.

In such arrangements, the system will also operate to track the movement of the head/gaze of the user (so-called head pose (orientation) tracking). This head orientation (pose) data is then used to determine how the images should actually be displayed to the user for their current head position (view orientation (pose)), and the images (frames) are rendered accordingly (for example by setting the camera orientation (viewpoint and view direction) based on the head orientation data), so that an appropriate image (frame) based on the user's current direction of view can be displayed.

While it would be possible simply to determine the head orientation (pose) at the start of the graphics processing unit (GPU) 2 rendering a frame to be displayed in a virtual reality (VR) or augmented reality (AR) system, and then to update the display 8 with the frame once it has been rendered, because of latencies in the rendering process, it can be the case that the user's head orientation (pose) has changed between the sensing of the head orientation (pose) at the beginning of the rendering of the frame and the time when the frame is actually displayed (scanned out to the display 8). Moreover, it is often desirable to be able to provide frames for display in a virtual reality (VR) or augmented reality (AR) system at a rate that is faster than the graphics processing unit (GPU) 2 may be able to render frames at.

To allow for this, a process known as "timewarp" has been proposed for head mounted display systems. In this process, an "application" frame is first rendered by the graphics processing unit (GPU) 2 based on the head orientation (pose) data sensed at the beginning of the graphics processing unit (GPU) 2 rendering the application frame, but then before an image is actually displayed on the display 8, further head orientation (pose) data is sensed, and that updated head orientation (pose) sensor data is used transform the graphics processing unit (GPU) 2 rendered application frame to generate an "updated" version of the application frame that takes account of the updated head orientation (pose) data. The so-"timewarped" updated version of the application frame is then displayed on the display 8.

The processing required to "timewarp" a graphics processing unit (GPU) 2 rendered application frame can typically be performed in a much shorter time than the time required for the graphics processing unit (GPU) 2 to render a frame. Thus by performing "timewarp" processing, the time between head orientation (pose) data being sensed, and the image displayed on the display 8 being updated using the sensed head orientation (pose) data, can be reduced as compared to the graphics processing unit (GPU) 2 directly rendering each image to be displayed on the display 8 without "timewarp" processing. The effect of this is that, by using "timewarp" processing, the image displayed on the display 8 can more closely match the user's latest head orientation (pose), resulting in a more realistic virtual reality (VR) or augmented reality (AR) experience, for example.

Similarly, "timewarp" processing can be performed at a faster rate, such as 90 or 120 frames per second, than the graphics processing unit (GPU) 2 may be able to render frames at, such as 30 frames per second. Thus, "timewarp" processing can be used to provide frames for display that have been updated based on a sensed head orientation (pose) at a faster rate than would otherwise be possible without the use of "timewarp" processing. This can help to reduce "judder" artefacts and provide a smoother virtual reality (VR) or augmented reality (AR) experience, for example.

FIGS. 2, 3 and 4 illustrate the "timewarp" process in more detail.

FIG. 2 shows the display of an exemplary frame 20 when the viewer is looking straight ahead, and the required "timewarp" projection of that frame 21 when the viewing angle of the user changes due to a head rotation. It can be seen from FIG. 2 that for the frame 21, a modified version of the frame 20 must be displayed.

FIG. 3 correspondingly shows the "timewarp" rendering 31 of application frames 30 to provide the "timewarped" frames 32 for display. As shown in FIG. 3, a given application frame 30 that has been rendered may be subject to two (or more) "timewarp" processes 31 for the purpose of displaying the appropriate "timewarped" version 32 of that application frame 30 at successive intervals whilst waiting for a new application frame to be rendered. The "timewarp" processing 31 can be performed in parallel with (using a different thread to) the rendering of application frames 30 (i.e. asynchronously), which is referred to as "asynchronous timewarp" (ATW) processing.

FIG. 3 also shows the regular sampling 33 of the head orientation (pose) data that is used to determine the appropriate "timewarp" modification that should be applied to an application frame 30 for displaying the frame appropriately to the user based on their head orientation (pose).

FIG. 4 shows a schematic illustration of an exemplary rendered application frame 40, together with four respective "timewarped" frames 41A-D generated for display by "timewarping" application frame 40. So as to ensure that graphics processing unit (GPU) 2 rendered application frame data is available to be "timewarped" for a range of possible head movements, application frames are typically rendered by the graphics processing unit (GPU) 2 based on a field of view that is wider than the field of view of the output "timewarped" frames that are actually displayed to the user. The field of view of an application frame may be based on, for example, a permitted or expected (maximum) amount of head motion (e.g. rotation and/or translation) in the time period that the application frame is supposed to be valid for. Then, when the application frame is to be displayed, the "timewarp" process will be used to effectively render an appropriate window ("letterbox") taken from the wider field of view of the application frame. Thus in the schematic example of FIG. 4, application frame 40 is provided by rendering the scene based on a 16×8 square field of view, but "timewarped" frames 41A-D are provided for display with only a 5×4 square field of view taken from the wider field of view.

Each "timewarped" frame will also be transformed ("timewarped"), e.g. as described above, based on more recent head orientation (pose) information to provide the actual output image that is displayed to the use. Thus, as shown in the example of FIG. 4, when a change in head orientation (pose) is detected, application frame 40 is transformed such that object 42 appears at an appropriately shifted position in "timewarped" frames 41B-D, as compared to when no change in head orientation (pose) is detected (41A). Thus, as shown in FIG. 4, when a head movement to the right is detected, object 42 appears shifted to the left (41B); when a larger head movement to the right is detected, object 42 appears shifted farther to the left (41C); and when a head movement to the left is detected, object 42 appears shifted to the right (41D) as compared to when no change in head orientation (pose) is detected (41A).

Thus, in "timewarp" processing, an application frame is first rendered based on a first view orientation (pose) sensed at the beginning of rendering the application frame, and thus essentially represents a static "snapshot" of the scene being rendered as it should appear to a user at the point in time that the first view orientation (pose) was sensed. "Timewarp" processing can then be used to update (transform) the static "snapshot" application frame based on one or more second view orientations (poses) sensed at one or more respective later points in time, after the application frame has been rendered, to provide a series of one or more successive "timewarped" frames that each represent an updated view of the scene at the respective later point in time.

It has been recognised that while such "timewarp" processing takes account of changes to view orientation (pose) during the time period between the point in time at which the first view head orientation (pose) is sensed, and the point in time at which a respective second view orientation (pose) is sensed, it does not account for, and so "timewarped" frames do not show, any changes due to the motion of objects within the scene during that same time period. This means that the "timewarp" processing of a rendered application frame that represents a dynamic scene, i.e. a scene that includes moving objects, can introduce distortions in what is displayed to a user.

To account for object motion when performing "timewarp" processing, a process known as "spacewarp" processing has been proposed. This process attempts to take account of any motion of objects when a "timewarped" frame is to be generated by "timewarping" an application frame based on a view orientation (pose) sensed at a later point in time, by extrapolating moving objects shown in the application frame to expected e.g. positions at that later point in time, with the "timewarp" processing then being performed on the basis of the extrapolated objects. The so-"timewarped" and "spacewarped" updated version of the application frame is then displayed on the display 8.

The Applicants believe that there remains scope for improvements to graphics processing systems, and in particular to graphics processing systems that provide "timewarped" and/or "spacewarped" images for display for virtual reality (VR) and/or augmented reality (AR) (head mounted) display systems.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
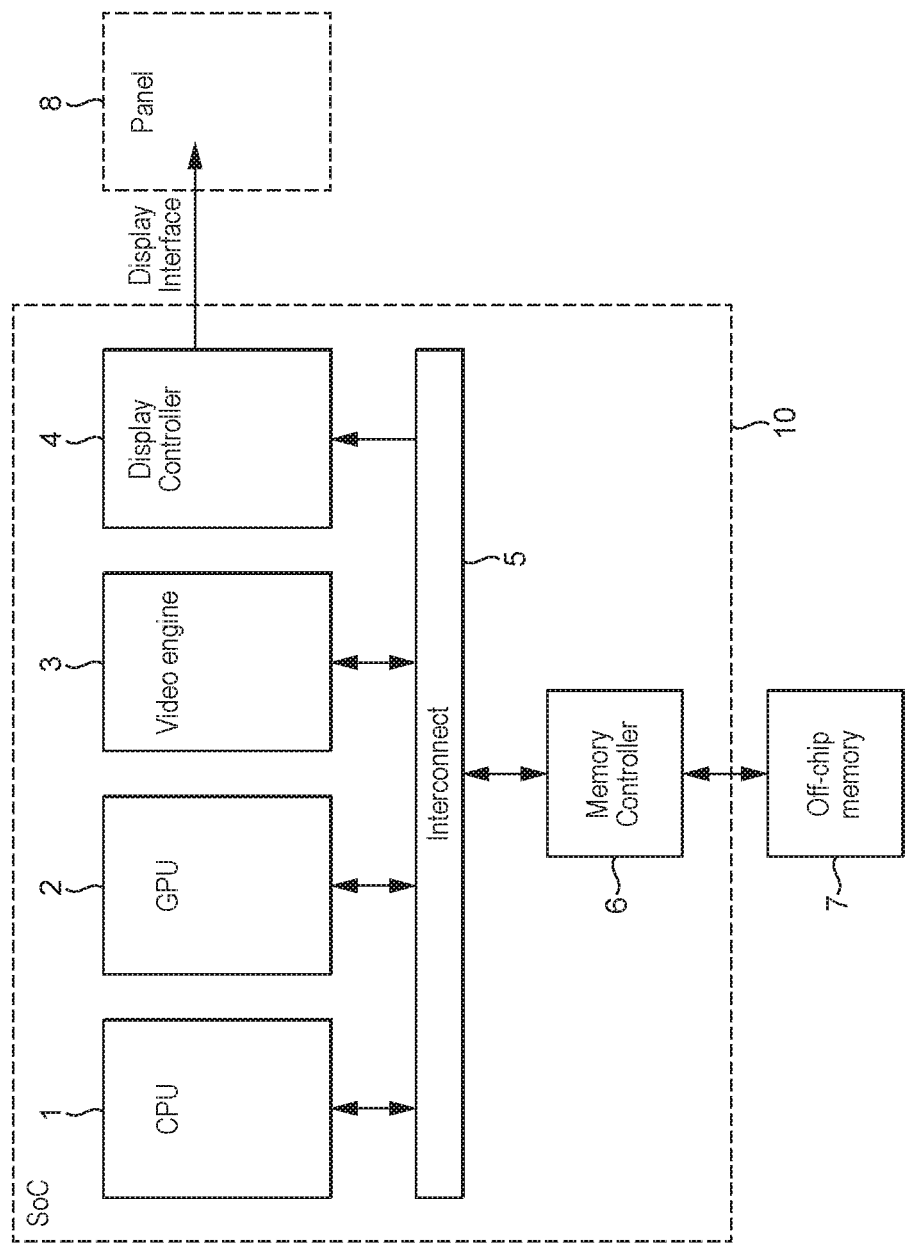
FIG. 1 shows an exemplary graphics processing system.
Figure 2:
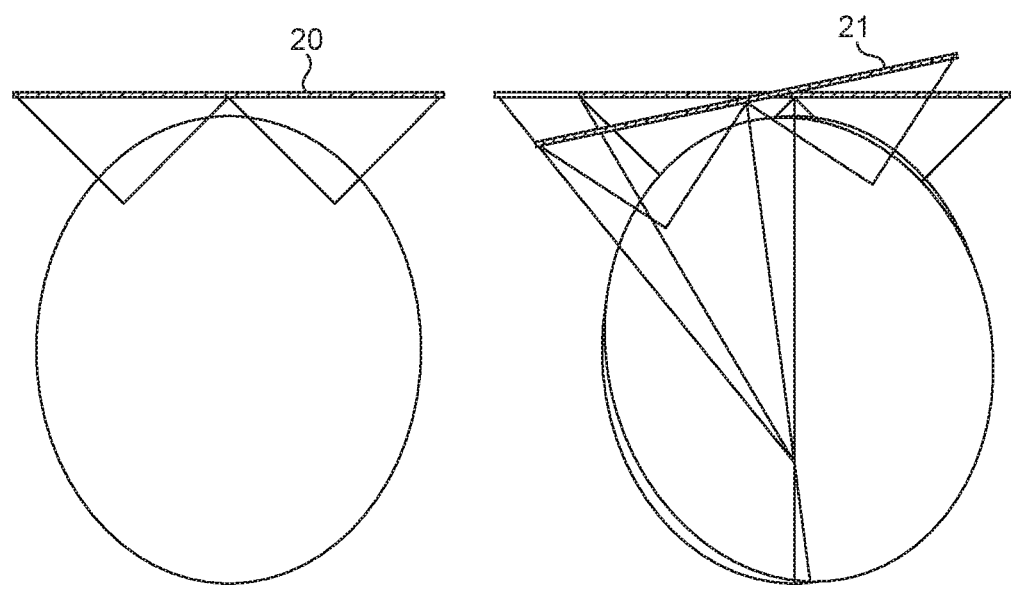
FIG. 2 illustrates the process of "timewarp" processing in a head mounted display system.
Figure 3:
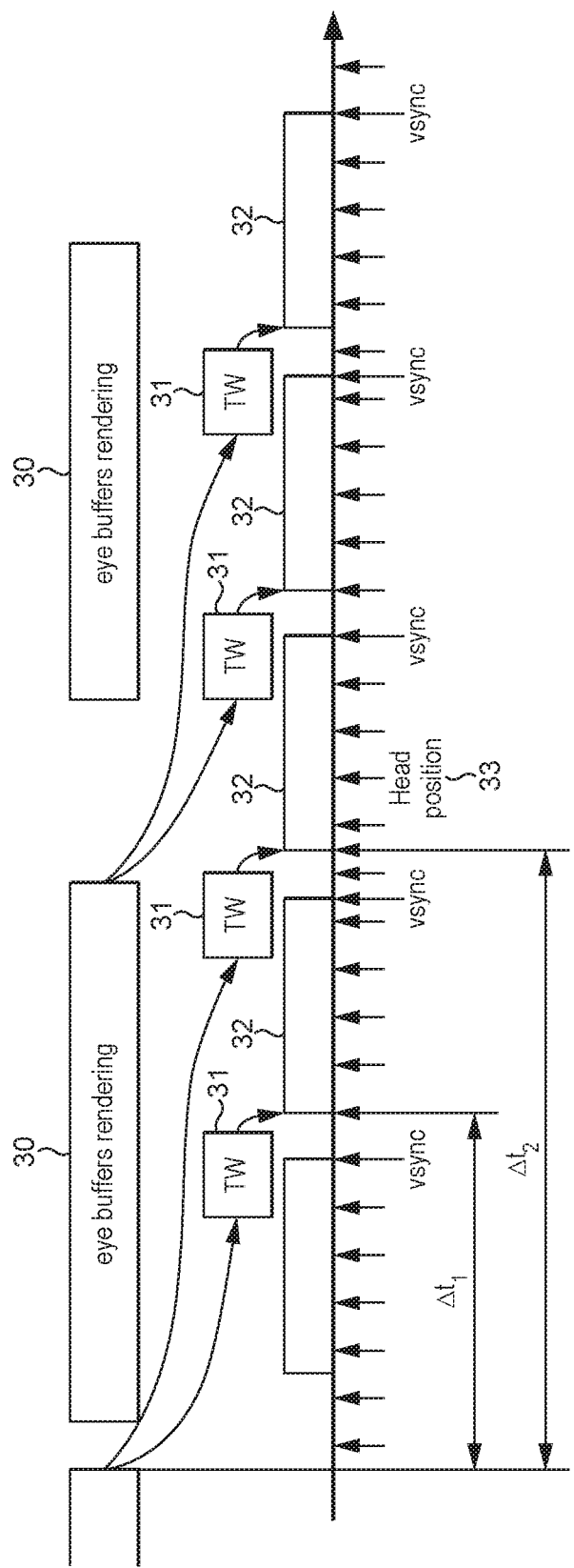
FIG. 3 shows another illustration of the process of "timewarp" processing in a head mounted display system.

A first embodiment of the technology described herein comprises a method of operating a graphics processing system that renders frames each representing a view of a scene of one or more objects, and generates output frames for display from rendered frames by transforming rendered frames based on received view orientation data and/or object motion, the method comprising:
  rendering a first frame representing a first view of a scene at a first point in time, from a first viewpoint, and in a first view direction;
  rendering one or more further versions of the first frame, each further version representing a further view of the scene at a further point in time, and/or from a further viewpoint and/or in a further view direction; and then
  generating an output frame for display using rendered data from the rendered first frame and/or rendered data from one or more of the one or more rendered further versions of the first frame.

A second embodiment of the technology described herein comprises a graphics processing system configured to render by processing circuitry frames each representing a view of a scene of one or more objects, and generate by processing circuitry output frames for display from rendered frames by transforming rendered frames based on received view orientation data and/or object motion;
  wherein the graphics processing system is further configured to, for a first rendered frame representing a first view of a scene at a first point in time, from a first viewpoint, and in a first view direction:
    render by processing circuitry one or more further versions of the first frame, each further version representing a further view of the scene at a further point in time, and/or from a further viewpoint and/or in a further view direction; and then
    generate by processing circuitry an output frame for display using rendered data from the rendered first frame and/or rendered data from one or more of the one or more rendered further versions of the first frame.

The technology described herein relates to a graphics processing system that generates output frames for display from rendered frames, by transforming those rendered frames based on received view (head or display) orientation (pose) data (e.g., and in an embodiment, by "timewarp" processing), and/or object motion e.g. by extrapolating the object motion (e.g. object translation and/or rotation) from the rendered frames (e.g., and in an embodiment, by "spacewarp" processing).

In an embodiment, the graphics processing system generates output (transformed) "timewarped" and/or "spacewarped" frames for display for a virtual reality (VR) and/or augmented reality (AR) head mounted display system (e.g. as described above). Thus, in an embodiment, the (graphics processing unit (GPU) of the) graphics processing system renders (application) frames, transforms those rendered (application) frames by "timewarping" the rendered (application) frames based on head (view) orientation (pose) data sensed by (received from) the virtual reality (VR) and/or augmented reality (AR) head mounted display system, and/or extrapolates moving objects in those rendered (application) frames by "spacewarping" the rendered (application) frames based on object motion, and provides the so-"timewarped" (so-transformed) and/or so-"spacewarped" (so-extrapolated) output frames (images) for display to a head mounted display of the virtual reality (VR) and/or augmented reality (AR) head mounted display system.

In the technology described herein, as in known arrangements for performing "timewarp" and/or "spacewarp" processing, a first (application) frame is rendered (by a rendering circuit of the graphics processing unit (GPU)) which represents a first view of scene at a first point in time, from a first viewpoint, and in a first view direction, e.g. and in an embodiment, based on a first head (view) orientation (pose) that was sensed at the first point in time by a (or the) virtual reality (VR) and/or augmented reality (AR) head mounted display system that the graphics processing system is providing images for display for. Thus the first (application) frame in an embodiment represents a "straight ahead" or "forward" view of the scene with respect to the sensed first head (view) orientation (pose) of a user of the head mounted display system sensed at the first point in time.

In contrast with known arrangements, however, in the technology described herein, before an output (e.g. "timewarped" and/or "spacewarped") frame is actually generated for display (by an output frame generating circuit of the graphics processing unit (GPU)) from a rendered first (application) frame (and displayed), a further version (or versions) of the first (application) frame is rendered (by the rendering circuit of the graphics processing unit (GPU)) that represents a further view of the scene at a further (different) point in time, and/or from a further (different) viewpoint and/or in a further (different) view direction, e.g. and in an embodiment, based on a further (different) head (view) orientation (pose) relative to the (sensed) first head (view) orientation (pose), and/or at a further point in time, after the first point in time.

As will be discussed further below, the further viewpoint and/or further view direction (view orientation (pose)) that a further version of the first (application) frame is rendered based on can represent, e.g., a predicted or assumed head movement, such as a head rotation and/or translation, that the user of the head mounted display might make relative to (starting from) the sensed (first) head orientation (pose) (first viewpoint and view direction) that the first (application) frame was rendered based on, during the time period that the first (application) frame is used for display. Each further rendered version can thus represent, e.g. a view of (a region of) the scene as it would appear to the user if he or she were to rotate and/or translate their head relative to (starting from) the sensed (first) head orientation (pose) (first viewpoint and view direction).

This means, for example, that as well as "timewarp" processing that takes account of view rotations only (e.g. yaw, pitch, and roll), i.e. three degrees of freedom (3-DOF) "timewarp" processing, the technology described herein can be used to perform six degrees of freedom (6-DOF) "timewarp" processing in which both view rotations (e.g. yaw, pitch, and roll) and view translations (e.g. up/down, left/right, and forward/back) are taken into account.

Thus, for example, and in an embodiment, when performing (three degrees of freedom (3-DOF)) "timewarp" processing, as well as rendering a normal (first) application frame based, for example, on a "straight ahead" (first) head orientation (pose) (first viewpoint and view direction) that was sensed at the beginning of rendering the (first) application frame (at the first point in time), additional (further) versions of (a region of) the (first) application frame are also rendered assuming, for example, further head orientations (rotations) of 20° to the left and 20° to the right, and 40° to the left and 40° to the right, and so on, relative to the "straight ahead" (first) head orientation (pose) that was sensed at the beginning of rendering the (first) application frame. When performing, six degree of freedom (6-DOF) "timewarp" processing, additional (further) versions are in an embodiment rendered based on head translations and/or head rotations relative to the "straight ahead" (first) head orientation (pose) that was sensed at the beginning of rendering the (first) application frame.

Additionally or alternatively, a further version of the first (application) frame can be rendered based on a further point in time, e.g. after the first point in time that the first (application) frame represents a view of the scene at, e.g. that an output ("timewarped" and/or "spacewarped") frame to be generated is to represent a view of the scene at. In this case, the further rendered version can thus represent, e.g. a view of the scene at the further point in time, and can thus show moving objects at the e.g. positions that they should (or are predicted or assumed to) appear at the further point in time.

Thus, for example, and in an embodiment, when performing "timewarp" and/or "spacewarp" processing, before an output "timewarped" and/or "spacewarped" frame is generated for display, a normal (first) application frame representing a first view of the scene at the first point in time at the start of rendering the application frame is rendered, together with an additional (further) version of the (first) application frame representing a view of the scene at a later point in time.

Thus, in addition to (a graphics processing unit (GPU)) rendering a (first) view of a scene based on a view (head) orientation (pose) sensed at a first point in time (as in known arrangements), in an embodiment of the technology described herein, further different views of (at least a region of) the scene are also rendered (by the graphics processing unit (GPU)) based on predicted or assumed (possible) view (head) movements (rotations and/or translations) relative to (starting from) the sensed view (head) orientation (pose), and/or based on future points in time. An output (e.g. "timewarped" and/or "spacewarped") frame can then be (and in an embodiment is) generated using a combination of rendered data from the plural rendered views.

As will be discussed further below, the further rendered version(s) can provide additional (graphics processing unit (GPU)) rendered data that can be "timewarped" and/or "spacewarped" to provide a more realistic virtual reality (VR) and/or augmented reality (AR) experience with fewer artefacts and distortions, and in an efficient manner.

In particular, the Applicants have recognised that while "timewarp" and "spacewarp" processing can help to reduce certain artefacts (such as judder), in known arrangements the "timewarping" and/or "spacewarping" of a rendered application frame can introduce its own distortions.

For example, the Applicants have recognised that in known arrangements for performing "timewarp" (and "spacewarp") processing, the graphics processing unit (GPU) 2 will only render application frame data based on a single view (head) orientation that was sensed at the start of the graphics processing unit (GPU) 2 rendering the application frame. When a change in view (head) orientation is detected, the application frame data rendered based on the old view (head) orientation will then be transformed by "timewarp" processing based on the new, changed view (head) orientation.

However, "timewarp" processing typically cannot account for all of the changes that should be apparent as a result of the change in view (head) orientation, and that would be apparent if a new application frame were to be rendered based on the new view (head) orientation. This can lead to distortions in what is displayed to a user, and such distortions may be particularly evident and more severe in known arrangements for objects in the scene that are close to the camera (to the viewpoint), and where there are more significant changes in view (head) orientation (pose), e.g. due to parallax effects.

Moreover, "timewarp" processing typically cannot account for changes that should be apparent due to object motion. For example, in the case of a dynamic scene that includes an object that is moving with respect to background objects in the scene, the position of the moving object relative to the background objects should appear to change in time due to the motion of the object. Thus, in the case of a "timewarped" frame that represents an "updated" version of an application frame at a later point in time, such a moving object should appear in the "timewarped" frame at a position relative to background objects that is different to that shown in the application frame. Moreover, in the case of a series of successive "timewarped" frames that represent successive "updated" versions of a single application frame at successive later points in time, the moving object should appear at different relative positions in each of the successive "timewarped" frames.

However, since "timewarp" processing does not account for any such object motion, each "timewarped" frame generated from an application frame will show such a moving object at the same position relative to background objects that it is shown in the application frame. Thus a moving object may appear at an incorrect (relative) position in a "timewarped" frame, and, moreover, may appear static in successive "timewarped" frames generated from the same application frame, leading to distortions and artefacts in what is displayed to a user.

Furthermore, it may be the case that a change in view (head) orientation results in an object and/or region of an object that was occluded from the point of view of the old view (head) orientation becoming visible. For example, a background object or region that was occluded by a closer object may become visible, and/or a region of an object that was self-occluded may become visible as a result of the change in view (head) orientation. However, in known arrangements, data for any such newly visible, "disoccluded", objects and/or regions will not have been rendered by the graphics processing unit (GPU) 2.

Similarly, the movement of objects in a dynamic scene can result in objects and/or regions of objects that were occluded at a first point in time becoming visible at a later point in time. In known arrangements for performing "spacewarp" processing, however, data is not directly rendered by the graphics processing unit (GPU) 2 for any such objects and/or regions that are "disoccluded" in a "spacewarped" frame due to the motion of objects from the rendered application frame.

Accordingly, in known arrangements, "timewarp" and/or "spacewarp" processing may be performed using rendered application frame data that does not show objects and/or regions because those objects and/or regions were occluded from the point of view of the (old) view (head) orientation and/or at the point in time that the application frame was rendered based on. This can lead to further distortions and artefacts in what is displayed to a user.

Thus, in the technology described herein, in contrast with known arrangements, one or more further (additional) versions of the first (application) frame are rendered. The further (additional) versions can (and in an embodiment do) show any "disoccluded" objects and/or regions, i.e. objects and/or regions that are occluded from the point of view of the first view (head) orientation (pose) and/or at the first point in time, but that are visible from the point of view of the respective further view (head) orientation (or orientations) and/or at the respective further point in time. As will be discussed further below, the further (additional) versions can also (or instead) (and in an embodiment do) show any close and/or moving object(s) which may be particularly distorted by "timewarp" processing.

Accordingly, when performing "timewarp" and/or "spacewarp" processing, the further (additional) versions of the first frame can (and in an embodiment do) provide rendered data for regions of the scene that could otherwise be significantly distorted by "timewarp" and/or "spacewarp" processing, e.g. and in an embodiment, close and/or moving objects and/or (and in an embodiment also) objects and/or regions that are occluded based on the first view (head) orientation (pose) and/or at the first point in time, but that become visible due to a change in view (head) orientation (pose) and/or object motion. This means that, as will be discussed further below, distortions and artefacts that could otherwise be caused by "timewarp" and/or "spacewarp" processing can be avoided or reduced. For example, a smoother virtual reality (VR) or augmented reality (AR) experience can be provided.

It will be appreciated, therefore, that the technology described herein provides an improved graphics processing system, and in particular an improved graphics processing system that provides "timewarped" and/or "spacewarped" images for display for virtual reality (VR) and/or augmented reality (AR) (head mounted) display systems.

The (rendered) first frame may be any suitable and desired frame that represents the first view of a scene. In an embodiment, the first frame is a frame (image) generated (rendered) for display for an application, such as a game.

The first frame may comprise an array of data elements (sampling positions) (e.g. pixels), for each of which appropriate data (e.g. a set of colour values) is rendered.

The first frame can be rendered in any suitable and desired manner. The first frame is in an embodiment rendered by a rendering circuit of a graphics processing unit (GPU) (a graphics processor) of the graphics processing system, but it could also or instead be generated or provided by (a rendering circuit of) another component or components of the graphics processing system, such as a CPU or a video processor, if desired.

The rendered first frame may be stored in (written to) memory for subsequent use as desired. For example, the first frame may be stored in a frame buffer in memory, from where it can then be read for further processing (e.g. as described below) and/or for display by a display controller. Such a memory may comprise any suitable memory and may be configured in any suitable and desired manner. For example, it may be a memory that is on chip with the graphics processing unit (GPU) or it may be an external memory. In an embodiment it is an external memory, such as a main memory of the graphics processing system. It may be dedicated memory for this purpose or it may be part of a memory that is used for other data as well.

The first frame is in an embodiment a rendered frame in a sequence of successive such rendered frames representing successive views of the scene at respective points in time.

The scene that the first frame represents a view of will comprise one or more objects to be rendered arranged as desired (e.g. by an (or the) application) in a space (e.g. world space), as is known in the art. The first frame will represent a first view of the scene from a point in that space, i.e. from the first viewpoint, and in the first view direction, e.g. and in an embodiment, corresponding to a (sensed) first view (head or display) orientation (pose) (sensed at the first point in time).

The scene that the first frame represents a view of may comprise one or more static objects and/or one or more moving objects (that are e.g. moving with respect to (the) static (e.g. background) objects), as desired. The first frame will represent a first view of the scene at the first point in time, and thus moving objects should be shown in the first frame at their positions (and orientations) in the scene at that first point in time.

Typically, the first view of the scene will be a view of (only) objects that lie within a (first) view frustum (volume) of the scene space. The (first) view frustum may be bounded by near and/or far planes that are perpendicular to the first view direction, as is known in the art. The (first) view frustum may represent, for example, a frustum of a rectangular pyramid having its apex positioned at the first viewpoint and axis directed along the first view direction, or another suitable volume.

Thus, objects of the scene that lie outside of the (first) view frustum may not be included in the first view, and so may not appear in the first frame. For example, objects that are closer (in the scene space) to the first viewpoint than the near plane of the (first) view frustum may not be included in the first view; and similarly, objects that are farther away (in the scene space) from the first viewpoint than the far plane of the (first) view frustum may not be included in the first view.

The first point in time that the first frame represents a view of the scene at can be any suitable and desired point in time. The first point in time is in an embodiment a point in time at the beginning of (the graphics processing unit (GPU)) rendering the first frame. In an embodiment, the first point in time is a point in time at which the first viewpoint and first view direction (view orientation (pose)) that the first frame is rendered based on are sensed (by the (virtual reality (VR)

and/or augmented reality (AR)) (head mounted) display system that the graphics processing system is providing images for display for).

In an embodiment, the first frame is a frame (image) rendered based on a first view (head or display) orientation (pose) (corresponding to the first viewpoint and first view direction) sensed at the first point in time (at the beginning of rendering the first frame), but which is to be displayed (transformed) based on a second (different) view (head or display) orientation (pose) sensed after the first frame has been initially rendered, at a second point in time. For example, and in an embodiment, the first frame is an "application" frame which is to be transformed by (three or six degrees of freedom ("DOF")) "timewarp" processing to provide an (the) output "timewarped" (transformed) frame (image) for display, e.g. as described above.

Additionally or alternatively, in an embodiment, the first frame is a frame (image) that represents a first view of the scene at the first point in time (at the beginning of rendering the first frame), but which is to be subjected to an extrapolation operation (transformation) based on object motion so that an extrapolated version of the first frame representing a view of the scene at a (or the) second point in time, after the first frame has been rendered, is generated for display. For example, and in an embodiment, the first frame is an "application" frame which is to be extrapolated (transformed) by "spacewarp" processing to provide an (the) output "spacewarped" (extrapolated) frame (image) for display, e.g. as described above.

In an embodiment, the first (application) frame is a frame (image) rendered for a (virtual reality (VR) and/or augmented reality (AR)) head mounted display system, wherein a transformed ("timewarped" and/or "spacewarped") version of the first (application) frame is in an embodiment provided for display to (a head mounted display of) the (virtual reality (VR) and/or augmented reality (AR)) head mounted display system.

Such a (virtual reality (VR) and/or augmented reality (AR)) head mounted display system may include one or more sensors for sensing (tracking) the orientation (pose) (e.g. rotations and/or translations) of the user's head (and/or their view (gaze) direction) in use (while images are being displayed to the user on the head mounted display of the (virtual reality (VR) and/or augmented reality (AR)) head mounted display system).

In this case, the first viewpoint and the first view direction that the first (application) frame is rendered based on will in an embodiment correspond to a first head (view) orientation (pose) of a user of the (virtual reality (VR) and/or augmented reality (AR)) head mounted display system that is sensed at the first point in time by the (one or more sensors of the) (virtual reality (VR) and/or augmented reality (AR)) head mounted display system, in an embodiment at the beginning of (the graphics processing unit (GPU)) rendering the first (application) frame.

Thus, the first (application) frame in an embodiment represents a (first) (forward) view of the scene from the user's (first) viewpoint and in a (first) view direction corresponding to the user's (first) head (view) orientation (pose), that is in an embodiment sensed (by the (virtual reality (VR) and/or augmented reality (AR)) head mounted display system) at the first point in time at the beginning of (the graphics processing unit (GPU)) rendering the first (application) frame.

As will be discussed further below, however, in another embodiment, the first (application) frame is rendered for a display system that is not head mounted, such as a hand held (virtual reality and/or augmented reality (AR)) display system, e.g. a mobile phone or tablet. Such a system may operate to track the movement (orientation (rotation and/or translation)) of the display (e.g. of the mobile phone or tablet) itself, and thus the first viewpoint and the first view direction that the first (application) frame is rendered based on will in an embodiment correspond to a first display (view) orientation (pose) of a display of the (virtual reality (VR) and/or augmented reality (AR)) display system, that is in an embodiment sensed at the first point in time by (one or more sensors of the) (virtual reality (VR) and/or augmented reality (AR)) display system, in an embodiment at the beginning of (the graphics processing unit (GPU)) rendering the first (application) frame.

The first (application) frame can be any suitable and desired size. However, in an embodiment, the first (application) frame is rendered based on a field of view that is wider (in an embodiment in two dimensions) than the field of view that an (the) output (transformed ("timewarped" and/or "spacewarped")) version of the first (application) frame is to be displayed based on. The field of view of the first (application) frame may be based on, for example, a permitted or expected (maximum) amount of view (head or display) orientation (pose) movement (e.g. rotation and/or translation) in the time period that the first (application) frame is supposed to be valid for.

A (and each) further version of the one or more further versions of the first frame may comprise an array of data elements (sampling positions) (e.g. pixels), for each of which appropriate data (e.g. a set of colour values) is rendered.

The one or more further versions of the first frame should be rendered before an (the) output frame representing an output (e.g. transformed and/or extrapolated) version of the first frame is generated, and in an embodiment before the output frame is displayed (on a (or the) display). A (and each) further version of the first frame can otherwise be rendered in any suitable and desired manner.

A (and each) further version is in an embodiment rendered by a (or the) rendering circuit of a (or the) graphics processing unit (GPU) (a graphics processor) of the graphics processing system, but it could also or instead be generated or provided by (a rendering circuit of) another component or components of the graphics processing system, such as a (or the) CPU or a (or the) video processor, if desired.

A (and each) further version may be rendered by a different component of the graphics processing system to the first frame. However, in an embodiment, a (and each) further version is rendered by the same component of the graphics processing system (e.g. the graphics processing unit (GPU)) as the rendering of the first frame.

A (and each) rendered further version may be stored in (written to) memory for subsequent use as desired. For example, a (and each) further version may be stored in a (respective) frame buffer in memory, from where it can then be read for further processing (e.g. as described below) and/or for display by a (or the) display controller. Such a memory may comprise any suitable memory and may be configured in any suitable and desired manner. For example, it may be a memory that is on chip with the graphics processing unit (GPU) or it may be an external memory. In an embodiment it is an external memory, such as a main memory of the graphics processing system. It may be dedicated memory for this purpose or it may be part of a memory that is used for other data as well.

A (and each) further version may be stored in a different memory to the rendered first frame. However, in an embodiment, a (and each) further version is stored in the same memory as the first frame.

Typically, a (and each) further version of the first frame will represent a view of (only) objects that lie within a respective further view frustum (volume) of the scene space, e.g. in a similar manner to as described above.

A (and each) further version of the one or more further versions of the first frame should represent a (respective) further view of the same scene that the first frame represents a view of, but at a (respective) further (different) point in time, and/or from a (respective) further (different) viewpoint, and/or in a (respective) further (different) view direction.

Thus, a (and each) further version of the first frame should be rendered based on one or more of: (i) a (respective) further point in time; (ii) from a (respective) further viewpoint; and (iii) in a (respective) further view direction. For example, a (and each) further version could represent a view of the scene at a (respective) further point in time; from a (respective) further viewpoint; or in a (respective) further view direction. Or, a (and each) further version could represent a view of the scene at a (respective) further point in time and from a (respective) further viewpoint; at a (respective) further point in time and in a (respective) further view direction; or from a (respective) further viewpoint and in a (respective) further view direction. Or, a (and each) further version could represent a view of the scene at a (respective) further point in time; from a (respective) further viewpoint; and in a (respective) further view direction.

Thus, at least one of the point in time, the viewpoint and the view direction that a (and each) further version of the first frame is rendered based on should be (and in an embodiment is) different to that which the first frame is rendered based on. Correspondingly, one or more (but not all) of the point in time, the viewpoint and the view direction that a (and each) further version of the first frame is rendered based on may be the same as that which the first frame is rendered based on. Thus, a (and each) further version of the first frame should (and in an embodiment does) represent a different view of the scene to the first view of the scene that the first frame represents.

Where plural further versions of the first frame are rendered, then in an embodiment, at least one of the point in time, the viewpoint and the view direction that a further version of the plural further versions is rendered based on is different to that which the other further version or versions of the plural further versions are rendered based on. Correspondingly, one or more (but in an embodiment not all) of the point in time, the viewpoint and the view direction that a further version of the plural further versions is rendered based on may be the same as that which the other further version or versions of the plural further versions are rendered based on. Thus, a (and each) further version of the plural further versions in an embodiment represents a different view of the scene to the view(s) of the scene that the other further version(s) of the plural further versions represent.

Where a further version of the first frame is rendered based on a further point in time (that is different to the first point in time that the first frame is rendered based on), then the further point in time can be any desired point in time.

In an embodiment, the further point in time is a point in time that is after the first point in time that the first frame represents a view of the scene at (and in an embodiment after the first frame has been rendered), but that is in an embodiment before a point in time that the frame following the first frame in the sequence of rendered frames represents a view of the scene at.

In an embodiment, the further point in time is a point in time at which an (the) output (transformed and/or extrapolated, e.g. "timewarped" and/or "spacewarped") frame to be generated is to represent a view of the scene at, and in an embodiment a point in time at which (second) view orientation data is to be sensed to transform the first frame (by "timewarp" processing) based on, e.g. a (the) second point in time.

In an embodiment, a (each) further version that is rendered based on a further point in time represents a further view of the scene as it should, or is predicted or assumed to, appear at the respective further point in time. Thus, for example, where the scene contains one or more moving objects, then a further version of the first frame that is rendered based on a further point in time should show those moving objects appropriately moved (e.g. translated, rotated and/or scaled) as compared to the first frame, based on the motion of the moving objects.

Such object motion may be provided or determined as desired. For example, object motion could be determined by an appropriate comparison of e.g. consecutive frames. However, in an embodiment, object motion is indicated or predicted by an (the) application that the first frame (and further version(s)) is generated for.

It is believed that the idea of rendering plural views of a scene representing different views of the scene at different points in time, before generating an output frame using rendered data from one or more of those plural different views, is novel and inventive in its own right.

Thus, a third embodiment of the technology described herein comprises a method of operating a graphics processing system that renders frames each representing a view of a scene of one or more objects, and generates output frames for display from rendered frames by transforming rendered frames based on received view orientation data and/or object motion, the method comprising:
  rendering a first frame representing a first view of a scene at a first point in time;
  rendering one or more further versions of the first frame, each further version representing a further view of the scene at a further point in time; and then
  generating an output frame for display using rendered data from the rendered first frame and/or rendered data from one or more of the one or more rendered further versions of the first frame.

A fourth embodiment of the technology described herein comprises a graphics processing system configured to render by processing circuitry frames each representing a view of a scene of one or more objects, and generate by processing circuitry output frames for display from rendered frames by transforming rendered frames based on received view orientation data and/or object motion;
  wherein the graphics processing system is further configured to, for a first rendered frame representing a first view of a scene at a first point in time:
    render by processing circuitry one or more further versions of the first frame, each further version representing a further view of the scene at a further point in time; and then
    generate by processing circuitry an output frame for display using rendered data from the rendered first frame and/or rendered data from one or more of the one or more rendered further versions of the first frame.

As will be appreciated by those skilled in the art, these aspects and embodiments of the technology described herein can and in an embodiment do include one or more, and in an embodiment all, of the optional features of the technology described herein, as appropriate.

For example, in these aspects and embodiments, a (and each) further version of the first frame in an embodiment represents a (respective) further view of the scene from the (first) viewpoint and in the (first) view direction that the first frame is rendered based on, but at a different (further), in an embodiment later, point in time. However, a (and each) further version of the first frame can represent a (respective) further view of the scene from a different (further) viewpoint and/or in a different (further) view direction (and at a different (further), in an embodiment later, point in time) to the first frame.

Where a further version of the first frame is rendered based on a further viewpoint (that is different to the first viewpoint that the first frame is rendered based on), then the further viewpoint can be any desired viewpoint. Similarly, where a further version of the first frame is rendered based on a further view direction (that is different to the first view direction that the first frame is rendered based on), then the further view direction can be any desired view direction.

In an embodiment, the first viewpoint and first view direction that the first frame is rendered based on correspond to a first view (head or display) orientation (pose), and the further viewpoint and further view direction that a (and each) further version of the first frame is rendered based on correspond to a (respective) further view (head or display) orientation (pose) (that is different to the first view orientation (pose)).

(It will be appreciated that a view orientation (pose) (e.g. the further view orientation (pose)) will be different to another view orientation (pose) (e.g. the first view orientation (pose)) if at least one of the viewpoint and the view direction that the view orientation (pose) corresponds to is different to the viewpoint and the view direction, respectively, that the another view orientation (pose) corresponds to.)

In this case, a (each) further view orientation (pose) that a further version is rendered based on is in an embodiment defined relative to the (sensed) first view orientation (pose) that the first frame is rendered based on, such that it represents a (head or display) movement (e.g. rotation and/or translation) from the (sensed) first view (head or display) orientation (pose).

Thus, for example, a (each) further view orientation (pose) may represent turning (rotating) (the head or display) to the right or to the left (yaw), up or down (pitch), and/or rolling the head left or right (roll) starting from the first view (head or display) orientation (pose), and/or moving (translating) (the head or display) to the right or to the left, up or down, and/or forwards or backwards starting from the first view (head or display) orientation (pose).

A (each) further view (head or display) orientation (pose) (rotation and/or translation) may be defined as desired, such as in the form of one or more (Euler) angles or quaternions, and/or one or more (translation) distances or vectors, relative to the first view (head or display) orientation (pose).

It is believed that the idea of rendering plural views of a scene representing different views of the scene based on different view orientations (poses), before generating an output frame using rendered data from one or more of those plural different views, is novel and inventive in its own right.

Thus, a fifth embodiment of the technology described herein comprises a method of operating a graphics processing system that renders frames each representing a view of a scene of one or more objects, and generates output frames for display from rendered frames by transforming rendered frames based on received view orientation data and/or object motion, the method comprising:
    rendering a first frame representing a first view of a scene based on a first view orientation;
    rendering one or more further versions of the first frame, each further version representing a further view of the scene based on a further view orientation; and then
    generating an output frame for display using rendered data from the rendered first frame and/or rendered data from one or more of the one or more rendered further versions of the first frame.

A sixth embodiment of the technology described herein comprises a graphics processing system configured to render by processing circuitry frames each representing a view of a scene of one or more objects, and generate by processing circuitry output frames for display from rendered frames by transforming rendered frames based on received view orientation data and/or object motion;
    wherein the graphics processing system is further configured to, for a first rendered frame representing a first view of a scene based on a first view orientation:
    render by processing circuitry one or more further versions of the first frame, each further version representing a further view of the scene based on a further view orientation; and then
    generate by processing circuitry an output frame for display using rendered data from the rendered first frame and/or rendered data from one or more of the one or more rendered further versions of the first frame.

As will be appreciated by those skilled in the art, these aspects and embodiments of the technology described herein can and in an embodiment do include one or more, and in an embodiment all, of the optional features of the technology described herein, as appropriate.

For example, in these aspects and embodiments, a (and each) further version of the first frame in an embodiment represents a (respective) further view of the scene at the (first) point in time that the first frame represents a view of the scene at, but based on a different (further) view orientation (pose) (from a different (further) viewpoint and/or in a different (further) view direction). However, a (and each) further version of the first frame can represent a (respective) further view of the scene at a different (further) in an embodiment later, point in time (and from a different (further) view orientation (pose)) to the first frame.

The Applicants have recognised that while rendering the one or more further versions of the first frame in the manner of the technology described herein can provide certain advantages (e.g. as described above), it may also increase the processing requirements as compared to rendering the first frame without rendering the one or more further versions of the first frame. As such, it may be desirable to reduce, avoid or optimise the processing required to render the one or more further versions of the first frame. This may be particularly desirable, for example, in the context of mobile devices having restricted processing resources (e.g. mobile phones or tablets).

For example, while a (and each) further version of the one or more further versions of the first frame could be rendered (by the graphics processing unit (GPU)) at the point that the rendered data is needed, e.g. when the rendered data is required for display, in an embodiment, one or more (and in an embodiment each) of the one or more further versions are rendered (by the graphics processing unit (GPU)) along with (at substantially the same time as) the rendering of the first (application) frame.

In this regard, the Applicants have recognised that much of the input data (e.g. vertex data) required to render a (and each) further version may be the same as the input data required to render the first (application) frame, such that by rendering a (and each) further version along with (at substantially the same time as) the rendering of the first (application) frame, this input data can be re-used (by the graphics processing unit (GPU)) during rendering, so that it may only need to be cached once, for example, leading to a more efficient rendering process.

Thus, according to an embodiment, the method comprises (and the system is configured to) rendering the first frame using first input data; and rendering at least one (and in an embodiment each) of the one or more further versions of the first frame using at least some of the first input data.

In another example, and in an embodiment, the one or more further (additional) versions of the first frame are rendered (only) when they are likely to be necessary in order to reduce the likelihood (and severity) of artefacts and distortions.

For example, as described above, the Applicants have recognised that due to parallax effects, distortions and artefacts when performing "timewarp" and/or "spacewarp" processing may be particularly evident and more severe where there are objects close to the camera (to the viewpoint), and where there are more significant changes in view orientation (pose).

Thus, according to an embodiment, one or more (and in an embodiment each) of the one or more further versions of the first frame are rendered (only) when it is determined that an object in the first view of the scene is close to the first viewpoint.

Determining whether an object in the first view of the scene is close to the first viewpoint can be performed in any suitable and desired manner. It will typically involve determining whether an object is spatially close to the first viewpoint within the (world) space that objects of the scene are arranged in, by determining an appropriate distance within that space and comparing the determined distance with an appropriate (threshold) value.

Such a distance can represent any suitable and desired distance, such as a shortest and/or average distance between an object (or the edge(s) of the object) in the first view of the scene and a suitable reference (such as a reference point (e.g. the first viewpoint), or a reference plane (e.g. the near plane of the (first) view frustum)).

Such a distance may be defined in any suitable direction, but in an embodiment represents a depth (Z-value) into the scene (e.g. from the near plane of the (first) view frustum towards the far plane of the (first) view frustum, in the first view direction).

In an embodiment, the determined distance (e.g. depth (Z-value)) is compared to one or more (threshold) values, e.g. to determine whether the distance (e.g. depth (Z-value)) satisfies one or more inequalities with respect to the one or more (threshold) values. It is then in an embodiment determined that an object in the first view of the scene is close to the first viewpoint when the distance (between the object and the reference) satisfies the one or more inequalities with respect to the one or more (threshold) values.

Thus, for example, determining whether an object in the first view of the scene is close to the first viewpoint may comprise determining whether a (or the) distance (e.g. depth (Z-value)) is within a certain range (defined by high and low (threshold) values) or is less than (or less than or equal to) a (threshold) value.

In an embodiment, determining whether an object in the first view of the scene is close to the first viewpoint comprises determining whether the depth (Z-value) of the object within the scene is less than (or less than or equal to) a threshold value, and determining that the object in the first view of the scene is close to the first viewpoint when it is determined that the depth (Z-value) of the object within the scene is less than (or less than or equal to) the threshold value.

Where a (or the) depth is compared with a threshold value, the threshold value can be selected as desired. It may be a fixed threshold value that is, for example, set (defined) by the application that the first frame is generated for. Alternatively, the threshold value may vary, for example, depending on a property (or properties) of the object whose distance (from the reference) is being determined (such as the size and/or shape of the object).

It will be appreciated that where the first view of the scene is a view of (only) objects that lie within a (or the) (first) view frustum, then determining whether an object in the first view of the scene is close to the first viewpoint will comprise determining whether an (visible) object lying within the (first) view frustum is close to the first viewpoint.

It will furthermore be appreciated that determining whether an object is close to the first viewpoint could be performed before, at the same time as, or after rendering the first frame.

Where there are plural objects in the first view of the scene, then it will in an embodiment be determined whether plural and in an embodiment each of the plural objects in the first view of the scene are or is close to the first viewpoint. Accordingly, it will be appreciated that it may be determined that plural objects in the first view of the scene are close to the first viewpoint.

Determining whether plural objects in the first view of the scene are close to the first viewpoint could be performed individually for each of the plural objects, or the plural objects could be grouped into one or more groups each including one or more of the plural objects, e.g. based on their spatial proximity to each other, and the determination could be performed in respect of one or more of the one or more groups.

Thus, in an embodiment, it is determined whether a group of one or more objects is close to the first viewpoint. This can be performed as desired; for example, by determining a shortest distance between an object in the group of one or more objects and a (or the) reference, or by determining an average distance between the one or more objects and a (or the) reference, e.g. substantially as described above.

Thus, in an embodiment, when it is determined that an (group of) object(s) in the first view of the scene (lying within the (first) view frustum) is close to the first viewpoint, then one or more (and in an embodiment each) of the one or more further versions of the first frame are rendered.

By rendering the one or more further (additional) versions (only) when it is determined that an object is close to the viewpoint, any additional processing required to render the further (additional) versions can be performed only when it is likely to be necessary in order to reduce the likelihood (and severity) of artefacts and distortions. Accordingly, artefacts and distortions when performing "timewarp" and/or "spacewarp" processing can be reduced in an efficient manner, i.e. without unnecessarily increasing the processing required.

Similarly, the Applicants have recognised that it may be preferable to render a further version of the first frame that represents a further view of the scene at a further point in time (that is different to the first point in time that the first frame represents a view of the scene at), (only) where the scene is a dynamic scene that contains one or more moving objects.

Thus, in an embodiment, the method comprises (and the system is configured to) determining whether the first view of the scene contains (a group of) one or more moving objects, and when it is determined that the first view of the scene contains (a group of) one or more moving objects, rendering one or more further versions of the first frame each representing a further view of the scene at a further point in time (that is different to the first point in time).

Determining whether the first view of the scene contains (a group of) one or more moving objects can be performed in any suitable and desired manner. For example, the presence of moving objects could be determined using a suitable comparison of e.g. consecutive frames. In an embodiment, however, the presence of any moving objects in the first view of the scene is indicated by the application that the first frame (and further version(s)) is generated for.

In another example, and in an embodiment, one or more (and in an embodiment each) of the one or more further versions of the first frame may be rendered (only) when the graphics processing system is capable of doing so.

In this regard, the Applicants have recognised that in some situations, it may be desirable to limit the processing that is performed to render the one or more further versions of the first frame, e.g. because the additional processing would be beyond the system capabilities and so could, e.g. affect the rendering of the first frame. In this case, it may be desirable to reduce the number of rendered further versions of the first frame, or indeed to not render any further versions at all, and to instead render only the first frame.

Thus, according to an embodiment, the method further comprises (and the system is configured to) determining whether rendering one or more (and in an embodiment each) of the one or more further versions of the first frame, would, if performed, not exceed a processing limit of the graphics processing system; and when it is determined that the processing limit would not be exceeded, rendering the one or more (each) of the one or more further versions of the first frame.

Correspondingly, in an embodiment, it may be determined whether rendering one or more (and in an embodiment each) of the one or more further versions of the first frame, would, if performed, exceed a processing limit of the graphics processing system; and when it is determined that the processing limit would be exceeded, the one or more (each) of the one or more further versions of the first frame are not rendered.

In another example, and in an embodiment, the number of further versions that are rendered and/or the further points in time, and/or further viewpoints and/or further view directions (further view orientations (poses)) that the one or more further versions are rendered based on, are in an embodiment selected based on the additional processing that is required to render the further versions, relative to the output (image) quality that is expected to be (or would be) achieved using the rendered further versions, and/or that is (or would be) deemed to be acceptable. In an embodiment, the selection is performed in such a manner so as to (try to) achieve an optimal balance between the additional processing requirements, and the (potential) (image) quality, e.g. so as to achieve a "trade-off" between the additional processing required to render the one or more further versions of the first frame, and the (potential) improvements to the virtual reality (VR) and/or augmented reality (AR) experience that may be provided by rendering the one or more further versions of the first frame.

For example, and in an embodiment, the (head or display) movement that a user of the (e.g. head mounted) display system might make during the time period that the first frame is to be used for display may be predicted or assumed, and used to select a further point in time, and/or viewpoint and/or view direction (view orientation (pose)) that a (and each) further version of the first frame is rendered based on.

Thus, in an embodiment, a further view (head or display) orientation (pose) that a (and each) further version of the first frame is rendered based on represents a predicted or assumed (head or display) movement (e.g. rotation and/or translation) that the user of the (e.g. head mounted) display might make relative to (starting from) the first view (head or display) orientation (pose) that the first (application) frame is rendered based on, during the time period that the first (application) frame is being used for display.

Thus, in an embodiment, a (each) further version that is rendered based on a further view orientation (pose) (viewpoint and/or view direction) represents a further view of the scene as it would appear based on a predicted or assumed (head or display) movement (e.g. rotation and/or translation) that the user of the (e.g. head mounted) display might make relative to (starting from) the first view (head or display) orientation (pose) that the first (application) frame is rendered based on, during the time period that the first (application) frame is being used for display.

In another embodiment, a further point in time, and/or viewpoint and/or view direction (view orientation (pose)) that a (and each) further version is rendered based on is selected so that rendered data is provided for regions of the scene that may be likely to suffer from artefacts and distortions (when performing "timewarp" and/or "spacewarp" processing).

For example, in an embodiment, it may be determined where and/or when occlusion effects are likely to occur (e.g. using object depth and/or object motion information), and then the further point in time, and/or viewpoint and/or view direction that a further view (or views) is rendered based on is selected so as to provide rendered data to mitigate those occlusion effects.

In one embodiment, one or more (and in an embodiment each) of the one or more further versions of the first frame may each be rendered based on a respective further point in time, and/or further viewpoint and/or further view direction (further view orientation (pose)) taken from a particular, in an embodiment selected, in an embodiment predetermined, set of (a fixed number of) one or more further points in time, and/or further viewpoints and/or further view directions (further view orientations (poses)). Such a set may be defined (set) by a (or the) application, e.g. before runtime (before rendering). It may be selected to cover an appropriate range of predicted (head or display) movements (rotations and/or translations), e.g. based on historical (head or display) tracking (orientation (pose)) data, and/or points in time.

In another embodiment, one or more (and in an embodiment each) of the one or more further versions of the first frame may each be rendered based on a respective further point in time, and/or further viewpoint and/or further view direction (further view orientation (pose)) that is dynamically selected in use, e.g. based on parameters or properties determined at runtime, e.g. based on (head or display) tracking (orientation (pose)) information sensed at runtime.

For example, and in an embodiment, the number of rendered further versions of the first frame and/or the further points in time, and/or further viewpoints and/or further view directions (further view orientations (poses)) that the one or more further versions are rendered based on may be varied depending on one or more factors, e.g. related to the (group of) object(s) determined to be close to the first viewpoint and/or determined to be moving, such as the size, shape or velocity of the (group of) object(s) and/or the depth of the (group of) object(s) in the scene.

For example, a higher number of further versions of the first frame may be rendered where an (group of) object(s) is closer to the first viewpoint, larger, and/or moving faster, e.g. so as to ensure that appropriate rendered data is available.

Additionally or alternatively, the number of rendered further versions and/or further points in time, and/or further viewpoints and/or further view directions (further view orientations (poses)) that the one or more further versions are rendered based on may be selected based on recent view (head) tracking (orientation (pose)) information (sensed by the (one or more sensors of the) (virtual reality (VR) and/or augmented reality (AR) (head mounted) display system).

For example, recent view (head) tracking (orientation (pose)) information may be used to predict a future view (head) movement (rotation and/or translation) that the user of the head mounted display is likely to make, and the number of further versions and/or the further points in time, and/or further viewpoints and/or further view directions (further view orientations (poses)) that the one or more further versions are rendered based on may be selected based on the predicted view (head) movement (rotation and/or translation).

For example, if recent view (head or display) tracking (orientation (pose)) information indicates that the user of the (head mounted) display has moved (rotated and/or translated) his or her head (or display) in a particular direction, then one or more (and in an embodiment each) of the one or more further versions may be rendered based on a further viewpoint and/or view direction that represents a view (head) movement (rotation and/or translation) in that direction, e.g. so that if the user were to continue moving (rotating and/or translating) his or her head in that direction, then an appropriate further version would have been rendered.

In another example, if recent view (head) tracking (orientation (pose)) information indicates that the user has been moving (rotating and/or translating) his or her head (or display) quickly, then the number of further versions may be reduced and/or one or more (and in an embodiment each) of the one or more further versions may be selected to represent a larger view (head) movement (rotation and/or translation) than would otherwise be selected if the recent view (head) tracking (orientation (pose)) information indicated that the user has been moving (rotating and/or translating) his or her head (or display) more slowly (and vice versa), e.g. so that if the user were to continue moving (rotating and/or translating) his or her head (or display) quickly (or slowly), then an appropriate further version(s) would have been rendered.

Additionally or alternatively, the number of further versions and/or the further points in time, and/or further viewpoints and/or further view directions (further view orientations (poses)) that the one or more further versions are rendered based on may be selected based on likely user view (head) movements (rotations and/or translations), e.g. based on information provided (at runtime) by the application that the first frame (and the further version(s)) is rendered for.

For example, when a user is less likely to move his or her head (or display), e.g. because the user is expected to look in a single preferred direction, or when a user is less likely to move his or her head significantly, e.g. because he or she is sitting down in a game, then the number of further versions may be reduced and/or a further viewpoint and/or view direction (view (head) orientation (pose)) that a (and in an embodiment each) further version is rendered based on may be selected to represent a smaller view (head) movement (rotation and/or translation) than would otherwise be selected if the user were more likely to move his or her head (or display) (significantly) (and vice versa).

Similarly, when a user is more likely to move his or her head (or display) in a particular direction, e.g. because he or she is about to turn (or is turning) a corner in a game, then the number of further versions may be increased and/or a further viewpoint and/or view direction (view (head) orientation (pose)) that a (and in an embodiment each) further version is rendered based on may be selected to represent a view (head) movement (rotation and/or translation) in that particular direction, e.g. so that if the user were to move (rotate and/or translate) his or her head (or display) in that direction, e.g. to look around the corner, then an appropriate further version would have been rendered.

Additionally or alternatively, as already mentioned, the number of further versions and/or the further points in time, and/or viewpoints and/or view directions (view (head) orientations (poses)) that one or more of the one or more further versions are rendered based on may be varied, depending on timing and/or processing capabilities, e.g. of the graphics processing unit (GPU) and/or overall graphics processing system. For example, the number of rendered further versions of the first frame may be reduced when processing capabilities of the graphics processing system would otherwise be exceeded.

Thus, according to an embodiment, a further point in time, and/or viewpoint and/or view direction that a (and in an embodiment each) of the one or more further versions of the first frame is rendered based on is selected based on at least one of: (i) one or more properties of a (group of) object(s) determined to be close to the first viewpoint and/or moving; (ii) received view (head) orientation (pose) data; (iii) information provided by an application that the first frame is being rendered for; and (iv) a processing capability of the graphics processing system.

It will be appreciated, as discussed above, that there may be a first frame (and respective further version(s)) rendered for each eye. Thus, according to an embodiment, a first frame and at least one further version of the first frame are rendered for an (and in an embodiment each) eye (before an (the) output frame is generated for the (each) eye). Thus, according to an embodiment, at least three different views of the scene are rendered, e.g. and in an embodiment, (at least) a first (application) frame for a first eye, another (application) frame for the other eye, and at least one further version of the first or another frame.

In this regard, the Applicants have recognised that in some situations, it may be possible to use data rendered for one eye for the other eye, and thereby save processing that would otherwise be required. For example, rendered data from the first frame and/or from one or more of the one or more further versions rendered for one eye may be used as rendered data for a first frame and/or for one or more further versions for the other eye. This may be possible, for example, where the (point in time) viewpoint and view direction that data for one eye is rendered based on is the same as (or (sufficiently) similar to) the (point in time) viewpoint and view direction that data for the other eye is to be rendered based on.

Thus, according to an embodiment, the method comprises (and the system is configured to) recognising when the (point in time) viewpoint and view direction that data for a first eye is rendered based on is the same as (or similar to) the (point in time) viewpoint and view direction that data for the other eye is to be rendered based on, and when it is recognised that the (point in time) viewpoint and view direction that the data for the first eye is rendered based on is the same as (or similar to) (the point in time) viewpoint and view direction that the data for the other eye is to be rendered based on, omitting rendering the data for the other eye, and using the data rendered for the first eye for the other eye instead.

In another example, and in an embodiment, one or more (and in an embodiment each) of the one or more further versions of the first frame are rendered and/or stored (in (the) memory) at a lower (image) quality to the first frame, e.g. so that the processing and/or storage required to render and/or store and/or process the further versions is reduced as compared to rendering and/or storing the further versions at the same (image) quality as the first frame. For example, a (each) further version is in an embodiment rendered at a lower resolution (with fewer data elements (per image area)) to the first frame. Additionally or alternatively, a (each) further version is in an embodiment rendered at a lower (colour) precision (bit depth) to the first frame. Similarly, in another embodiment, a (each) further version is in an embodiment initially rendered at the same or lower (image) quality (e.g. the same or lower resolution and/or precision) to the first frame, but then compressed to a greater degree than the first frame, in an embodiment using a lossy compression scheme, e.g. such that the further version(s) is stored in (the) memory at a relatively lower (image) quality to the first frame.

Additionally or alternatively, further versions of the first frame are in an embodiment updated less frequently (by the graphics processing unit (GPU)) than (at a lower rate to) the first frame, e.g. so that a further version of the first frame is available to be used to generate more output frames for display than the first frame. Thus, in an embodiment, the method comprises (and the system is configured to) updating the first frame at a first rate; and updating one or more (and in an embodiment each) of the one or more further versions of the first frame at a second rate; wherein the second rate is lower (slower) than the first rate. Thus, in an embodiment, one or more (and in an embodiment each) of the one or more further versions of the first rendered (application) frame are in an embodiment re-used as a further version of another (e.g. the next) (application) frame.

In another example, and in an embodiment, one or more (and in an embodiment each) of the one or more further versions of the first frame correspond to (only) a region of the first (application) frame, e.g. and in an embodiment, a region of the first (application) frame that contains a close and/or moving object.

The Applicants have recognised that by rendering (only) a region of the first (application) frame (e.g. that contains a close and/or moving object), the additional processing required to render the further (additional) version can be limited to regions of the first (application) frame that are more likely to suffer from artefacts and distortions, e.g. regions containing objects that are close to the camera (to the viewpoint) and/or moving.

Thus, in an embodiment, one or more (and in an embodiment each) of the one or more further versions of the first frame correspond to a region of the first frame, in an embodiment containing an (the) (group of) object(s) determined to be close to the first viewpoint and/or an (the) (group of) object(s) determined to be moving.

In this case, a (and each) region of the first frame (containing the (group of) object(s) determined to be close to the first viewpoint and/or moving) that a (respective) further version(s) of the first frame is re-rendered for can be determined as desired. There may be one or more such regions for re-rendering. For example, there may be a single region, with all of the one or more further versions of the first frame being re-rendered for the same single region, or each further version of the first frame may be re-rendered for a different region.

Where only a single object in the first view represented by the first frame is determined to be close to the first viewpoint and/or moving, then only a single region of the first frame containing the single object may be determined (for re-rendering each, some or all of the one or more further versions).

Where there are plural objects that have been determined to be close to the first viewpoint and/or moving, however, then a respective region for re-rendering may be determined for each of the plural determined objects (for each, some or all of the one or more further versions). In this case, there would be plural regions for re-rendering, each containing a single object of plural objects determined to be close to the first viewpoint and/or moving (for each, some or all of the one or more further versions).

Alternatively, objects may be grouped into one or more groups each including one or more objects, e.g. based on their spatial proximity to each other (e.g. as described above), and a respective region for re-rendering may be determined for each respective group of the plural determined objects (for each, some or all of the one or more further versions). In this case, there would be one or more regions for re-rendering, each containing one or more grouped objects of plural objects determined to be close to the first viewpoint and/or moving (for each, some or all of the one or more further versions).

Alternatively, a single region for re-rendering may be determined that contains all of the plural objects determined to be close to the first viewpoint and/or moving (for each, some or all of the one or more further versions).

As already mentioned, a (and in an embodiment each) region for re-rendering may cover some or all of the first frame. For example, in one embodiment, a single region for re-rendering covering the entire first frame (and containing (all of) the close and/or moving object(s)) is determined, such that the (and each) further version is re-rendered with the same size as the first frame. In another embodiment, a (and in an embodiment each) region for re-rendering covers only a portion of the first frame, such that the (and each) respective further version is smaller than the first frame (includes only some but not all of the first frame).

Where a (and each) region for re-rendering covers only a portion of the first frame, then the portion of the first frame that the (and each) region covers in an embodiment contains (some or all of) a (and each) respective close and/or moving object, and can otherwise be determined as desired.

For example, the (and each) region for re-rendering could overlap with another one or more regions, or not, as desired. The (and each) region may match the shape of a (and each) respective close and/or moving object that the (and each)

region contains as it appears in the first frame exactly, or could include a margin if desired.

In an embodiment, the (and each) region for re-rendering may be determined by determining a (in an embodiment rectangular) bounding box that surrounds the (and each respective) object determined to be close to the first viewpoint and/or moving. Such a bounding box may be a minimum bounding box or could include a margin if desired, e.g. and in an embodiment, in a direction that the respective further view orientation (pose) represents a head or display movement (rotation and/or translation) in.

As already mentioned, a (and each) region for re-rendering could contain some or all of the (and each respective) object, as desired. In this regard, the Applicants have recognised that it may be desirable to minimise the processing required to render the (and each) further version, and that this may be achieved by minimising the size of the (and each) region for re-rendering. They have further recognised that while re-rendering larger regions may result in improved image quality, the minimum size of a region for which a respective further version should be rendered in order to reduce the likelihood of the most severe artefacts and distortions when performing "timewarp" and/or "spacewarp" processing corresponds to a close and/or moving object(s) and the regions of the scene that are "disoccluded" by it, i.e. regions of the scene that lie behind (and at a greater depth to) the close and/or moving object(s) in the first view of the scene that the first (application) frame represents such that they are occluded in the first view of the scene, but that (due to parallax effects and/or object movement) are not occluded by the close and/or moving object(s) and so become visible in the respective further view of the scene that the respective further version represents, because it is such regions of the scene which may otherwise be significantly distorted by "timewarp" and/or "spacewarp" processing, e.g. because rendered data for those regions is entirely missing from the first (application) frame. Thus, the (and each) region for re-rendering in an embodiment corresponds to (only) such regions of the scene, so that the (and each) respective further version is in an embodiment rendered for (only) such regions of the scene.

Thus, a (and each) region of the first frame containing a (group of) object(s) determined to be close to the first viewpoint and/or moving that a respective further version of the first frame is re-rendered for is in an embodiment determined as (to be) a region of the scene that contains (all of) the (group of) object(s) determined to be close to the first viewpoint and/or moving, and a part (region) of the scene that is occluded by the (group of) object(s) determined to be close to the first viewpoint and/or moving in the first view of the scene that the first frame represents, but that is not occluded by the (group of) object(s) in the respective further view of the scene that the respective further version represents.

Thus, in an embodiment, the method comprises (and the system is configured to): for at least one (and in an embodiment each) of the one or more further versions: determining a region of the scene that contains a (group of) object(s) determined to be close to the first viewpoint and/or moving, and a part of the scene that is occluded by the (group of) object(s) determined to be close to the first viewpoint and/or moving in the first view of the scene that the first frame represents, but that is not occluded by the (group of) object(s) in a respective further view of the scene that the respective further version represents; and rendering the respective further version for only (some but not all of the first frame based on) the respective determined region of the scene.

It is believed that the idea of determining whether a view of a scene contains close and/or moving objects, and then rendering further versions of regions of the scene containing the close and/or moving objects is novel and inventive in its own right.

Thus, a seventh embodiment of the technology described herein comprises a method of operating a graphics processing system that renders frames each representing a view of a scene of one or more objects, and generates output frames for display from rendered frames by transforming rendered frames based on received view orientation data and/or object motion, the method comprising:

rendering a first frame representing a first view of a scene from a first viewpoint based on a first view orientation;

determining whether an object in the first view of the scene is close to the first viewpoint; and when it is determined that an object in the first view of the scene is close to the first viewpoint:

for each of one or more further view orientations relative to the first view orientation, rendering a respective further version of a respective region of the first frame containing the object determined to be close to the first viewpoint.

An eighth embodiment of the technology described herein comprises a graphics processing system configured to render by processing circuitry frames each representing a view of a scene of one or more objects, and generate by processing circuitry output frames for display from rendered frames by transforming rendered frames based on received view orientation data and/or object motion;

wherein the graphics processing system is further configured to, for a first rendered frame representing a first view of a scene from a first viewpoint based on a first view orientation:

determine by processing circuitry whether an object in the first view of the scene is close to the first viewpoint; and when it is determined that an object in the first view of the scene is close to the first viewpoint:

for each of one or more further view orientations relative to the first view orientation, render by processing circuitry a respective further version of a respective region of the first frame containing the object determined to be close to the first viewpoint.

A ninth embodiment of the technology described herein comprises a method of operating a graphics processing system that renders frames each representing a view of a scene of one or more objects, transforms those rendered frames based on received head orientation data, and provides the so-transformed frames for display, the method comprising:

rendering a first frame representing a first view of a scene from a first viewpoint based on a first head orientation;

determining whether an object in the first view of the scene is close to the first viewpoint; and when it is determined that an object in the first view of the scene is close to the first viewpoint:

for each of one or more further head orientations relative to the first head orientation, rendering a respective further version of a respective region of the first frame containing the object determined to be close to the first viewpoint.

A tenth embodiment of the technology described herein comprises a graphics processing system comprising:

processing circuitry configured to render frames each representing a view of a scene of one or more objects, transform those rendered frames based on received head orientation data, and provide the so-transformed frames for display; and processing circuitry configured to:

determine, for a first rendered frame representing a first view of a scene from a first viewpoint based on a first head orientation, whether an object in the first view of the scene is close to the first viewpoint; and when it is determined that an object in the first view of the scene is close to the first viewpoint:

cause the graphics processing system to, for each of one or more further head orientations relative to the first head orientation, render a respective further version of a respective region of the first frame containing the object determined to be close to the first viewpoint.

An eleventh embodiment of the technology described herein comprises a method of operating a graphics processing system that renders frames each representing a view of a scene of one or more objects, and generates output frames for display from rendered frames by transforming rendered frames based on received view orientation data and/or object motion, the method comprising:

rendering a first frame representing a first view of a scene at a first point in time;

determining whether an object in the first view of the scene is moving; and when it is determined that an object in the first view of the scene is moving:

for each of one or more further points in time, rendering a respective further version of a respective region of the first frame containing the object determined to be moving.

A twelfth embodiment of the technology described herein comprises a graphics processing system configured to render by processing circuitry frames each representing a view of a scene of one or more objects, and generate by processing circuitry output frames for display from rendered frames by transforming rendered frames based on received view orientation data and/or object motion;

wherein the graphics processing system is further configured to, for a first rendered frame representing a first view of a scene at a first point in time:

determine by processing circuitry whether an object in the first view of the scene is moving; and when it is determined that an object in the first view of the scene is moving:

for each of one or more further points in time, render by processing circuitry a respective further version of a respective region of the first frame containing the object determined to be moving.

As will be appreciated by those skilled in the art, these aspects and embodiments of the technology described herein can and in an embodiment do include one or more, and in an embodiment all, of the optional features of the technology described herein, as appropriate.

Thus, for example, in these aspect and embodiments an (the) output frame is in an embodiment generated for display using rendered data from the rendered first frame and/or rendered data from one or more of the one or more rendered further versions of the first frame.

The output frame should represent an output version of the first frame and should be generated after the first frame, and the one or more further versions of the first frame have been rendered, using rendered data from the rendered first frame and/or rendered data from one or more of the one or more rendered further versions of the first frame.

The output frame can be generated in any suitable and desired manner. The output frame is in an embodiment generated by an output frame generating circuit of a graphics processing unit (GPU) (a graphics processor) of the graphics processing system, but it could also or instead be generated or provided by (an output frame generating circuit of) another component or components of the graphics processing system, such as a CPU or a video processor, if desired.

In an embodiment, the output frame is generated by subjecting the first frame and/or the one or more of the one or more further versions of the first frame to a transformation, e.g. and in an embodiment (three or six degrees of freedom (DOF)) "timewarp" processing, to generate a transformed ("timewarped") output frame (image) that may be provided for display (by a (or the) display controller of the graphics processing system). The transformation may also or instead include a lens distortion correction transformation, a chromatic aberration (distortion) correction transformation, a "spacewarp" transformation (extrapolation) and/or another suitable transformation.

The transformation may be performed in any suitable and desired manner. The transformation (e.g. "timewarp" and/or "spacewarp" processing) is, in an embodiment, performed by (an output frame generating circuit of) the graphics processing unit (GPU), a (or the) display controller or a dedicated image processor of the graphics processing system.

The output (transformed) frame (image) may comprise an array of data elements (sampling positions) (e.g. pixels), for each of which appropriate data (e.g. a set of colour values) is generated (by the transformation (e.g. "timewarp" and/or "spacewarp" processing)).

The output (transformed) frame (image) may be stored in (written to) memory for subsequent use as desired. For example, the output (transformed) frame (image) may be stored in a frame buffer in memory, from where it can then be read for further processing and/or for display by a (or the) display controller. Such a memory may comprise any suitable memory and may be configured in any suitable and desired manner. For example, it may be a memory that is on chip with the graphics processing unit (GPU) or it may be an external memory. In an embodiment it is an external memory, such as a main memory of the graphics processing system. It may be dedicated memory for this purpose or it may be part of a memory that is used for other data as well.

The output (transformed) frame (image) may be stored in a different memory to the first frame and/or the further version(s). However, in an embodiment, the output (transformed) frame (image) is stored in the same memory as the first frame and/or the further version(s).

Where no further versions of the first frame are re-rendered (for example, where it is not determined that an object in the first view of the scene is close to the first viewpoint and/or where it is determined that rendering the further version(s) would exceed a processing limit of the graphics processing system), then the output frame may be generated from rendered data from the first frame alone, e.g. by transforming the first frame (e.g. by "timewarp" and/or "spacewarp" processing, e.g. in the conventional manner, as described above).

Thus, in this case, the first frame is in an embodiment transformed (by "timewarp" processing) based on (second) view (head or display) orientation (pose) data (sensed by the (one or more sensors of the) (virtual reality (VR) and/or augmented reality (AR)) (head mounted) display system), that is in an embodiment sensed at a second point in time, after the first frame is rendered, and that in an embodiment represents a second view (head or display) orientation (pose) of a user of the (virtual reality (VR) and/or augmented reality (AR)) (head mounted) display system (after the first frame is rendered).

The so-transformed (so-"timewarped") output frame thus in an embodiment represents a view of the scene based on the (sensed) second view (head or display) orientation (pose), and is in an embodiment provided for display (to a (head mounted) display of the (virtual reality (VR) and/or augmented reality (AR)) (head mounted) display system), in an embodiment by a (or the) display controller of the graphics processing system.

Where a further version (or versions) (of a region) of the first frame is rendered, however, then there will be rendered source data for the first frame, together with rendered source data for the (and each) rendered further version (of a respective region) of the first frame. Thus, there may be regions for which plural versions of the frame have been rendered. In this case, the rendered source data to use to generate the output frame (for display) is in an embodiment selected from the rendered source data for the first frame and the rendered source data for the further version(s).

Selecting the rendered source data to use to generate the output frame from the rendered source data for the first frame and the rendered source data for the further version(s) can be performed in any suitable and desired manner. The selection may be performed, for example, by the graphics processing unit (GPU), the display controller or a dedicated image processor of the graphics processing system.

In an embodiment, the rendered source data to use to generate the output frame is selected based on a (or the) second view (head or display) orientation (pose) that in an embodiment represents a view (head or display) orientation (pose) of the user of the (virtual reality (VR) and/or augmented reality (AR)) (head mounted) display system after rendering of the first (application) frame (and the (and each) further version), at the second point in time. The second view (head or display) orientation (pose) is in an embodiment a sensed view (head or display) orientation (pose), in an embodiment sensed by the (one or more sensors of the) (virtual reality (VR) and/or augmented reality (AR)) (head mounted) display system (after the first frame (and the (and each) further version) is rendered) at the second point in time.

Additionally or alternatively, in an embodiment, the rendered source data to use to generate the output frame is selected based on the (second) point in time at which the output frame is to represent a view of the scene at, e.g. the (second) point in time at which the second view (head or display) orientation (pose) is sensed.

In an embodiment, the rendered source data to use to generate the output frame is selected by selecting rendered source data (from the first frame and/or one or more of the one or more further versions) that has been rendered based on a view (head or display) orientation (pose) that is closest to the (actual) (sensed) second view (head or display) orientation (pose). Additionally or alternatively, in an embodiment, the rendered source data to use to generate the output frame is selected by selecting rendered source data (from the first frame and/or one or more of the one or more further versions) that has been rendered based on a (further) point in time that is closest to the (actual) (second) point in time at which the output frame is to represent a view of the scene at (at which the second view (head or display) orientation (pose) is sensed).

Where, a (and each) further version is re-rendered with the same size as the first frame (e.g. where a (and each) region for re-rendering covers all of the first frame), then selecting the rendered source data to use to generate the output frame may comprise selecting source data from one of the rendered first frame and the rendered further version(s) to use in its entirety. Thus the selection may be, e.g., performed in respect of the entire frame, and the selected rendered source data may comprise source data from (only) one of the rendered first frame and the rendered further version(s).

Where, however, a (and each) region for re-rendering covers only a portion of the first frame, such that the (and each) (respective) further version is smaller than the first frame, then the selection may comprise selecting the rendered source data to use for display from the rendered source data for the first frame and the rendered source data for the (respective) further version(s) in respect of (only) the portion(s) of the first frame for which a respective further version(s) is re-rendered, and (otherwise) selecting source data from the first frame in respect of portion(s) of the first frame for which a further version(s) is not re-rendered. In this case, the selected rendered source data may comprise (a mixture of) source data from one or more of the rendered first frame and the rendered further version(s).

Thus, in this case, the selected rendered source data may then be transformed (by "timewarp" processing) based on a (or the) second view (head or display) orientation (pose) to generate a (the) output, transformed ("timewarped") frame (image) for display. The second view (head or display) orientation (pose) in an embodiment represents a (second) view (head or display) orientation (pose) of the user of the (virtual reality (VR) and/or augmented reality (AR)) (head mounted) display system after rendering of the first (application) frame (and the (and each) further version) (at the second point in time), and is in an embodiment sensed by the (one or more sensors of the) (virtual reality (VR) and/or augmented reality (AR)) (head mounted) display system (after the first frame (and the (and each) further version) is rendered).

The so-transformed (so-"timewarped") output frame thus in an embodiment represents a view of the scene based on the (sensed) second view (head or display) orientation (pose), and is in an embodiment provided for display (to a (head mounted) display of the (virtual reality (VR) and/or augmented reality (AR)) (head mounted) display system), in an embodiment by a (or the) display controller of the graphics processing system.

Additionally or alternatively, generating the output frame may include a transformation (extrapolation) based on object motion (e.g. "spacewarp" processing) to generate the output, extrapolated ("spacewarped") frame (image) for display. In this case, the output frame in an embodiment represents an extrapolated ("spacewarped") version of the first (rendered) (e.g. application) frame, and should show moving objects at expected e.g. positions extrapolated forward in time to the (second) point in time that the output frame represents a view of the scene at. Thus, in this case, the output frame in an embodiment represents a view of the scene at the second point in time (that the second view orientation (pose) is sensed at).

Thus, in an embodiment, the method comprises (and the system is configured to) selecting, based on received (second) view (head or display) orientation data and/or a second point in time, rendered data to use to generate the output frame from at least one of: (i) rendered data for the first frame; and (ii) rendered data for one or more of the one or more further versions of the first frame.

Thus, in an embodiment generating the output frame comprises selecting rendered data from the first frame and/or one or more of the one or more further versions, and then combining the selected rendered data appropriately to generate the output frame.

It is believed that the idea of selecting rendered source data for display from different rendered views of a scene in this manner is novel and inventive in its own right.

Thus, a further embodiment of the technology described herein comprises a method of generating an output frame for display for a display system, the method comprising:

receiving view orientation data sensed by the display system; and selecting, based on the received view orientation data, rendered data to use to generate the output frame from at least one of:
(i) rendered data for a first frame rendered based on a first point in time and/or first view orientation; and
(ii) rendered data for one or more further versions of the first frame each rendered based on a further point in time and/or view orientation.

Another embodiment of the technology described herein comprises a display system comprising:

view orientation sensing circuitry operable to sense a view orientation of a user of the display system and to provide view orientation data indicative of a sensed view orientation; and processing circuitry configured to select, based on view orientation data provided by the view orientation sensing circuitry, rendered data to use to display an output frame from at least one of:
(i) rendered data for a first frame rendered based on a first point in time and/or first view orientation; and
(ii) rendered data for one or more further versions of the first frame each rendered based on a further point in time and/or view orientation.

A further embodiment of the technology described herein comprises a method of providing an output frame for display for a head mounted display system, the method comprising:

receiving head orientation data sensed by the head mounted display system; and selecting, based on the received head orientation data, rendered data to use to display the output frame from at least one of:
(i) rendered data for a first frame rendered based on a first head orientation; and
(ii) rendered data for one or more further versions of the first frame each rendered based on a further head orientation.

Another embodiment of the technology described herein comprises a head mounted display system comprising:

head orientation sensing circuitry operable to sense a head orientation of a user of the head mounted display system and to provide head orientation data indicative of a sensed head orientation; and processing circuitry configured to select, based on head orientation data provided by the head orientation sensing circuitry, rendered data to use to display an output frame from at least one of:
(i) rendered data for a first frame rendered based on a first head orientation; and
(ii) rendered data for one or more further versions of the first frame each rendered based on a further head orientation.

As will be appreciated by those skilled in the art, these aspects and embodiments of the technology described herein can and in an embodiment do include one or more, and in an embodiment all, of the optional features of the technology described herein, as appropriate.

Thus, for example, the first frame may be rendered based on a first view (head or display) orientation (pose) sensed (at the first point in time) at the beginning of rendering the first frame, the one or more further versions may each be rendered based on a further view (head or display) orientation representing a predicted or assumed (head or display) movement (rotation and/or translation) relative to the first view (head or display) orientation (pose), the rendered data to use to generate the output frame may be selected based on the received (second) view (head or display) orientation (pose) data that is sensed (at a second point in time) after the rendering of the first frame, and the selected rendered data may be subjected to a transformation (e.g. "timewarp" processing) based on (the) received (second) view (head or display) orientation (pose) data to provide an output, transformed ("timewarped") frame (image) for display, which may be displayed (on a display).

Correspondingly, the method in an embodiment comprises (and the system in an embodiment comprises processing circuitry configured to) displaying (on a display) an (the) output frame using (and comprising) the selected rendered data.

It will be appreciated that although the technology described herein has been described herein with particular reference to a single first frame, there may be plural first frames (e.g. an animated sequence of plural first frames). Each such first frame may represent a respective view of a respective scene from a respective viewpoint in a respective view direction (based on a respective (first) view (head or display) orientation (pose)), and one or more respective further versions (of a respective region of some or all) of such first frames may be rendered.

Furthermore, it will be appreciated, as discussed above, that there may be a first frame (and respective further version(s)) rendered for each eye, and a respective output (transformed) frame (or frames) may be displayed to each eye appropriately so as to provide a three-dimensional effect when the images are viewed.

As will be appreciated from the above, the technology described herein is in an embodiment implemented in and as part of an overall graphics processing system that includes one or more of: a host processor (central processing unit (CPU)), a graphics processing unit, a display controller, a video processor (codec), a system bus, and a memory controller. The processing circuitry may, e.g., form part of the graphics processing unit, the display controller and/or another suitable component of the graphics processing system, e.g. as described above, or may otherwise be provided in the graphics processing system. It may comprise programmable and/or fixed function processing circuitry, and/or may comprise dedicated processing circuitry and/or processing circuitry used for other processing as well, as desired.

The host processor may execute applications that can require graphics processing by the graphics processing unit, and send appropriate commands and data to the graphics processing unit to control it to perform graphics processing operations and to produce graphics processing (render)

output required by applications executing on the host processor (including in the manner of the technology described herein).

To facilitate this, the host processor should, and in an embodiment does, also execute a driver for the graphics processing unit and a compiler or compilers for compiling shader programs to be executed by programmable shading stages of the graphics processing unit (which compiler may be, and in an embodiment is, a part of the driver).

Thus in an embodiment, the graphics processing unit is in communication with a host microprocessor (that is part of the overall graphics processing system) that executes a driver for the graphics processing unit and/or a compiler or compilers for the graphics processing unit.

Similarly, there is in an embodiment an application on the host processor that indicates a requirement for performing processing operations in the manner of the technology described herein, which requirement is then recognised by, e.g., the driver executing on, the host processor, with the, e.g. driver on, the host processor then operating to instruct the graphics processing unit to render data accordingly.

The graphics processing unit and/or host microprocessor are in an embodiment also in communication with a (head mounted) display for displaying the images generated by the graphics processing unit (thus in an embodiment the graphics processing system further comprises a display for displaying the images generated by the graphics processing unit) (e.g. via the display controller).

Similarly, the graphics processing system in an embodiment has or is in communication with a memory in which images generated by the graphics processing unit may be stored, e.g. for subsequent processing, e.g. display (e.g. via the memory controller). Thus, in an embodiment, the graphics processing system and/or unit comprises, and/or is in communication with, one or more memories and/or memory devices that store the data described herein, and/or that store software for performing the processes described herein (e.g. via the memory controller).

The graphics processing unit can include, and in an embodiment does include, any one or more, and in an embodiment all, of the processing stages that a graphics processing unit can normally include. Thus, for example, the graphics processing unit in an embodiment includes a primitive setup stage, a rasteriser and a renderer. In an embodiment the renderer is in the form of or includes a programmable fragment shader.

The graphics processing unit is in an embodiment a tile-based graphics processing unit comprising a tile buffer for storing tile sample values and/or a write out unit that operates to write the data in the tile buffer (e.g. once the data in the tile buffer is complete) out to external (main) memory (e.g. to a frame buffer).

It will be appreciated by those skilled in the art that all of the described aspects and embodiments of the technology described herein can, and in an embodiment do, include, as appropriate, any one or more or all of the features described herein.

The technology described herein can be implemented in any suitable system, such as a suitably configured microprocessor based system. In an embodiment, the technology described herein is implemented in a computer and/or micro-processor based system.

The technology described herein is in an embodiment implemented in a portable device, such as, and in an embodiment, a mobile phone or tablet. The technology described herein is in an embodiment implemented in a virtual reality and/or augmented reality display device such as, and in an embodiment, a virtual reality and/or augmented reality headset. Thus, another embodiment of the technology described herein comprises a virtual reality and/or augmented reality display device comprising the graphics processing system of any one or more of the embodiments of the technology described herein. Correspondingly, another embodiment of the technology described herein comprises a method of operating a virtual reality and/or augmented reality display device, comprising operating the virtual reality and/or augmented reality display device in the manner of any one or more of the embodiments of the technology described herein.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extend to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, nontransitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

An embodiment of the technology described herein relates to providing frames (images) for display for a virtual reality (VR) and/or augmented reality (AR) head mounted display (HMD) system.

Such a system may be configured as shown in FIG. 1 (and described above), with the display 8 of the system comprising an appropriate head mounted display that includes, inter alia, a display screen or screens (panel or panels) for displaying frames to be viewed by a user wearing the head mounted display, one or more lenses in the viewing path between the user's eyes and the display screens, and one or more sensors for tracking the position (orientation (pose)) of the user's head (and/or their view (gaze) direction) in use (while images are being displayed on the display to the user).

Figure 5:
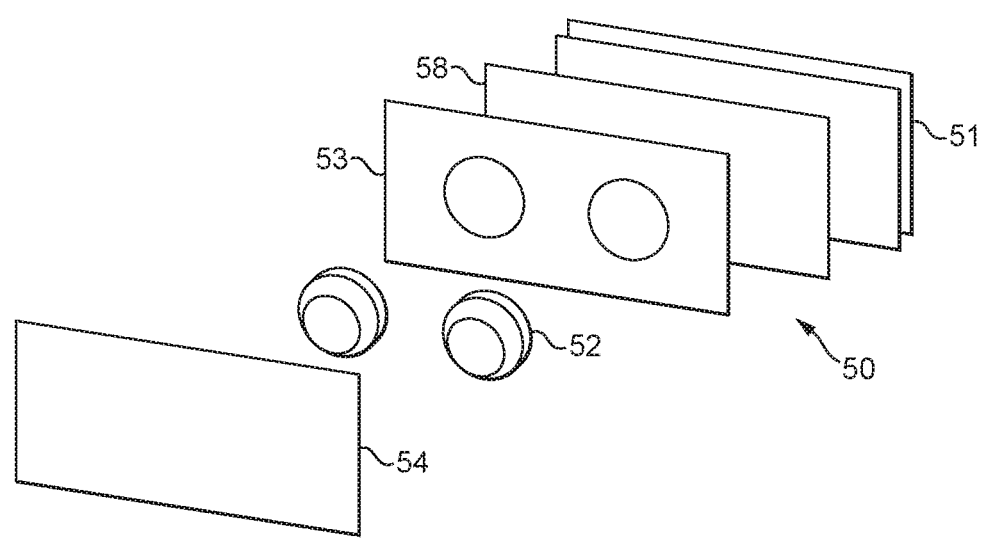
FIG. 5 shows schematically an exemplary virtual reality head mounted display headset.

FIG. 5 shows schematically an exemplary virtual reality (VR) head mounted display 50. As shown in FIG. 5, the head mounted display 50 comprises, for example, an appropriate display mount 51 that includes one or more head pose (orientation) tracking sensors, to which a display screen (panel) 58 is mounted. A pair of lenses 52 are mounted in a lens mount 53 in the viewing path of the display screen 58. Finally, there is an appropriate fitting 54 for the user to wear the headset.

In the system shown in FIG. 1, images to be displayed on the head mounted display 8 will be, e.g., rendered by the graphics processing unit (GPU) 2 in response to requests for such rendering from an application executing on a host processor (CPU) 1 of the graphics processing system and store those frames in the main memory 7. The display controller 4 may then read the frames from memory 7 and provide those frames appropriately to the head mounted display 8 for display to the user.

The graphics processing unit (GPU) 2 may render a frame (image) for display for each eye: one image representing a scene as seen from the left eye, and one image representing the scene as seen from the right eye. The images may then be displayed to each eye appropriately using the head mounted display 8 so as to provide a three-dimensional effect when the images are viewed.

As discussed above, it would be possible for the graphics processing unit (GPU) 2 of the graphics processing system 10 to directly render each frame for display on the head mounted display 8 based on the user's head orientation (pose) sensed at the start of rendering a frame. However, because of various latencies in the rendering process, it can be the case that the user's head orientation (pose) has changed between the sensing of the head orientation (pose) at the beginning of the rendering of the frame and the time when the frame is actually displayed on the display 8. Moreover, it is typically desirable to update the display 8 at a rate that is faster than the graphics processing unit (GPU) 2 is able to render frames at, e.g., to avoid "judder" artefacts.

To account for this, the graphics processing system 10 may perform so called "timewarp" processing on the frames rendered by the graphics processing unit (GPU) 2 before providing those frames to the display 8 for display to a user.

As discussed above, in "timewarp" processing, rather than the graphics processing unit (GPU) 2 directly rendering each frame (image) to be displayed on the head mounted display 8, an "application" frame is first rendered by the graphics processing unit (GPU) 2 based on the head orientation (pose) data sensed at the beginning of the graphics processing unit (GPU) 2 rendering the application frame. But then before an image is actually displayed on the display 8, further head orientation data is sensed, and that updated head orientation sensor data is used transform the graphics processing unit (GPU) 2 rendered application frame to generate an "updated" version of the application frame that takes account of the updated head orientation (pose) data. The so-"timewarped" updated version of the application frame is then displayed on the head mounted display 8.

Figure 4:
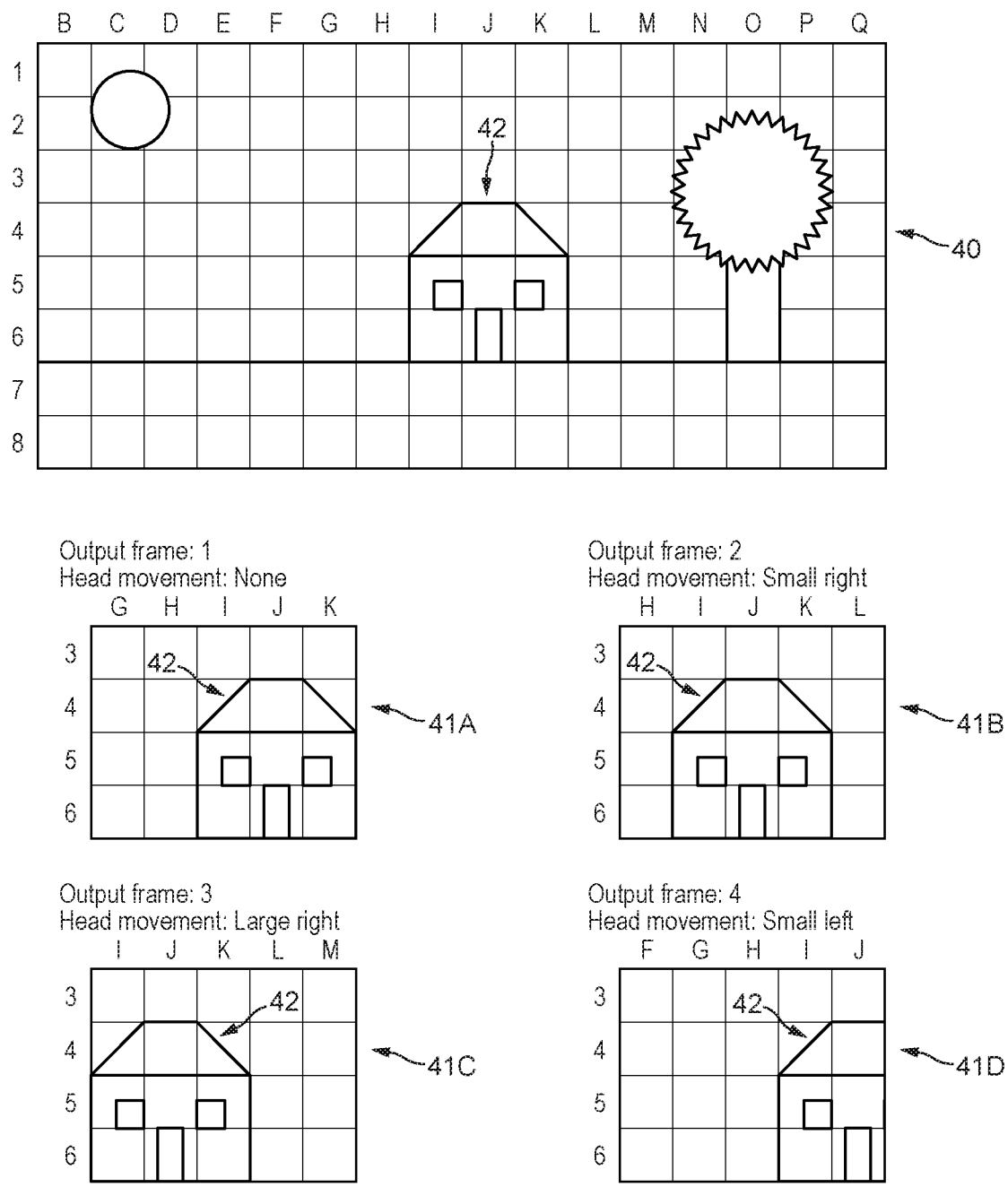
FIG. 4 illustrates an exemplary rendered "application" frame together with exemplary "timewarped" versions of that frame.

FIG. 4 shows a schematic illustration of an exemplary graphics processing unit (GPU) 2 rendered application frame 40 representing a view of a scene comprising a number of objects including house 42. In this example, application frame 40 is subjected to four "timewarp" processes to generate four respective output "timewarped" frames 41A-D which may be displayed at successive time intervals while a new application frame is being rendered by the graphics processing unit (GPU) 2. The new application frame may then be subjected to four further "timewarp" processes, and so on.

It will be appreciated, therefore, that in the present example, "timewarp" processing is performed at a rate (such as 120 frames per second) that is four times faster than the graphics processing unit (GPU) 2 renders applications frames at (such as 30 frames per second). This can help to reduce "judder" artefacts and provide a smoother virtual reality (VR) or augmented reality (AR) experience, for example.

As shown in FIG. 4, in this example, application frame 40 represents a 16×8 square field of view of the scene (columns B to Q, and rows 1 to 8) that is wider (in both dimensions) than the 5×4 square field of view of the "timewarped" frames 41A-D that are actually displayed to the user. This ensures that graphics processing unit (GPU) 2 rendered application frame data is available to be "timewarped" for a wide range of possible head movements (e.g. rotations and/or translations).

In the example of FIG. 4, head orientation (pose) data is sensed (at a first point in time), and then the graphics processing unit (GPU) 2 renders the application frame 40 based on this head orientation (pose) data. Then, before an image is actually displayed on the head mounted display 8, further head orientation (pose) data is sensed (at a second, later point in time) and used to transform the application frame 40 to generate a first "timewarped" frame 41A for display.

As shown in FIG. 4, the further head orientation (pose) data indicates that no change in the user's head orientation has occurred since the original head orientation (pose) data was sensed at the beginning of the graphics processing unit (GPU) 2 rendering the application frame 40. First "timewarped" frame 41A therefore simply represents an appropriate window ("letterbox") (in this example, columns G to K, and rows 3 to 6) taken from the wider field of view of the application frame 40, and no "timewarp" transformation has been performed.

After the (first) further head orientation (pose) data is sensed, second further head orientation (pose) data is sensed and used to transform the application frame 40 again to generate a second "timewarped" frame 41B for display.

In the present example, as shown in FIG. 4, the second further head orientation (pose) data indicates that the user's head has made a small movement (e.g. rotation and/or translation) to the right, compared to when the original head orientation (pose) data was sensed at the beginning of the graphics processing unit (GPU) 2 rendering the application frame 40. Second "timewarped" frame 41B therefore represents an appropriate window ("letterbox") taken from the wider field of view of the application frame 40, but has been subjected to a "timewarp" transformation such that, compared to first "timewarped" frame 41A where no head movement was detected, column L of application frame 40 has become visible, while column G is no longer visible. The effect of this is that object 42 appears shifted to the left in the second "timewarped" frame 41B (compared to the first "timewarped" frame 41A) as a result of the small right head movement.

Third (41C) and then fourth (41D) "timewarped" frames are then generated in a similar manner, i.e. each based on updated further head orientation (pose) data. Thus, as shown in FIG. 4, when a larger head movement to the right is detected compared to the "original" head orientation, object 42 appears shifted farther to the left in "timewarped" frame 41C; and when a head movement to the left is detected compared to the "original" head orientation, object 42 appears shifted to the right in "timewarped" frame 41D (compared to the first "timewarped" frame 41A where no head movement was detected).

It will be appreciated that, in the case that an upwards head movement (rotation and/or translation) (relative to the original head orientation) were to be detected, object 42 would appear to shift downwards in an output "timewarped" frame; in the case that a downwards head movement (rotation and/or translation) (relative to the original head orientation) were to be detected, object 42 would appear to shift upwards in the respective output "timewarped" frame (compared to the first "timewarped" frame 41A where no head movement was detected); and so forth.

Figure 6:
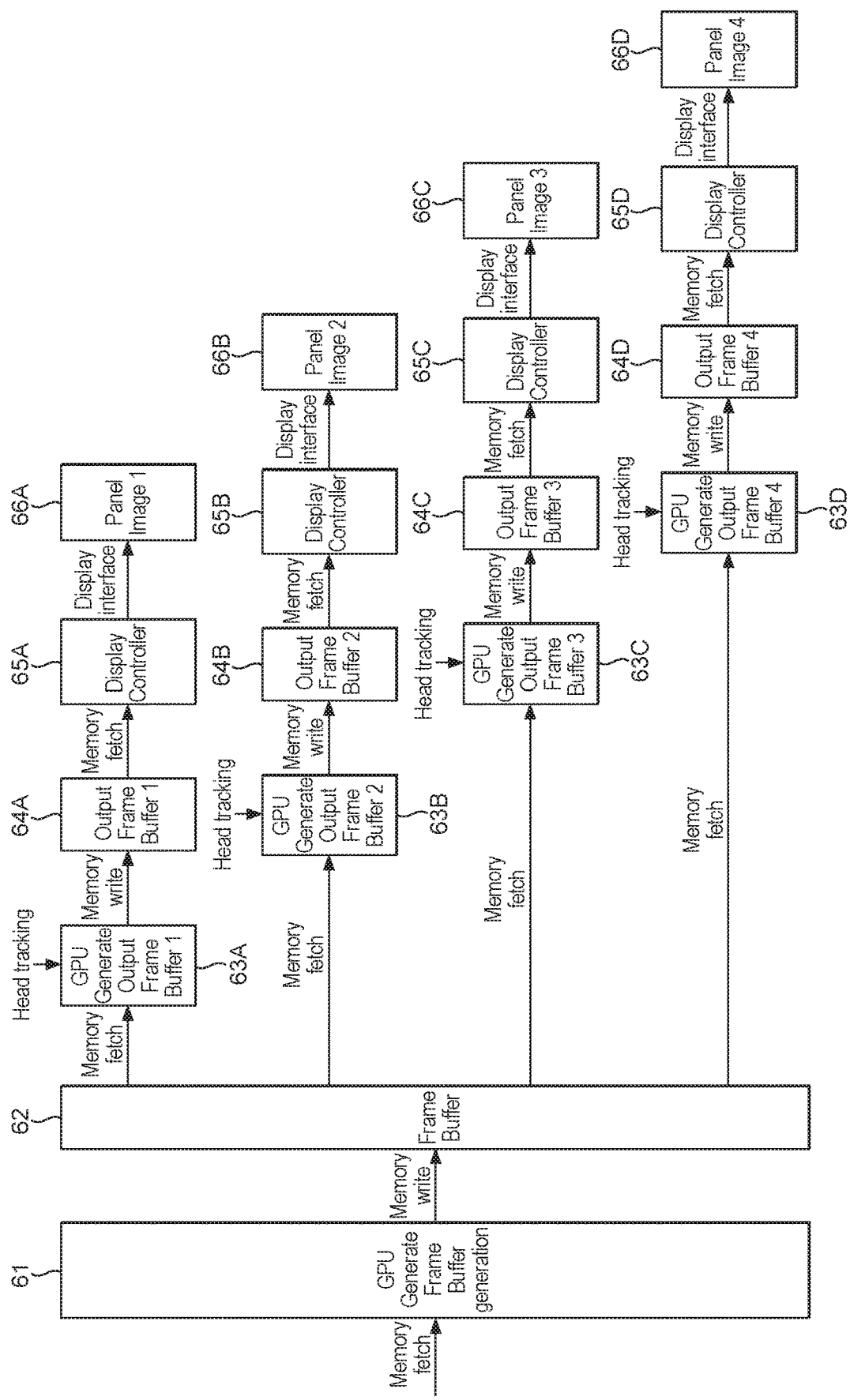
FIG. 6 shows schematically the flow of data and relative timings of processes in a graphics processing system when performing "timewarp" processing.

FIG. 6 schematically illustrates the flow of data and the relative timings of processes in a graphics processing system, such as is illustrated in FIG. 1, when performing "timewarp" processing, such as is illustrated in FIG. 4. As shown in FIG. 6, graphics processing unit (GPU) 2 first fetches appropriate commands and data (generated by the driver for the GPU 2 executing on the CPU 1) from memory 7, which cause the graphics processing unit (GPU) 2 to generate (render) an application frame based on head tracking (orientation) data sensed at the beginning of the graphics processing unit (GPU) 2 rendering the application frame (block 61), and to store the rendered application frame in a frame buffer in main memory 7 (block 62).

In the example shown in FIG. 6, as in the example of FIG. 4, the rendered application frame is then subjected to four "timewarp" processes. Thus, before an image is actually displayed on the head mounted display 8, further head tracking (orientation) data is sensed, and that updated head tracking (orientation) sensor data is used by the graphics processing unit (GPU) 2 to transform the rendered application frame by "timewarp" processing to generate a first output "timewarped" version of the application frame (block 63A), which is stored in a (first) output frame buffer in main memory 7 (block 64A). The display controller 4 then reads the first output "timewarped" version of the application frame stored in the (first) frame buffer (block 65A), and provides it for display on the display panel of the display 8 (block 66A).

Meanwhile, once the graphics processing unit (GPU) 2 has finished transforming the rendered application frame to generate the first "timewarped" version of the application frame (in block 63A), it will be available to perform another instance of "timewarp" processing based on new head tracking (orientation) data. Thus, new head tracking (orientation) data is sensed, and that updated head tracking (orientation) sensor data is used by the graphics processing unit (GPU) 2 to transform the rendered application frame again to generate a second output "timewarped" version of the application frame (block 63B), which is stored in a (second) output frame buffer in main memory 7 (block 64B). The display controller 4 then reads the second "timewarped" version of the application frame stored in the (second) frame buffer (block 65B), and provides it for display on the display panel of the head mounted display 8 (block 66B).

In the example shown in FIG. 6, the above steps are repeated to generate and display two further output "timewarped" versions of the application frame on the display panel of the display 8 (blocks 63C, 64C, 65C and 66C; and blocks 63D, 64D, 65D and 66D). The entire process may then be repeated one or more times to generate one or more new application frames, and to subject each new application frame to four (or any other desired number of) "timewarp"

processes so as to display an appropriate sequence of output "timewarped" frames on the display 8.

Figure 7:
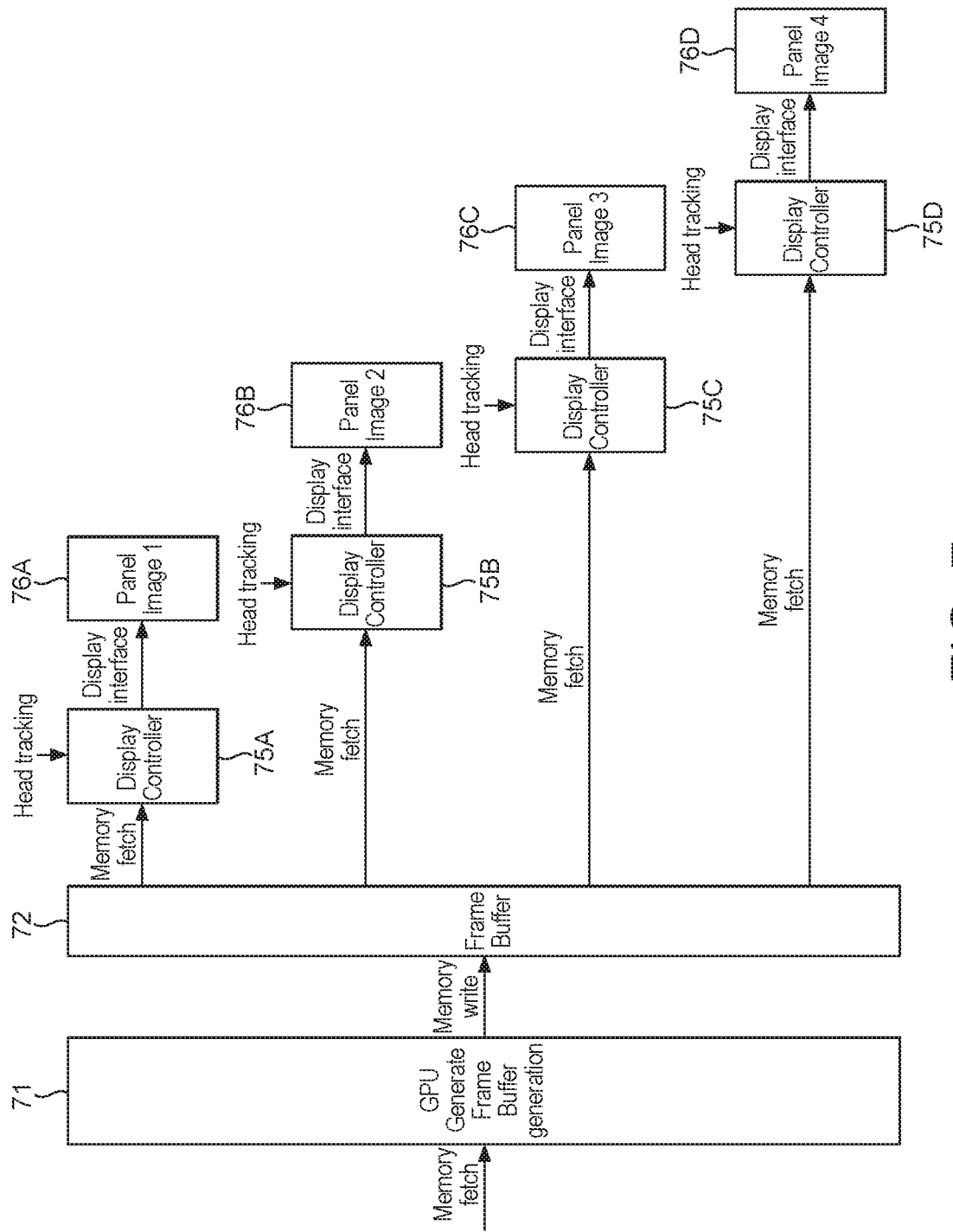
FIG. 7 shows schematically the flow of data and relative timings of processes in a graphics processing system when performing "timewarp" processing.

FIG. 7 schematically illustrates an alternative example of the flow of data and the relative timings of processes in a graphics processing system, such as is illustrated in FIG. 1, when performing "timewarp" processing, such as is illustrated in FIG. 4. In this example, rather than the graphics processing unit (GPU) 2 transforming rendered application frames by "timewarp" processing (as in the example of FIG. 6), the display controller 4 performs this function.

Thus, as shown in FIG. 7, as in the example of FIG. 6, graphics processing unit (GPU) 2 first fetches appropriate commands and data (generated by the driver for the GPU 2 executing on the CPU 1) from memory 7, which cause the graphics processing unit (GPU) 2 to generate (render) an application frame based on head tracking (orientation) data sensed at the beginning of the graphics processing unit (GPU) 2 rendering the application frame (block 71), and to store the rendered application frame in a frame buffer in main memory 7 (block 72).

The rendered application frame is then subjected to four "timewarp" processes. Thus, before an image is actually displayed on the display 8, further head tracking (orientation) data is sensed, and that updated head tracking (orientation) sensor data is used by the display controller 4 to transform the rendered application frame by "timewarp" processing to generate a first output "timewarped" version of the application frame (block 75A), which the display controller 4 then provides directly for display on the display panel of the display 8 (block 76A).

Meanwhile, once the display controller 4 has finished processing to generate the first "timewarped" version of the application frame (in block 75A), it will be available to perform another instance of "timewarp" processing based on new head tracking (orientation) data. Thus, new head tracking (orientation) data is sensed, and that updated head tracking (orientation) sensor data is used by the display controller 4 to transform the rendered application frame again to generate a second "timewarped" version of the application frame (block 75B), which the display controller 4 then provides directly for display on the display panel of the display 8 (block 76B).

In the example shown in FIG. 7, the above steps are then repeated to generate and display two further output "timewarped" versions of the application frame on the display panel of the display 8 (blocks 75C and 76C; and blocks 75D and 76D). The entire process may then be repeated one or more times to generate one or more new application frames, and to subject each new application frame to four (or any other desired number of) "timewarp" processes so as to display an appropriate sequence of output "timewarped" frames on the display 8.

It will be appreciated that in the above examples, each rendered (application) frame represents a view of objects of a scene that are arranged in a three dimensional world space, and that objects of the scene that are rendered by the graphics processing unit (GPU) 2, and so appear in the frame (on the display), lie within a volume of that space called the view frustum.

Figure 8:
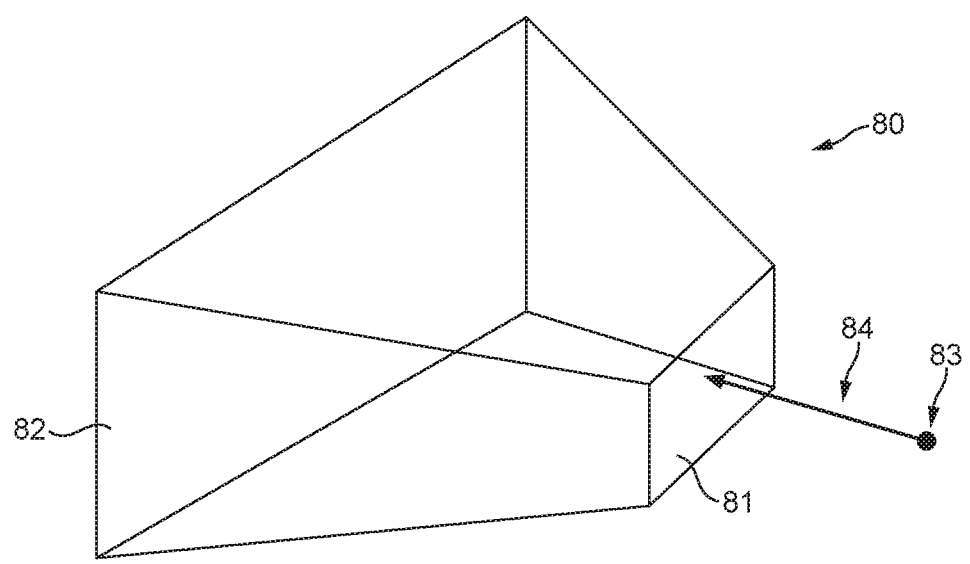
FIG. 8 shows an exemplary view frustum.

FIG. 8 shows an exemplary view frustum 80 representing the volume of world space that can appear in the frame (on the display). In this example, the view frustum 80 represents a frustum of a rectangular pyramid having its apex positioned at a viewpoint 83, and is bounded by a near plane 81 and a far plane 82 that are perpendicular to the view direction 84. Objects that lie outside of the view frustum 80 will not be rendered, and so will not appear in the frame.

Objects lying within the view frustum 80 will appear in the frame so long as they are not occluded by other objects lying at a shallower depth (i.e. nearer to the near plane 81 or viewpoint 83 (in the view direction 84)) and in front of them in the view from viewpoint 83 in view direction 84.

Figure 9:
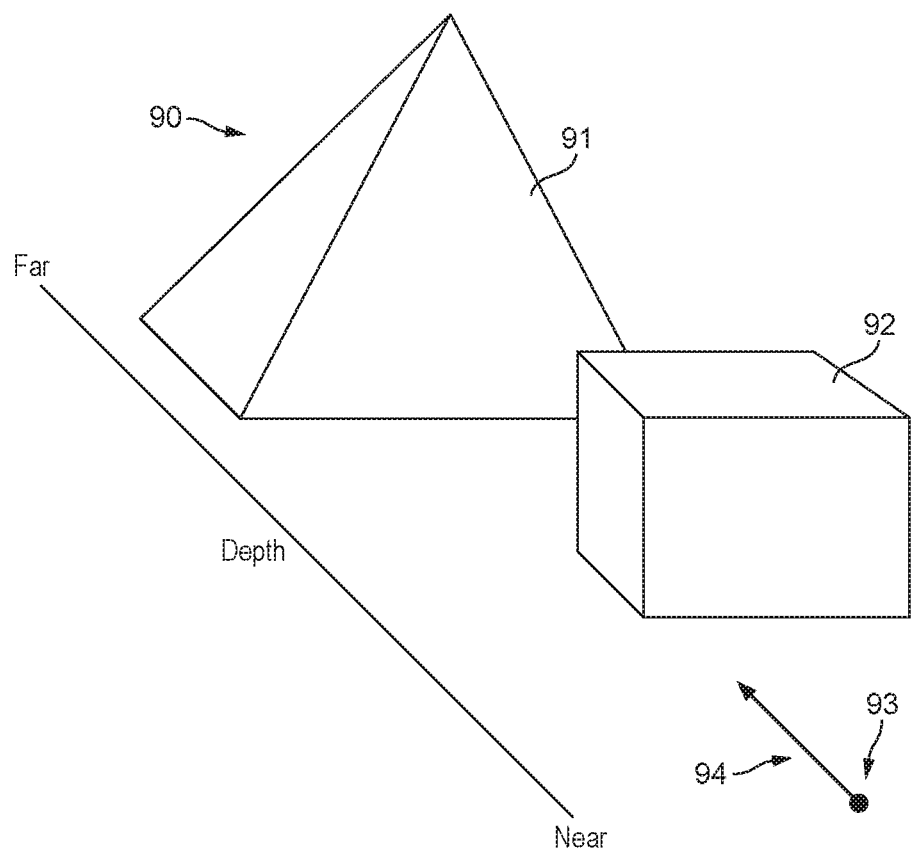
FIG. 9 shows an exemplary scene in which an object is occluded by another object.

An example of a close object in a scene occluding another object is shown in FIG. 9. FIG. 9 shows a scene 90 comprising two objects, pyramid 91 and cube 92, that is viewed from viewpoint 93 in view direction 94. In this view of the scene 90, cube 92 lies at a shallower depth (i.e. nearer to the near plane or the viewpoint 93 (in the view direction 94)) and in front of pyramid 91, such that a region of pyramid 91 is occluded by cube 92.

As discussed above, the Applicants have recognised that in this situation, where a nearer object occludes a farther object, the "timewarping" and/or "spacewarping" of an application frame representing a view of such a scene may be likely to introduce distortions.

Figure 10:
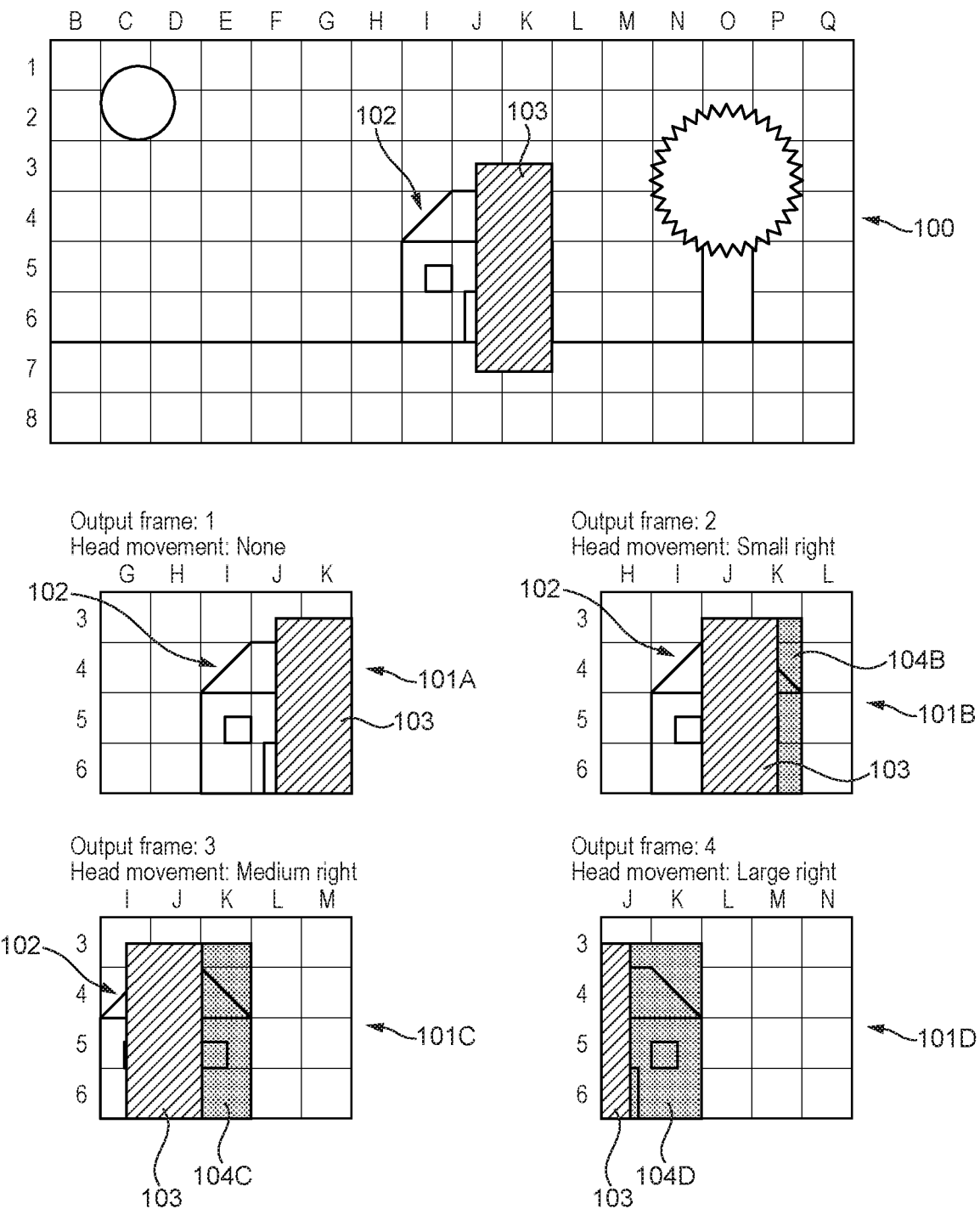
FIG. 10 illustrates an exemplary rendered "application" frame representing a view of a scene in which an object is occluded by another object, together with exemplary "timewarped" versions of that frame.

FIG. 10 illustrates the "timewarp" case and shows the same scene as shown in FIG. 4, i.e. comprising a number of objects including house 102, except that the scene also includes an additional near object 103.

In this example, as in the example of FIG. 4, application frame 100 is rendered by the graphics processing unit (GPU) 2 based on (first) head orientation (pose) data sensed at the beginning of the graphics processing unit (GPU) 2 rendering the application frame 100. However, from the point of view of this (first) head orientation (pose), near object 103 lies in front of (and at a shallower depth to) house 102, such that a region of house 102, as well as a region of the background, is occluded by near object 103.

As shown in FIG. 10, in this example, as in the example of FIG. 4, application frame 100 is subjected to four "timewarp" processes by transforming application frame 100 based on further (second) sensed head orientation (pose) data (sensed after application frame 100 is rendered) to generate four respective "timewarped" frames 101A-D.

In the case of the first "timewarped" frame 101A, the further sensed head orientation (pose) data indicates that no change in the user's head orientation has occurred since the original (first) head orientation (pose) data was sensed at the beginning of the graphics processing unit (GPU) 2 rendering the application frame 100. First "timewarped" frame 101A therefore simply represents an appropriate window ("letterbox") taken from the wider field of view of the application frame 100, and no "timewarp" transformation has been performed.

However, in the case of a change in the user's head orientation, a "timewarp" transformation will be performed which will transform the application frame 100 based on the changed head orientation, but may introduce distortions. Such distortions will be particularly evident and more severe for objects closer to the camera (to the viewpoint), and where there are larger head movements (rotations and/or translations), e.g. due to parallax effects.

Thus, when a small head movement (e.g. rotation and/or translation) to the right is detected compared to the original (first) head orientation, near object 103, in particular, may appear distorted in "timewarped" frame 101B; when a larger head movement to the right is detected, near object 103 may appear more distorted in "timewarped" frame 101C; and when a still larger head movement to the right is detected, near object 103 may appear still more distorted in "timewarped" frame 101D. (It will be appreciated that other head movements (rotations and/or translations), such as left, up and down, may also result in distortions to the scene.)

Furthermore, in the case of a change in the user's head orientation, portions of the scene that were occluded by near object 103 in application frame 100 can become visible. Thus, as shown in the example of FIG. 10, when a small head movement (e.g. rotation and/or translation) to the right is detected compared to the original (first) head orientation, a small region 104B of the scene that was occluded in the application frame 100 is revealed (101B); when a larger head movement to the right is detected, a larger region 104C of the scene is revealed (101C); and when a still larger head movement to the right is detected, a still larger region 104D of the scene is revealed (101D). (It will be appreciated that other head movements (rotations and/or translations), such as left, up and down, may also reveal previously occluded portions of the scene.)

However, in this example, data for the newly visible, "disoccluded" regions 104B-D has not been rendered by the graphics processing unit (GPU) 2, since these regions were occluded by near object 103 from the point of view of the (first) head orientation (pose) that the application frame 100 was rendered based on.

Thus, "timewarped" frames 101B-D may, in particular, not show near object 103 and "disoccluded" regions 104B-D correctly, leading to distortions and artefacts in the output "timewarped" frames 101B-D that are displayed to the user.

Similarly, as discussed above, when a scene contains moving objects, then the movement of those objects can also result in "disocclusion", which can lead to distortions in what is displayed to the user when performing "spacewarp" processing.

Figure 11:
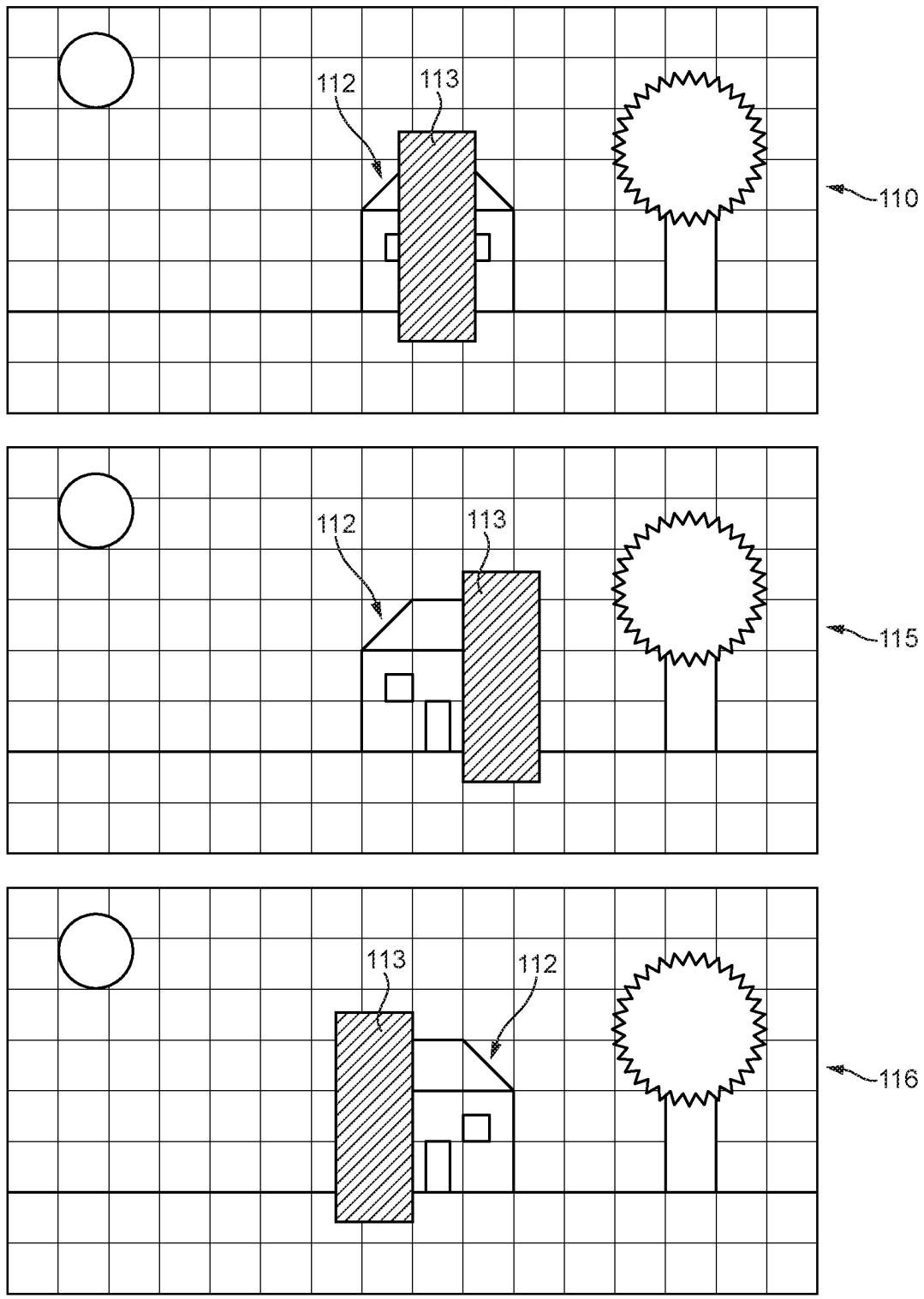
FIG. 11 illustrates exemplary forward, left and right views of a scene that are rendered according to an embodiment of the technology described herein.

FIG. 11 illustrates an embodiment of the technology described herein, and shows a similar scene to FIG. 10, i.e. comprising a number of objects including house 112 and near object 113.

In this embodiment, as in the example of FIG. 10, a first (application) frame 110 is rendered by the graphics processing unit (GPU) 2 based on (first) head orientation (pose) data sensed (at a first point in time) at the beginning of the graphics processing unit (GPU) 2 rendering the (application) frame 110. Thus, (application) frame 110 represents a "straight ahead" or forward view of the scene with respect to the (first) head orientation (pose) that was sensed by the head mounted display system (at the first point in time) at the beginning of the graphics processing unit (GPU) 2 rendering (application) frame 110.

In this forward view 110 of the scene, near object 113 occludes a region of the scene including a region of house 112, such that data for this region of the forward view 110 is not rendered by the graphics processing unit (GPU) 2.

In the present embodiment, in contrast with the example of FIG. 10, however, it may be determined that object 113 is close to the viewpoint from which the (frame representing the) forward view 110 is rendered, and then two further versions 115, 116 of the scene are rendered by the graphics processing unit (GPU) 2 based on predicted or assumed respective left and right head movements (e.g. rotations and/or translations) that the user of the head mounted display might make relative to (starting from) the sensed (first) head orientation (pose) that the (frame representing the) forward view 110 is rendered based on, during the time period that the views are to be used for display.

Thus, left view 115 represents a view of the scene as it would appear if the user were to turn (rotate) their head a particular angle (e.g. 20 degrees) (and/or if they were to move (translate) their head a particular distance) to the left relative to the sensed (first) head orientation (pose) that (the frame representing the) forward view 110 is rendered based on. Similarly, right view 116 represents a view of the scene as it would appear if the user were to turn (rotate) their head a particular angle (e.g. 20 degrees) (and/or if they were to move (translate) their head a particular distance) to the right relative to the sensed (first) head orientation (pose) that forward view 110 is rendered based on. (Other further versions of the scene based on different and/or more amounts and/or directions (such as up and/or down) of head movements (rotations and/or translations) relative to the (first) head orientation (pose) may also or instead be rendered.)

As can be seen in FIG. 11, in the present embodiment, left view 115 and right view 116 show near object 113 based on different head orientations (poses) to forward view 110, as well as regions of the scene, including a region of house 112, that are occluded in forward view 110.

The rendered data for the two further versions of the scene, left view 115 and right view 116, can thus be (and in an embodiment is) used to, when performing "timewarp" processing, provide rendered data for regions of the scene that could otherwise be significantly distorted by the "timewarp" processing, e.g. regions of the scene containing near object 113, and regions of the scene that are "disoccluded", i.e. occluded in the forward view 110, but that become visible due to a change in a user's head orientation (pose) during the time period that rendered views are used for display. This means that distortions and artefacts that could otherwise be caused by "timewarp" processing can be avoided or reduced.

Figure 12:
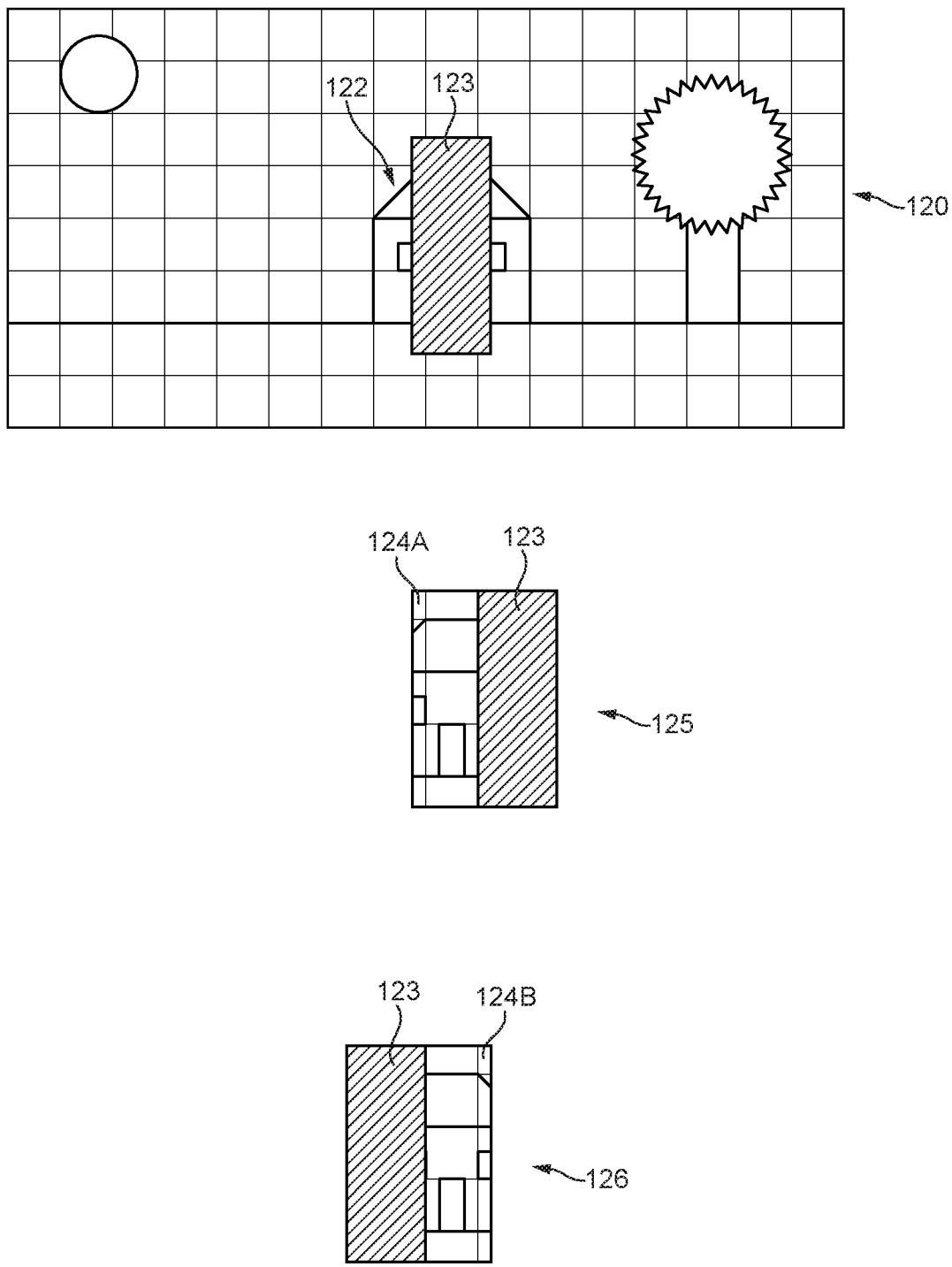
FIG. 12 illustrates exemplary forward, partial left and partial right views of a scene that are rendered according to an embodiment of the technology described herein.

FIG. 12 illustrates an alternative embodiment of the technology described herein where, instead of rendering entire left and right views, as in the embodiment of FIG. 11, only partial left and right views are rendered by the graphics processing unit (GPU) 2. This can reduce processing requirements as compared to the embodiment of FIG. 11.

FIG. 12 shows the same scene as FIG. 11, i.e. comprising a number of objects including house 122 and near object 123. In this embodiment, as in the embodiment of FIG. 11, a first (application) frame 120 (representing a forward view) is rendered by the graphics processing unit (GPU) 2 based on (first) head orientation (pose) data sensed (at a first point in time) at the beginning of the graphics processing unit (GPU) 2 rendering the (application) frame 120. In this forward view 120 of the scene, near object 123 occludes a region of the scene including a region of house 122, such that data for these regions is not rendered by the graphics processing unit (GPU) 2 in the (frame representing the) forward view 120.

In this embodiment, it may be determined that near object 123 is close to the viewpoint from which the (application) frame 120 is rendered, and then a partial right view 125 and a partial left view 126 are also rendered by the graphics processing unit (GPU) 2. As in the embodiment of FIG. 11, left view 125 represents a view of the scene based on turning (rotating) the head a particular angle (e.g. 20 degrees) (and/or moving (translating) the head a particular distance) to the left relative to the sensed (first) head orientation (pose) that (the frame representing the) forward view 120 is rendered based on, and right view 126 represents a view of the scene based on turning (rotating) the head a particular angle (e.g. 20 degrees) (and/or moving (translating) the head a particular distance) to the right relative to the sensed (first) head orientation (pose) that (the frame representing the) forward view 120 is rendered based on. (Other partial views of the scene based on different and/or more amounts and/or directions (such as up and/or down) of head movements (rotations and/or translations) relative to the (first) head orientation (pose) may also or instead be rendered.)

However, in contrast with the embodiment of FIG. 11, partial right and left views 125, 126 only show near object 123 and "disoccluded" parts (regions) 124A, 124B, i.e. parts (regions) that are occluded by near object 123 in the front view 120, but that are revealed in the respective partial view due to the changed head orientation (pose). Thus, in the case of partial right view 125, the rendered region corresponds to near object 123 and "disoccluded" region 124A (corresponding to a region that is occluded by near object 123 in the forward view 120, but that is revealed in the right view 125). Similarly, in the case of left view 126, the rendered region corresponds to near object 123 and "disoccluded" region 124B (corresponding to a region that is occluded by near object 123 in the forward view 120, but that is revealed in the left view 126).

In this way, the additional processing required to render further views can be limited to regions of the frame that are most likely to suffer from artefacts and distortions, i.e. regions that contain a near object and parts (regions) of the frame that are occluded by a near object in the forward view, but that may be revealed due to a change in head orientation (pose).

Similarly, in another embodiment, the rotations and/or translations that further views (versions) are rendered based on can, additionally or alternatively, be selected so that rendered data is provided for the regions of the scene that are most likely to suffer from artefacts and distortions. For example, depth information could be used to determine where occlusion effects are likely to occur, and then the viewpoint and/or view direction that a further view (or views) is rendered based on could be selected to provide rendered data to mitigate those occlusion effects.

The Applicants have further recognised that in some situations, it may be desirable to further limit the processing that is performed to render the further (partial) views (versions), e.g. because the additional processing would be beyond the system capabilities and so could affect the rendering of the forward view 120. Such a situation may be encountered, for example, if near object 123 is large and/or near enough to cover a large portion (or all) of the forward view 120, such that a large region (or all) of the frame would need to be rendered for the further views (versions). In this case, it may be desirable to reduce the number of further views (versions) that are rendered, or indeed to not render any further views (versions) at all, and to instead render only the (frame representing the) forward view 120.

Thus, in an embodiment, it is determined whether rendering the further left and right views (versions) would exceed a processing limit of the graphics processing system; and when this determined to be so, the number of further views (versions) that are rendered is appropriately reduced, e.g. and in an embodiment, to zero.

Figure 13:
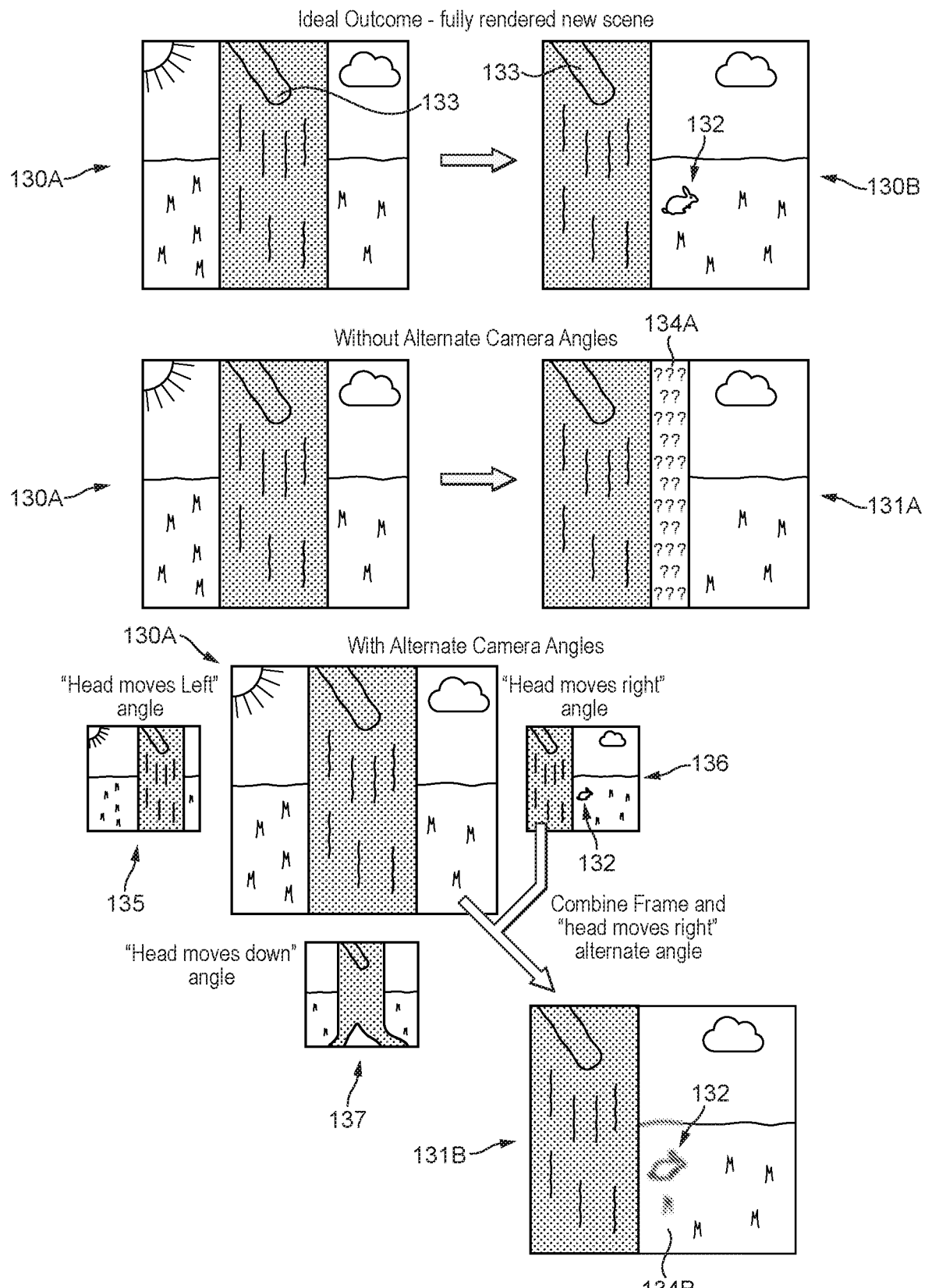
FIG. 13 illustrates the generation of an exemplary output frame by combining forward and right views of a scene, in accordance with an embodiment of the technology described herein.

FIG. 13 illustrates another embodiment whereby the processing requirements to render further views (versions) of the scene can be reduced. FIG. 13 shows a scene comprising a number of objects including rabbit 132 and tree 133. In this embodiment, a first application frame 130A (representing a forward view) is rendered by the graphics processing unit (GPU) 2 based on first view orientation (pose) data sensed (at a first point in time) at the beginning of the graphics processing unit (GPU) 2 rendering the application frame 130A. In this forward view 130A of the scene, tree 133 occludes a region of the scene including rabbit 132, such that rabbit 132 is not visible.

If a user were to move (rotate and/or translate) their head to the right, however, then rabbit 132 should be "disoccluded", and appear from behind the tree 133, due to parallax effects. Thus, as illustrated in FIG. 13, if a new application frame 130B were to be rendered by the graphics processing unit (GPU) 2 based on this new (second) view orientation (pose), then rabbit 132 would be visible in that frame.

However, if instead of rendering a new application frame 130B, an output "timewarped" frame 131A were to be generated by (three of six degree of freedom (DOF)) "timewarping" the first application frame 130A based on the new (second) view orientation (pose), then the output "timewarped" frame 131A may not show "disoccluded" regions 134A correctly, since data for these regions 134A has not been rendered by the graphics processing unit (GPU) 2 in the first application frame 130A. As illustrated in FIG. 13, this can lead to distortions and artefacts in what is displayed to the user; for example, rabbit 132 may not be shown in the output "timewarped" frame 131A.

In an embodiment of the technology described herein, therefore, before an output frame is generated, three further versions (views) 135, 136, 137 of application frame 130A are rendered by the graphics processing unit (GPU) 2, with each of the further versions 135, 136, 137 representing a view of the scene based on a different view orientation (pose) to the first view orientation (pose) that the application frame 130A is rendered based on.

Thus, in this embodiment, left view 135, right view 136 and down view 137 represent views of the scene as it would appear if the user were to turn (rotate) their head a particular angle (and/or if they were to move (translate) their head a particular distance) to the left, to the right and downwards, respectively, relative to the first view orientation (pose). As illustrated in FIG. 13, rabbit 132 appears from behind the tree 133 in right view 136.

Then, in this embodiment, when an output frame 131B is to be generated based on a sensed head movement to the right (sensed at a second, later point in time), the further version that has been rendered based on a view orientation (pose) that is closest to the sensed head movement, i.e. right view 136, is selected, and combined with application frame 130A to generate the output frame 131B showing rabbit 132.

In this embodiment, in contrast with the embodiments illustrated in FIGS. 11 and 12, however, each of the further versions (views) 135, 136, 137 are rendered at a lower resolution to the application frame 130A. This means that the processing required to render the further versions is reduced. However, as illustrated in FIG. 13, this is at the expense of "disoccluded" regions 134B of output frame 131B (that include rabbit 132) being shown with a lower image quality than they would be if the further versions were rendered at the same resolution as the application frame 130A. Nevertheless, distortions and artefacts in what is displayed to the user are still significantly reduced as compared to an output frame generated without the use of rendered further versions of the application frame 130A (such as output frame 131A).

Similarly, in another embodiment, the further versions may, additionally or alternatively, be updated (rendered) at a lower rate to application frame 130A, so as to reduce the processing required to render them.

Figure 14:
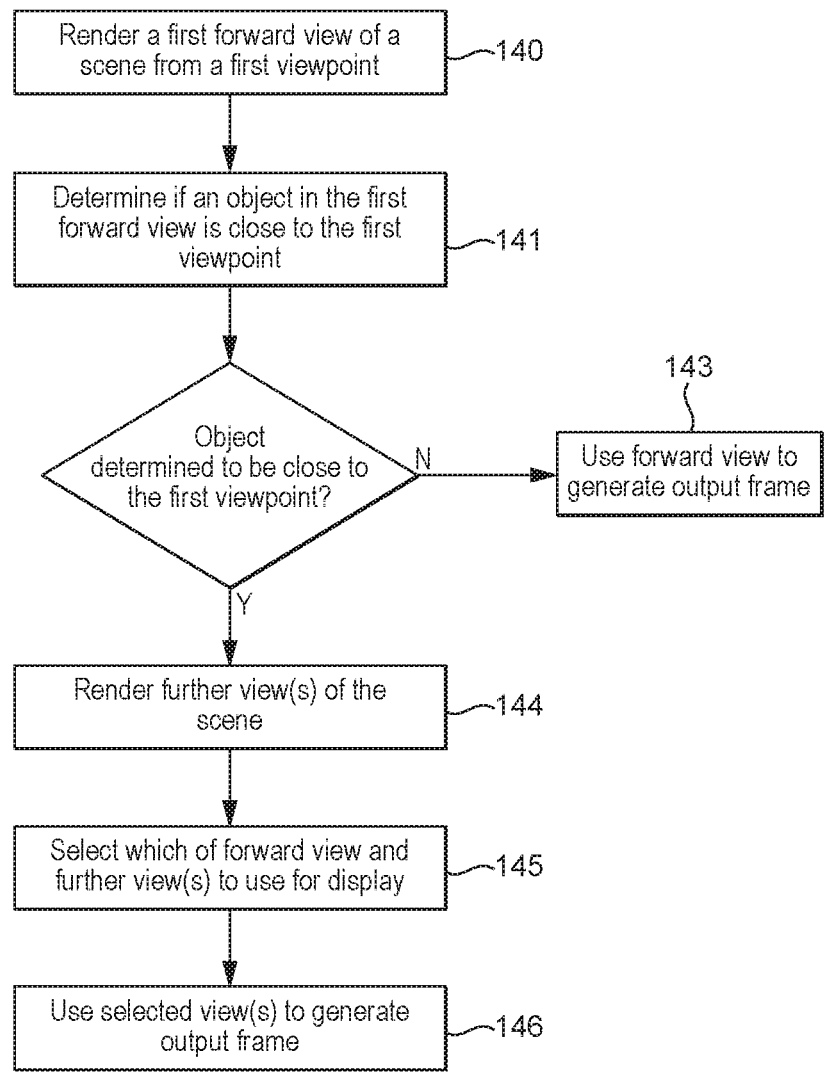
FIG. 14 is a flowchart showing schematically the operation of a graphics processing system according to an embodiment of the technology described herein.

FIG. 14 shows schematically the operation of a graphics processing system, such as is illustrated in FIG. 1, in accordance with an embodiment of the technology described herein. As shown in FIG. 14, in the present embodiment, a first (frame representing a) forward view of a scene from a first viewpoint is rendered by the graphics processing unit (GPU) 2 of the graphics processing system (in step 140) based on (first) head orientation (pose) data sensed (at a first point in time) at the beginning of the graphics processing unit (GPU) 2 rendering the first forward view (frame).

It may then optionally be determined whether or not there is an object (or objects) in the first forward view that is close to the first viewpoint (in step 141). This may be done by determining the depth of an object in the forward view of the scene (e.g. the distance from the near plane of the view frustum to the object in the view direction), and comparing the determined depth with a threshold value. If the depth of an object is less than the threshold value, then it may be determined that the object is close to the first viewpoint.

(Additionally or alternatively, in another embodiment, it may be determined whether or not there is a moving object (or objects) in the first forward view that is close to the first viewpoint (in step 141).)

It will be appreciated that while in the embodiment of FIG. 14, the step of rendering the first forward view (frame) (step 140) is performed before the step of determining whether or not an object is close to the first viewpoint (step 141), this is not essential. Instead, the step of rendering the first forward view (frame) (step 140) could be performed after or at the same time as the step of determining whether or not an object is close to the first viewpoint (step 141).

If no objects are determined to be close to the first viewpoint, then the first forward view (frame) alone may be used for display (step 143), e.g. by transforming the first forward view (frame) by "timewarp" processing based on (second) head orientation (pose) data sensed (at a second, later point in time) after the graphics processing unit (GPU) 2 has rendered the first forward view (frame), and providing the so-"timewarped" output frame (image) for display.

If, however, an object (or objects) is determined to be close to the first viewpoint, then in an embodiment, the graphics processing unit (GPU) 2 then renders one or more further views of the scene (step 144), e.g. based on an assumed turning (rotating) (and/or moving (translating)) of the head starting from the sensed (first) head orientation (pose) that the first forward view (frame) is rendered based on.

It will be appreciated that since the step of determining whether or not there is an object (or objects) in the first forward view that is close to the first viewpoint (step 141) is optional, the method may proceed directly from step 140 to step 144, without performing the intermediate steps. Thus, the graphics processing unit (GPU) 2 may render the one or more further views of the scene regardless of whether or not there is an object (or objects) in the first forward view that is close to the first viewpoint.

The further views that are rendered may be selected based on likely user head movements (e.g. rotations and/or translations), e.g. based on information provided (at runtime) by the application that the first frame is rendered for.

For example, in the case of a car game it may be assumed that the user will be sitting, and therefore that the user's head movements will be limited to rotations due to movements of the neck. In the case that the game includes virtual "wing mirrors", it may be assumed that the likelihood of the user turning their head significantly is reduced further, for example. Furthermore, it may be assumed that the user will usually be looking forward in the direction of travel, and will turn their head left or right towards corners, but will be unlikely to move their head up or down significantly (unless, for example, there are hills).

Thus, in this case it may be expected that a user's maximum range of head movements (rotations) would be between about 90° to the left, 90° to the right, 20° downwards, and 20° upwards, but that the user will usually be looking in the direction of travel. In this case, therefore, a limited number of further views based only on assumed left and right head movements (rotations) may be rendered, e.g. one further view based on turning the head 35° to the left and another further view based on turning the head 35° to the right starting from the sensed (first) head orientation (pose) that the first forward view (frame) is rendered based on. More further views may be generated when likely to be necessary, e.g. when overtaking another car.

In the case of a flight simulator application, for example, it may be assumed that the user will be sitting, and will usually be looking forward in the direction of travel, but that objects may approach the user from a wider range of directions compared to a car game, e.g. from above and below as well as from left and right. Thus, in this case it may be expected that a user's maximum range of head movements (rotations) would be between about 90° to the left, 90° to the right, 60° downwards, and 60° upwards. In this case, therefore, to account for the increased likelihood of a user turning their head up or down, further views based on turning the head 35° downwards and 35° upwards may be rendered in addition to further views based on turning the head 35° to the left and 35° to the right.

In the case of a first-person shooter (FPS) game, it may be assumed that the user will be standing and may react quickly, and so may be more likely to make large head movements (e.g. rotations and/or translations) in wide range of directions. In this case, therefore, a relatively larger number of further views spanning a relatively wider range of potential head movements (rotations and/or translations) may be rendered, e.g. further views based on turning the head 35° to the left, 35° to the right, 60° to the left, 60° to the right, 35° downwards, 35° upwards, 60° downwards and 60° upwards (and translating the head) starting from the sensed (first) head orientation (pose) that the first forward view (frame) is rendered based on.

Additionally or alternatively, the further views that are rendered may be selected in order to reduce the likelihood (and severity) of artefacts and distortions.

Referring again to FIG. 14, once the (selected) further view(s) have been rendered (at step 144), the rendered data to be used for display may then be selected from the rendered (frame representing the) forward view and further view(s) (step 145). This may be done by sensing (second) head orientation (pose) data (at a second, later point in time) after the graphics processing unit (GPU) 2 has rendered the first forward view (frame) (and after the graphics processing unit (GPU) 2 has rendered the further view(s)), and then selecting rendered data for the rendered view that is rendered based on a head orientation (pose) that is closest to the actual sensed (second) head orientation (pose).

For example, if a left view is rendered based on an assumed 20° head turn (rotation) to the left relative to the sensed (first) head orientation (pose) that the first forward view (frame) is rendered based on, and a right view is rendered based on a 20° head turn (rotation) to the right relative to the sensed (first) head orientation (pose) that the first forward view (frame) is rendered based on, then the left view may be selected when a head turn (rotation) of greater than 10° to the left (relative to the sensed (first) head orientation (pose) that the first forward view (frame) is rendered based on) is sensed (after the first forward view (frame) is rendered), the right view may be selected when a head turn (rotation) of greater than 10° to the right (relative to the sensed (first) head orientation (pose) that the first forward view (frame) is rendered based on) is sensed (after the first forward view (frame) is rendered), and the first forward view (frame) may be selected when a head turn (rotation) of between 10° to the left and 10° to the right (inclusive) (relative to the sensed (first) head orientation (pose) that the first forward view (frame) is rendered based on) is sensed (after the first forward view (frame) is rendered).

Where only partial further views (versions) are rendered, then the selection may be performed in respect of regions of the forward view (frame) for which a corresponding partial further view is rendered, and the forward view (frame) may be selected (by default) for regions of the forward view (frame) where no further view (version) data is rendered.

The selected rendered data may then be used to generate an output frame (step 146), e.g. by transforming the selected rendered data by (three or six degree of freedom (DOF)) "timewarp" processing based on (the) (second) head orientation (pose) data sensed (at the second, later point in time) after the graphics processing unit (GPU) 2 has rendered the first forward view (frame) (and the further views (versions)), and providing the so-"timewarped" output frame (image) for display. The selected rendered data may also or instead be subjected, for example, to a lens distortion correction transformation, a chromatic aberration (distortion) correction transformation, and/or a "spacewarp" transformation (extrapolation).

Figure 15:
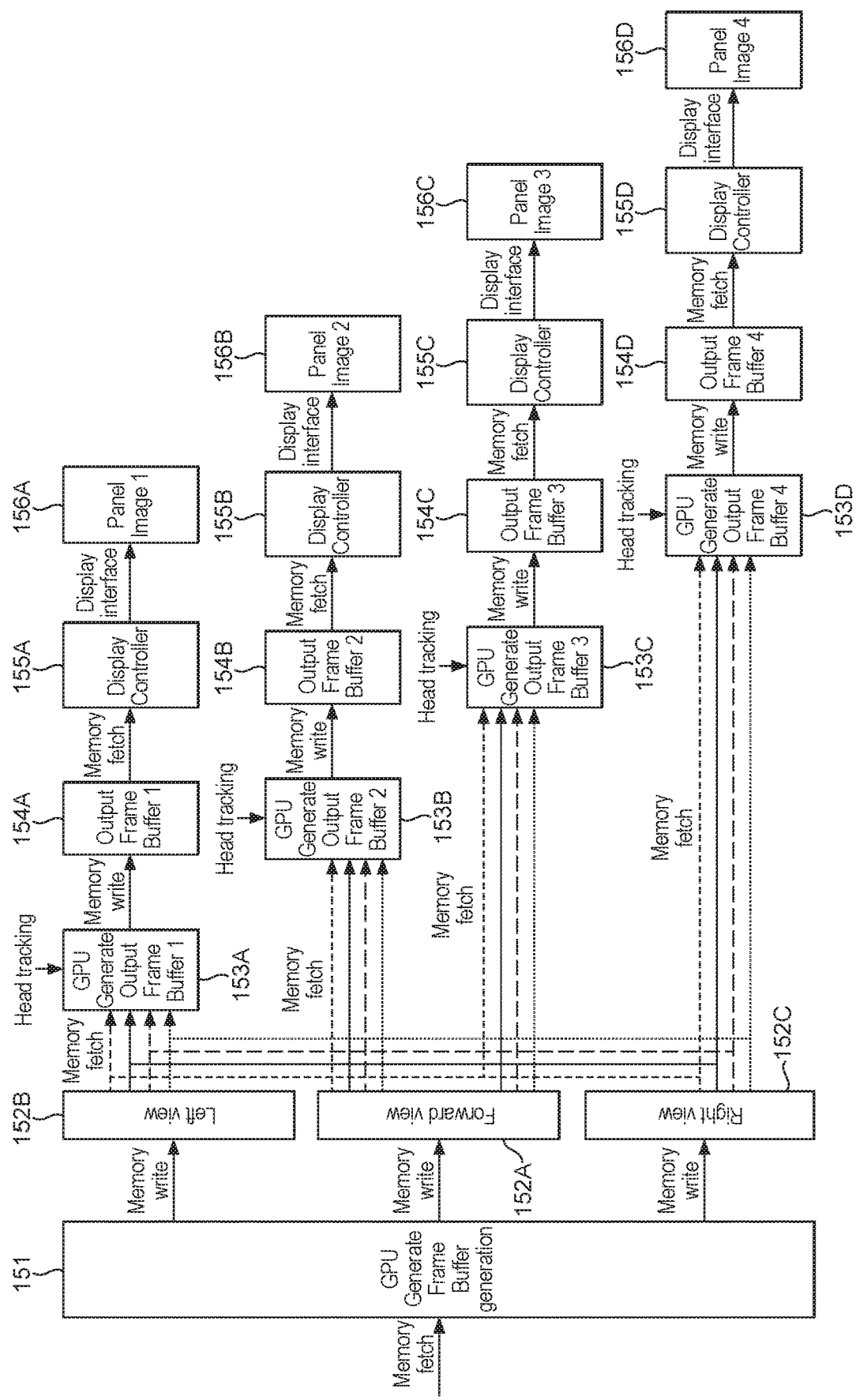
FIG. 15 shows schematically the flow of data and relative timings of processes in a graphics processing system when performing "timewarp" processing according to an embodiment of the technology described herein.

FIG. 15 schematically illustrates the flow of data and the relative timings of processes in a graphics processing system, such as is illustrated in FIG. 1, when performing "timewarp" processing in accordance with an embodiment of the technology described herein, such as is illustrated in FIG. 11.

As described above, rather than the graphics processing unit (GPU) 2 generating a single application frame representing a forward view of the scene which is then subjected to "timewarp" processing, as in the example of FIG. 6, in the present embodiment, the graphics processing unit (GPU) 2 generates a set of rendered data representing multiple different views (versions) of the scene, and selected rendered data of the set of rendered data is then subjected to "timewarp" processing.

Thus, as shown in FIG. 15, in the present embodiment, as in the example of FIG. 6, graphics processing unit (GPU) 2 fetches appropriate commands and data (generated by the driver for the GPU 2 executing on the CPU 1) from memory 7, which cause the graphics processing unit (GPU) 2 to generate (render) a forward view (application frame) based on head tracking (orientation (pose)) data sensed (at a first point in time) at the beginning of the graphics processing unit (GPU) 2 rendering the forward view (application frame) (block 151), and to store the rendered forward view (application frame) in a frame buffer in main memory 7 (block 152A).

In this embodiment, as in the example of FIG. 6, the rendered forward view (application frame) represents a (first) forward view of the scene being rendered from a (first) head orientation (pose) corresponding to the sensed head tracking (orientation (pose)) data. However, in contrast with the example of FIG. 6, (when it is determined that an object is close to the viewpoint from which the forward view is rendered) the graphics processing unit (GPU) 2 also generates (renders) (in block 151) two further versions of the scene representing a left view and a right view of the scene.

The two further versions are stored in respective frame buffers in main memory 7 (blocks 152B and 152C).

In the present embodiment, the left view and the right view of the scene are rendered by the graphics processing unit (GPU) 2 along with (at substantially the same time as) the forward view (application frame) (in block 151) and then stored for subsequent use (in blocks 152B and 152C). This means that input data that is the same for the different views of the scene can be re-used by the graphics processing unit (GPU) 2 during rendering, so that it may only need to be cached once, for example, leading to a more efficient rendering process.

However, in another embodiment, left view and right view data may be rendered by the graphics processing unit (GPU) 2 at the point that it is needed for display (e.g. at blocks 153A, 153B, 153C and/or 153D, after further (second) head tracking (orientation (pose)) data is sensed).

In the present embodiment, as in the example of FIG. 6, before an image is actually displayed on the display 8, further (second) head tracking (orientation (pose)) data is sensed (at a second, later point in time). However, in contrast with the example of FIG. 6, in the present embodiment, the further sensed head tracking (orientation (pose)) data is then used by the graphics processing unit (GPU) 2 to select appropriate rendered data to be used for display from the rendered forward view, left view and right view.

For example, if the further sensed head tracking (orientation (pose)) data indicates that the user has moved (e.g. rotated and/or translated) their head significantly to the right (e.g. more than a certain angle and/or distance) (compared to their head orientation (pose) sensed at the beginning of the graphics processing unit (GPU) 2 rendering the forward view (application frame) (in block 151)), then rendered right view data may be selected; if the sensed head tracking (orientation (pose)) data indicates that the user has moved (rotated and/or translated) their head significantly to the left (e.g. more than a certain angle and/or distance) (compared to their head orientation (pose) sensed at the beginning of the graphics processing unit (GPU) 2 rendering the forward view (application frame) (in block 151)), then rendered left view data may be selected; and otherwise, rendered forward view data may be selected.

Then, in the present embodiment, the selected rendered data is transformed by the graphics processing unit (GPU) 2 by "timewarp" processing using the further (second) sensed head tracking (orientation (pose)) data to generate a first output "timewarped" frame (block 153A).

The first "timewarped" frame is stored in a (first) output frame buffer in main memory 7 (block 154A), and the display controller 4 then reads the first "timewarped" frame stored in the (first) frame buffer (block 155A), and provides it for display on the display panel of the head mounted display 8 (block 156A).

Meanwhile, once the graphics processing unit (GPU) 2 has finished transforming the selected rendered data to generate the first "timewarped" frame (in block 153A), it will be available to perform another instance of "timewarp" processing based on new (second) head tracking (orientation (pose)) data. Thus, new head tracking (orientation (pose)) data is sensed, and that updated head tracking (orientation (pose)) sensor data is used by the graphics processing unit (GPU) 2 to select and transform rendered data again to generate a second output "timewarped" frame for display (block 153B), which is stored in a (second) output frame buffer in main memory 7 (block 154B).

The display controller 4 then reads the second "timewarped" frame stored in the (second) frame buffer (block 155B), and provides it for display on the display panel of the head mounted display 8 (block 156B).

In the present embodiment, the above steps are then repeated to generate and display two further output "timewarped" frames on the display panel of the display 8 (blocks 153C, 154C, 155C and 156C; and blocks 153D, 154D, 155D and 156D). The entire process may then be repeated one or more times to generate one or more new front, left and right (and up and down) views, and to select and subject the selected rendered data to four "timewarp" processes, so as to display an appropriate sequence of output "timewarped" frames on the head mounted display 8.

(In another embodiment, the display controller 4 selects rendered data and/or transforms the selected rendered data by "timewarp" processing to generate output "timewarped" frames, and then provides the "timewarped" frames directly for display to the head mounted display 8.)

Figure 16:
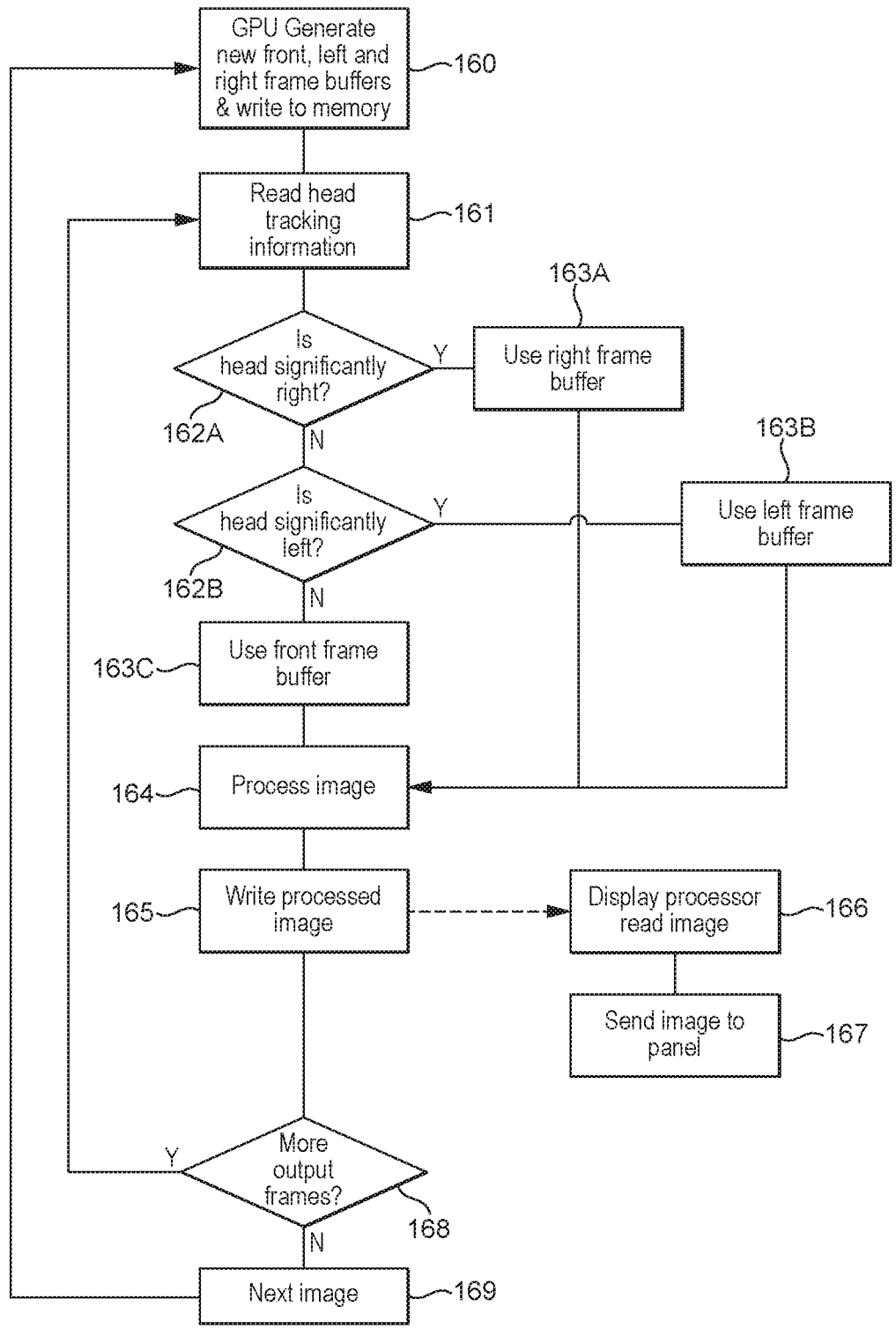
FIG. 16 is a flowchart showing schematically the operation of a graphics processing system according to an embodiment of the technology described herein.

FIG. 16 shows schematically the operation of a graphics processing system, such as is illustrated in FIG. 1, in accordance with an embodiment of the technology described herein. As shown in FIG. 16, in the present embodiment, a graphics processing unit (GPU) 2 of the graphics processing system first renders front (forward), left and right frames (views) and writes these to memory 7 (step 160).

In this embodiment, as discussed above, the front (first) frame represents a first view of a scene from a first viewpoint based on a first head orientation (pose) that was sensed (at a first point in time) at the beginning of rendering the front frame. The left frame represents a second view of the scene based on an assumed turning (rotation) (and/or translation) of the head to the left starting from the sensed first head orientation (pose), and the right frame represents a third view of the scene based on an assumed turning (rotation) (and/or translation) of the head to the right starting from the sensed first head orientation (pose).

Then, (second) head tracking (orientation (pose)) information is read (at a second, later point in time) (step 161), and used to determine where the user's head is actually positioned with respect to the first head orientation (pose) sensed (at the first point in time) at the beginning of rendering the front (first) frame. If the user's head is positioned significantly to the right (e.g. more than a certain angle and/or distance) compared to the sensed first head orientation (pose) (step 162A), then rendered data from the right frame is selected and subsequently used (step 163A); if the user's head is positioned significantly to the left (e.g. more than a certain angle and/or distance) compared to the sensed first head orientation (pose) (step 162B), then rendered data from the left frame is selected and subsequently used (step 163B); otherwise, rendered data from the front frame is selected and used (step 163C).

The selected rendered data is then processed, e.g. by "timewarp" processing, by the graphics processing unit (GPU) 2 (step 164), and the output processed ("timewarped") image is written to memory 7 (step 165), from where it is read by the display processor (controller) 4 (step 166) which sends the image to the display panel 8 for display (step 167). The selected rendered data may also or instead be subjected, for example, to a lens distortion correction transformation, a chromatic aberration (distortion) correction transformation, and/or a "spacewarp" transformation by the graphics processing unit (GPU) 2.

If there are more output processed ("timewarped") frames to be generated from the current front, left and right frames (views), then further head tracking (orientation (pose)) information is read and the process is repeated using this further head tracking (orientation (pose)) information (step 168). Otherwise, new front, left and right frames (views) are rendered by the graphics processing unit (GPU) 2, and the overall process is repeated using the new front, left and right frames (views) (step 169). A sequence of output processed ("timewarped") frames is thus provided for display.

Figure 17:
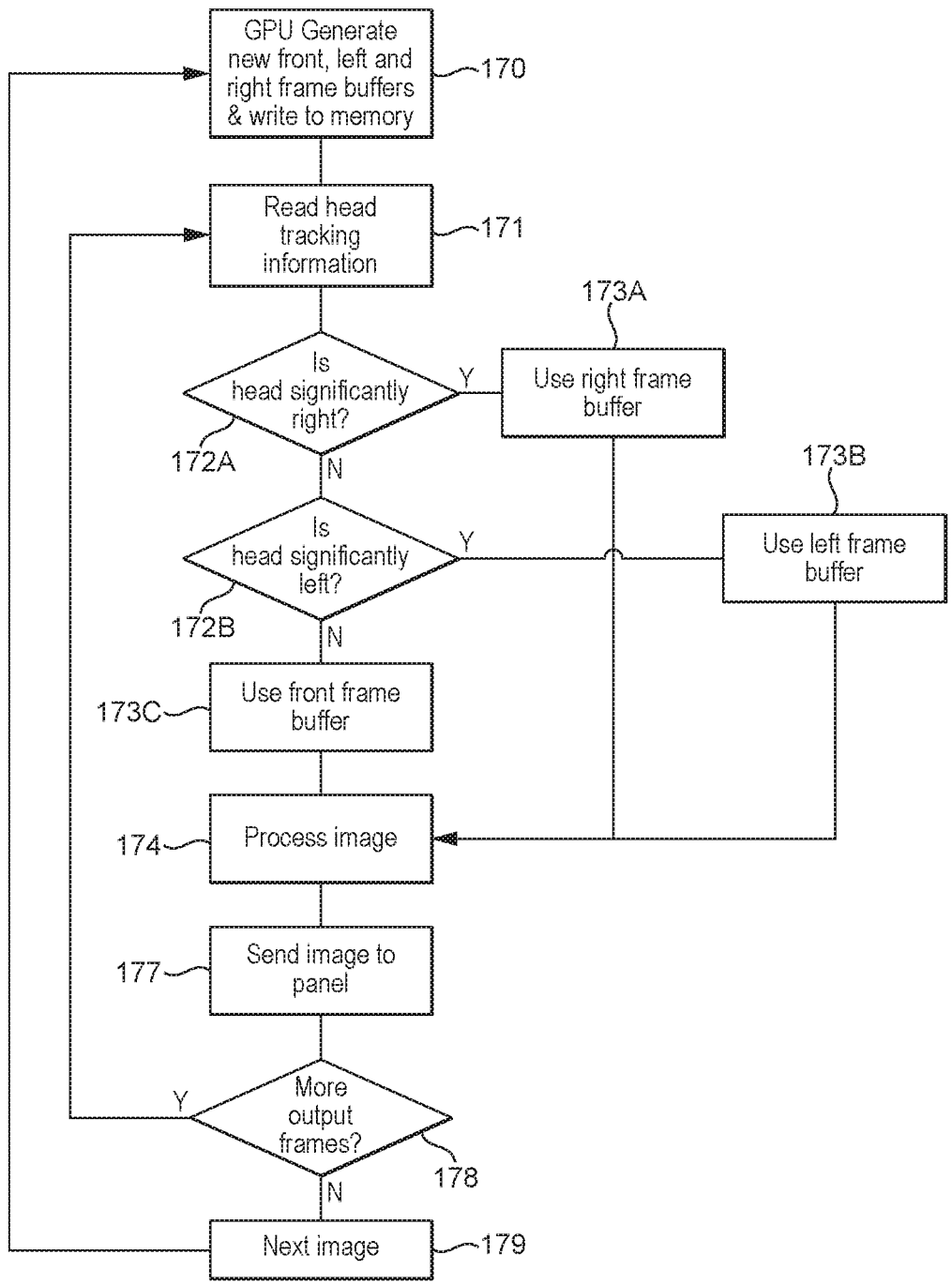
FIG. 17 is a flowchart showing schematically the operation of a graphics processing system according to an embodiment of the technology described herein.

FIG. 17 shows schematically the operation of a graphics processing system, such as is illustrated in FIG. 1, in accordance with another embodiment of the technology described herein. In this embodiment, the display controller 4 processes ("timewarps") frames, rather than the graphics processing unit (GPU) 2, as in the embodiment shown in FIG. 16.

As shown in FIG. 17, in this embodiment, as in the embodiment of FIG. 16, a graphics processing unit (GPU) 2 of the graphics processing system first renders front (forward), left and right frames (views) and writes these to memory 7 (step 170).

Then, (second) head tracking (orientation (pose)) information is read (step 171), and used to determine where the user's head is actually positioned with respect to the first head orientation (pose) sensed at the beginning of rendering the front (first) frame. If the user's head is positioned significantly to the right (e.g. more than a certain angle and/or distance) compared to the sensed first head orientation (pose) (step 172A), then rendered data from the right frame is selected and subsequently used (step 173A); if the user's head is positioned significantly to the left (e.g. more than a certain angle and/or distance) compared to the sensed first head orientation (pose) (step 172B), then rendered data from the left frame is selected and subsequently used (step 173B); otherwise, rendered data from the front frame is selected and used (step 173C).

The selected rendered data is then processed ("timewarped") by the display controller 4 (step 174), and the output processed ("timewarped") image is sent directly to the display panel 8 for display by the display controller 4 (step 177). The selected rendered data may also or instead be subjected, for example, to a lens distortion correction transformation, a chromatic aberration (distortion) correction transformation and/or a "spacewarp" transformation by the display controller 4.

If there are more output processed ("timewarped") frames to be generated from the current front, left and right frames (views), then further head tracking (orientation (pose)) information is read and the process is repeated using this further head tracking (orientation (pose)) (step 178). Otherwise, new front, left and right frames (views) are rendered by the graphics processing unit (GPU) 2, and the overall process is repeated using the new front, left and right frames (views) (step 179). A sequence of output processed ("timewarped") frames is thus provided for display.

Figure 18:
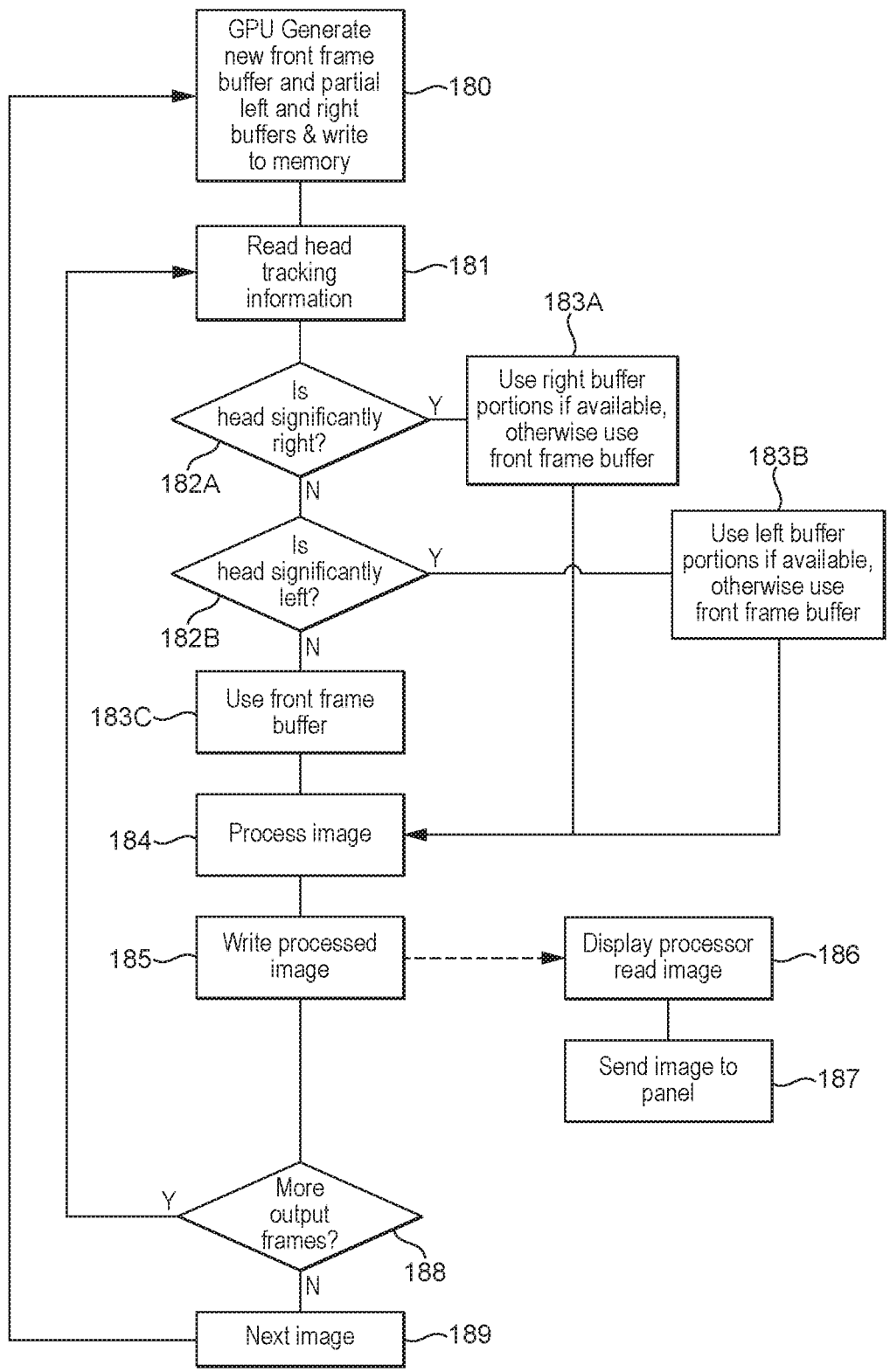
FIG. 18 is a flowchart showing schematically the operation of a graphics processing system according to an embodiment of the technology described herein.

FIG. 18 shows schematically the operation of a graphics processing system, such as is illustrated in FIG. 1, in accordance with another embodiment of the technology described herein. In this embodiment, rather than rendering entire left and right frames (views), as in the embodiments of FIGS. 16 and 17, only partial left and right frames (views) are rendered.

As shown in FIG. 18, in this embodiment, as in the embodiments shown in FIGS. 16 and 17, a graphics processing unit (GPU) 2 of the graphics processing system first renders a front (forward) (first) frame based on a first head orientation (pose) that was sensed (at a first point in time) at the beginning of rendering the front frame. In contrast with the embodiments shown in FIGS. 16 and 17, however, in the present embodiment, the graphics processing unit (GPU) 2 renders only partial left and right frames (views). The front (forward), partial left, and partial right frames (views) are then written to memory (step 180).

Then, (second) head tracking (orientation (pose)) information is read (at a second, later point in time) (step 181), and used to determine where the user's head is actually positioned with respect to the first head orientation (pose) sensed (at the first point in time) at the beginning of rendering the front (first) frame. If the user's head is positioned significantly to the right (e.g. more than a certain angle and/or distance) compared to the sensed first head orientation (pose), then for regions of the output frame where rendered right frame data is available, rendered data from the partial right frame is selected and subsequently used (step 183A). If the user's head is positioned significantly to the left (e.g. more than a certain angle and/or distance) compared to the sensed first head orientation (pose), then for regions of the output frame where rendered left frame data is available, rendered data from the partial left frame is selected and subsequently used (step 183B). Otherwise, rendered data from the front frame is selected and used (step 183C).

The selected rendered data is then processed, e.g. by "timewarp" processing, by the graphics processing unit (GPU) 2 (step 184), and the output processed ("timewarped") image is written to memory 7 (step 185), from where it is read by the display processor (controller) 4 (step 186) which sends the image to the display panel 8 for display (step 187). The selected rendered data may also or instead be subjected, for example, to a lens distortion correction transformation, a chromatic aberration (distortion) correction transformation and/or a "spacewarp" transformation.

(Alternatively, the selected rendered data is then processed, e.g. by "timewarp" processing, by the display controller 4, which then provides the output processed ("timewarped") image directly for display on the display panel 8.)

If there are more output processed ("timewarped") frames to be generated from the current front, partial left and partial right frames (view), then further head tracking (orientation (pose)) information is read and the process is repeated using this further head tracking (orientation (pose)) (step 188). Otherwise, new front, partial left and partial right frames (views) are rendered by the graphics processing unit (GPU) 2, and the overall process is repeated using the new front, partial left and partial right frames (views) (step 189). A sequence of output processed ("timewarped") frames is thus provided for display.

Figure 19:
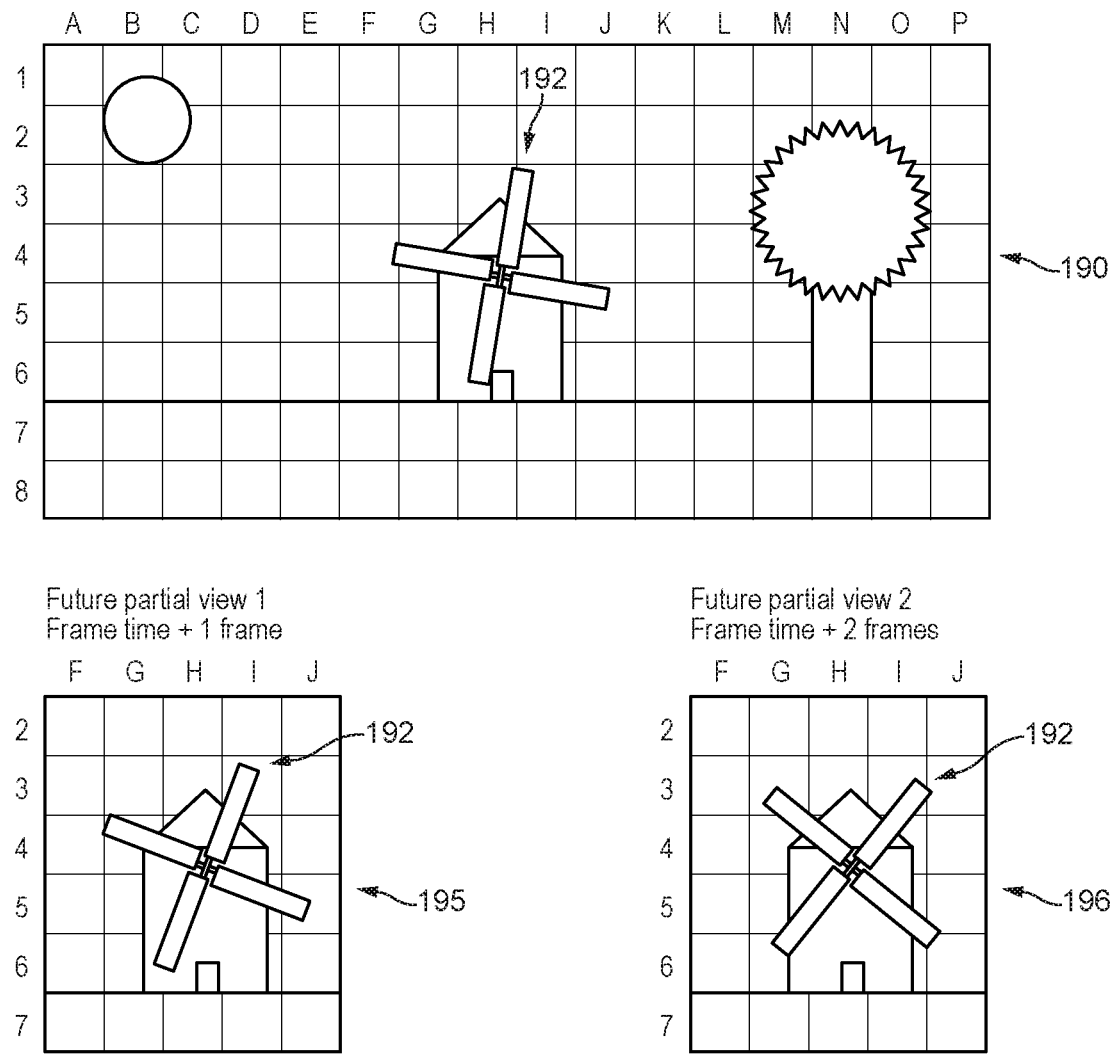
FIG. 19 illustrates exemplary forward and future views of a scene that are rendered according to an embodiment of the technology described herein.

Another embodiment will now be described. FIG. 19 shows a scene comprising a number of objects including a windmill 192 that includes sails that are moving clockwise. Thus, in contrast to the embodiments of FIGS. 11 and 12, the scene shown in FIG. 19 is a dynamic scene including moving objects.

In the embodiment of FIG. 19, as in the embodiment of FIGS. 11 and 12, a first application frame 190 (representing a forward view) is rendered by the graphics processing unit (GPU) 2 based on first view orientation (pose) data sensed at a first point in time at the beginning of the graphics processing unit (GPU) 2 rendering the application frame 190. In this view of the scene, the moving sails of the windmill 192 appear at their positions at the first point in time. Thus, application frame 190 essentially represents a static "snapshot" of the scene at the first point in time that the first view orientation (pose) was sensed.

In this embodiment, it may then be determined that application frame 190 contains moving objects, and then first and second future views 195, 196 are rendered by the graphics processing unit (GPU) 2. In this embodiment, future views 195, 196 are (future) partial views that only show a region that includes windmill 192; however, (future) full views (i.e. having the same field of view as application frame 190) could also or instead be rendered.

In this embodiment, first future view 195 represents a view of the scene at a point in time that an output (e.g. "timewarped" and/or "spacewarped") version of application frame 190 to be generated is to represent a view of the scene at. Similarly, second future view 196 represents a view of the scene at a later point in time that a later output (e.g. "timewarped" and/or "spacewarped") version of application frame 190 to be generated is to represent a view of the scene at. (Other future or past views of the scene based on different points in time may also or instead be rendered.) Thus, as shown in FIG. 19, the sails of windmill 192 appear rotated clockwise in first and second future views 195, 196 as compared to application frame 190, and regions of the windmill that were occluded in application frame 190 by the sails are shown in first and second future views 195, 196.

If, as discussed above, rather than being directly rendered by the graphics processing unit (GPU) 2, each of the frames 195, 196 were instead to be generated by transforming the rendered application frame 190 by "timewarp" processing, then each "timewarped" frame would show the sails of the windmill 192 at the same position that it is shown in the application frame 190, because "timewarp" processing does not account for any such object motion. Thus the sails of windmill 192 would appear in each of the "timewarped" frames at a position that corresponds to an earlier point in time than it should do (i.e. the point in time that the application frame represents a view of the scene at). Moreover, the sails of windmill 192 would appear at the same position in each of the "timewarped" frames, and so would appear to be static in those frames. This means that distortions in what is displayed to a user would be introduced.

In the present embodiment therefore, the rendered data for the two further versions of the scene, first future view 195 and second future view 196, can be (and in an embodiment is) used to, when performing "timewarp" and/or "spacewarp" processing, to provide data for regions of the scene that could otherwise be significantly distorted by the "timewarp" and/or "spacewarp" processing, e.g. regions of the scene that include moving objects, and regions of the scene that are "disoccluded" (by those moving objects), i.e. occluded in the application frame view 190, but that become visible due to object motion during the time period that rendered views are used for display. This means that distortions and artefacts that could otherwise be caused by "timewarp" and/or "spacewarp" processing can be avoided or reduced. For example, a smoother virtual reality (VR) or augmented reality (AR) experience can be provided.

Figure 20:
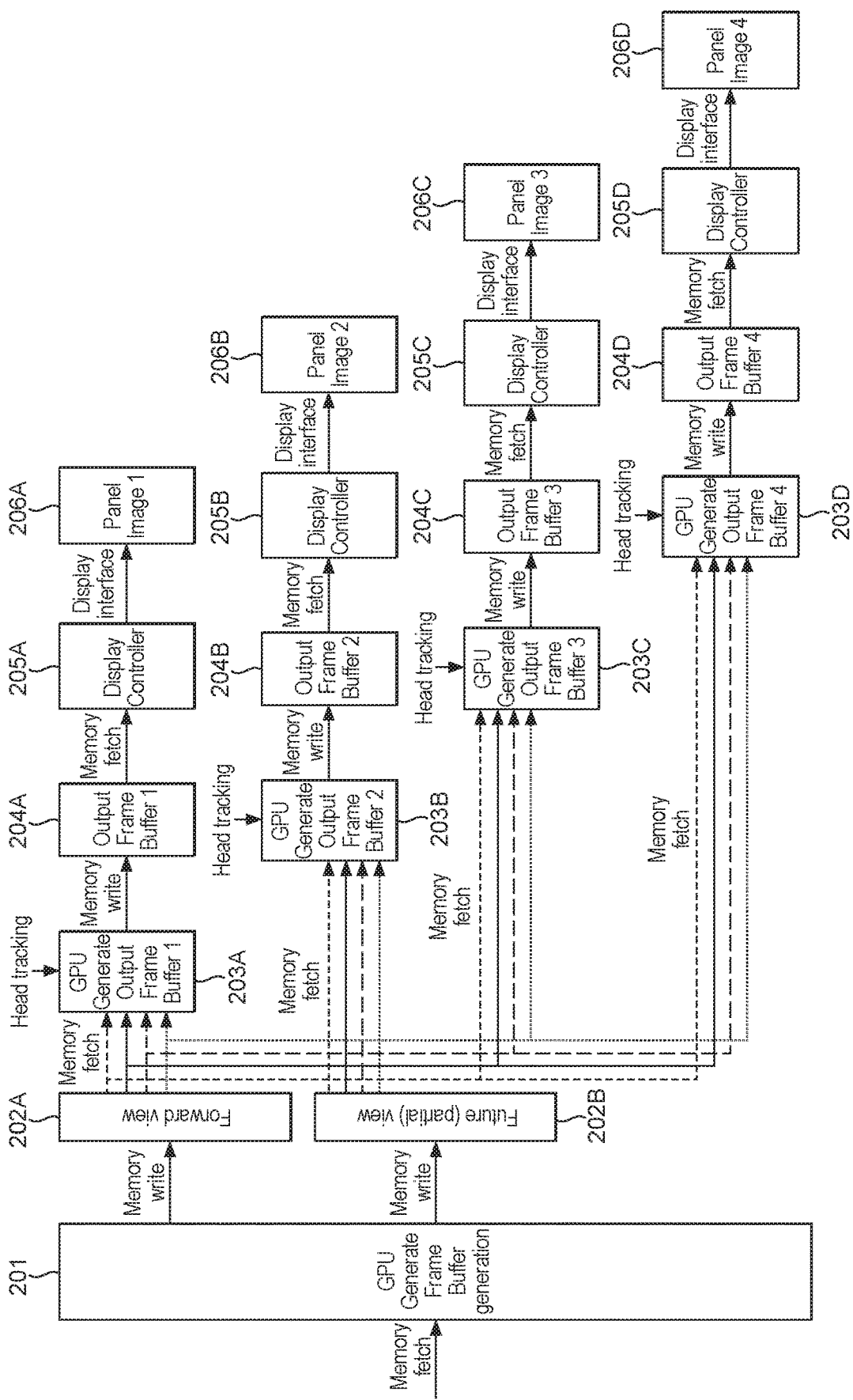
FIG. 20 shows schematically the flow of data and relative timings of processes in a graphics processing system when performing "timewarp" and/or "spacewarp" processing according to an embodiment of the technology described herein.

FIG. 20 schematically illustrates the flow of data and the relative timings of processes in a graphics processing system, such as is illustrated in FIG. 1, when performing "timewarp" and/or "spacewarp" processing in accordance with an embodiment of the technology described herein, such as is illustrated in FIG. 19.

In the present embodiment, the graphics processing unit (GPU) 2 generates a set of rendered data representing multiple different views (versions) of the scene, and selected rendered data of the set of rendered data is then subjected to "timewarp" and/or "spacewarp" processing.

Thus, as shown in FIG. 20, in the present embodiment, as in the embodiment of FIG. 15, graphics processing unit (GPU) 2 fetches appropriate commands and data (generated by the driver for the GPU 2 executing on the CPU 1) from memory 7, which cause the graphics processing unit (GPU)

2 to generate (render) a forward view (application frame) based on head tracking (orientation (pose)) data sensed at a first point in time at the beginning of the graphics processing unit (GPU) 2 rendering the forward view (application frame) (block 201), and to store the rendered forward view (application frame) in a frame buffer in main memory 7 (block 202A).

In this embodiment, as in the embodiment of FIG. 15, the rendered forward view (application frame) represents a (first) forward view of the scene being rendered from a (first) head orientation (pose) corresponding to the head tracking (orientation (pose)) data sensed at a first point in time. However, instead of generating (rendering) further versions of the scene representing left and right views of the scene as in the embodiment of FIG. 15, in the present embodiment (when it is determined that the scene contains a moving object) the graphics processing unit (GPU) 2 generates (renders) (in block 201) a future view of the scene representing a view of the scene at a further point in time after the first point in time that the forward view (application frame) represents a view of the scene at. The future view is stored in a frame buffer in main memory 7 (block 202B).

Then, in the present embodiment, as in the embodiment of FIG. 15, before an image is actually displayed on the display 8, further (second) head tracking (orientation (pose)) data is sensed (at a second point in time). In contrast to the embodiment of FIG. 15, however, the (second) point in time at which the further head tracking (orientation (pose)) data is sensed is then used by the graphics processing unit (GPU) 2 to select appropriate rendered data to be used for display from the rendered forward view and future view.

For example, if the (second) point in time at which the further head tracking (orientation (pose)) data is sensed is closer to the further point in time that the future view was rendered based on than the first point in time that the forward view was rendered based on, then rendered future view data may be selected; and otherwise, rendered forward view data may be selected.

Then, in the present embodiment, the selected rendered data is transformed by the graphics processing unit (GPU) 2 by "timewarp" processing using the further (second) sensed head tracking (orientation (pose)) data and/or "spacewarp" processing to generate a first "timewarped" and/or "spacewarped" output frame (block 203A).

The first "timewarped" and/or "spacewarped" output frame is stored in a (first) output frame buffer in main memory 7 (block 204A), and the display controller 4 then reads the first "timewarped" and/or "spacewarped" output frame stored in the (first) frame buffer (block 205A), and provides it for display on the display panel of the head mounted display 8 (block 206A).

Meanwhile, once the graphics processing unit (GPU) 2 has finished transforming the selected rendered data to generate the first "timewarped" and/or "spacewarped" output frame (in block 203A), it will be available to perform another instance of "timewarp" and/or "spacewarp" processing based on new (second) head tracking (orientation (pose)) data. Thus, new head tracking (orientation (pose)) data is sensed, and the point in time that that updated head tracking (orientation (pose)) data is sensed is used by the graphics processing unit (GPU) 2 to select rendered data, which is transformed using the updated head tracking (orientation (pose)) data to generate a second "timewarped" and/or "spacewarped" output frame for display (block 203B), which is stored in a (second) output frame buffer in main memory 7 (block 204B).

The display controller 4 then reads the second "timewarped" and/or "spacewarped" output frame stored in the (second) frame buffer (block 205B), and provides it for display on the display panel of the head mounted display 8 (block 206B).

In the present embodiment, the above steps are then repeated to generate and display two further "timewarped" and/or "spacewarped" output frames on the display panel of the display 8 (blocks 203C, 204C, 205C and 206C; and blocks 203D, 204D, 205D and 206D). The entire process may then be repeated one or more times to generate one or more new future (and past) views, and to select and subject the selected rendered data to four "timewarp" and/or "spacewarp" processes, so as to display an appropriate sequence of "timewarped" and/or "spacewarped" output frames on the head mounted display 8.

(In another embodiment, the display controller 4 selects rendered data and/or transforms the selected rendered data by "timewarp" and/or "spacewarp" processing to generate "timewarped" and/or "spacewarped" output frames, and then provides the "timewarped" and/or "spacewarped" output frames directly for display to the head mounted display 8.)

Figure 21:
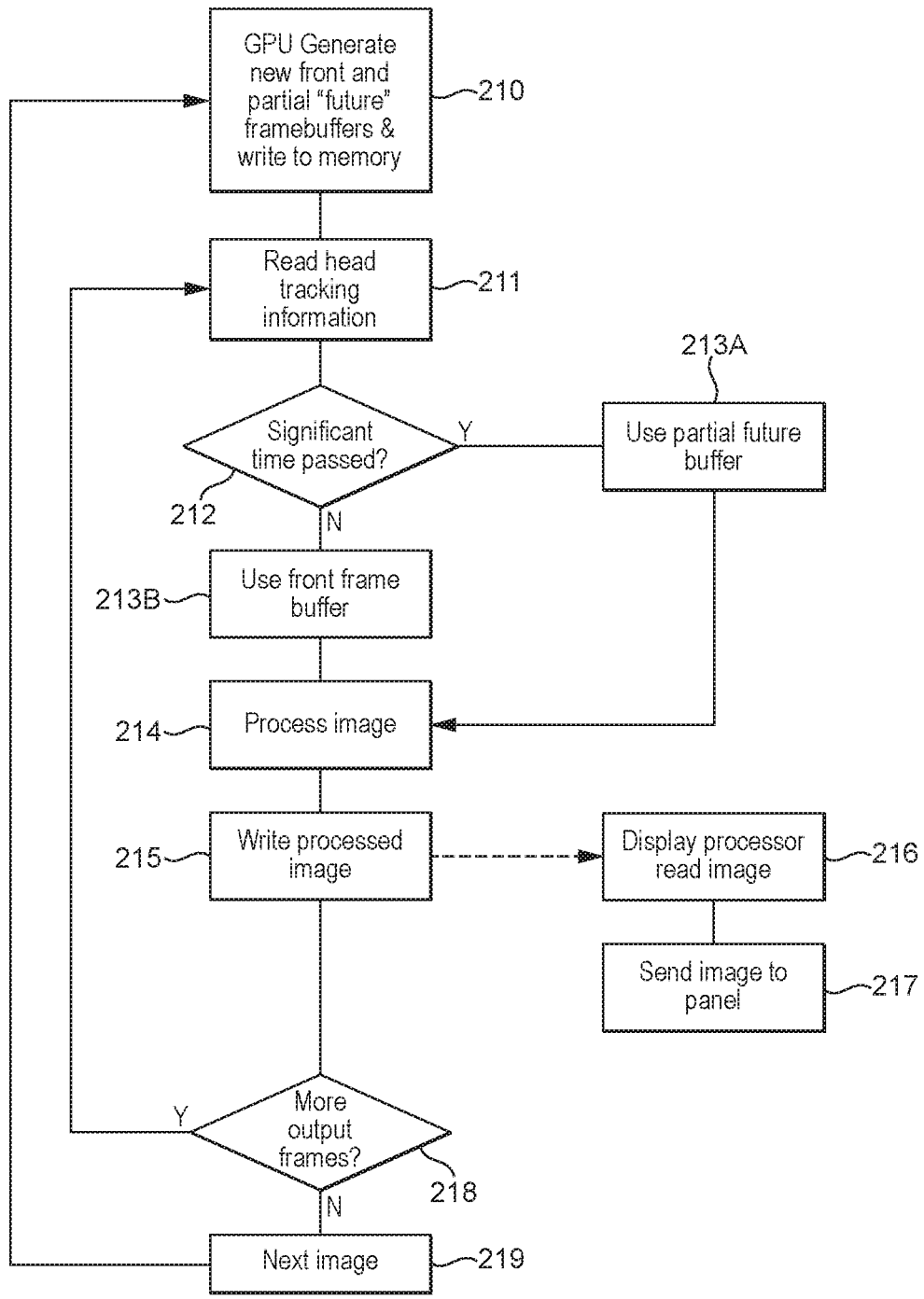
FIG. 21 is a flowchart showing schematically the operation of a graphics processing system according to an embodiment of the technology described herein.

FIG. 21 shows schematically the operation of a graphics processing system, such as is illustrated in FIG. 1, in accordance with an embodiment of the technology described herein. As shown in FIG. 21, in the present embodiment, a graphics processing unit (GPU) 2 of the graphics processing system first renders front (forward) and partial future frames (views) and writes these to memory 7 (step 210).

In this embodiment, as discussed above, the front (first) frame represents a first view of a scene from a first viewpoint and first view direction based on a first head orientation (pose) that was sensed at a first point in time at the beginning of rendering the front frame, and the partial future frame represents a partial view of the scene at a further, later point in time. (A full future frame may also or instead be rendered).

Then, (second) head tracking (orientation (pose)) information is read (step 211) at a second point in time. If the second point in time is significantly later than the first point in time (and thus closer to the further point in time that the future frame was rendered based on) (step 212), then for regions of the output frame where rendered future frame data is available, rendered data from the future frame is selected and subsequently used (step 213A); otherwise, rendered data from the front frame is selected and used (step 213B).

The selected rendered data is then processed, e.g. by "timewarp" and/or "spacewarp" processing, by the graphics processing unit (GPU) 2 (step 214), and the processed ("timewarped" and/or "spacewarped") output image is written to memory 7 (step 215), from where it is read by the display processor (controller) 4 (step 216) which sends the image to the display panel 8 for display (step 217). The selected rendered data may also or instead be subjected, for example, to a lens distortion correction transformation and/or a chromatic aberration (distortion) correction transformation by the graphics processing unit (GPU) 2.

If there are more processed ("timewarped" and/or "spacewarped") output frames to be generated from the current front and partial future frames (views), then further head tracking (orientation (pose)) information is read at a further point in time and the process is repeated using this further head tracking (orientation (pose)) information (step 218). Otherwise, new front and partial future frames (views) are rendered by the graphics processing unit (GPU) 2, and the overall process is repeated using the new front and partial future frames (views) (step 219). A sequence of processed ("timewarped" and/or "spacewarped") output frames is thus provided for display.

Figure 22:
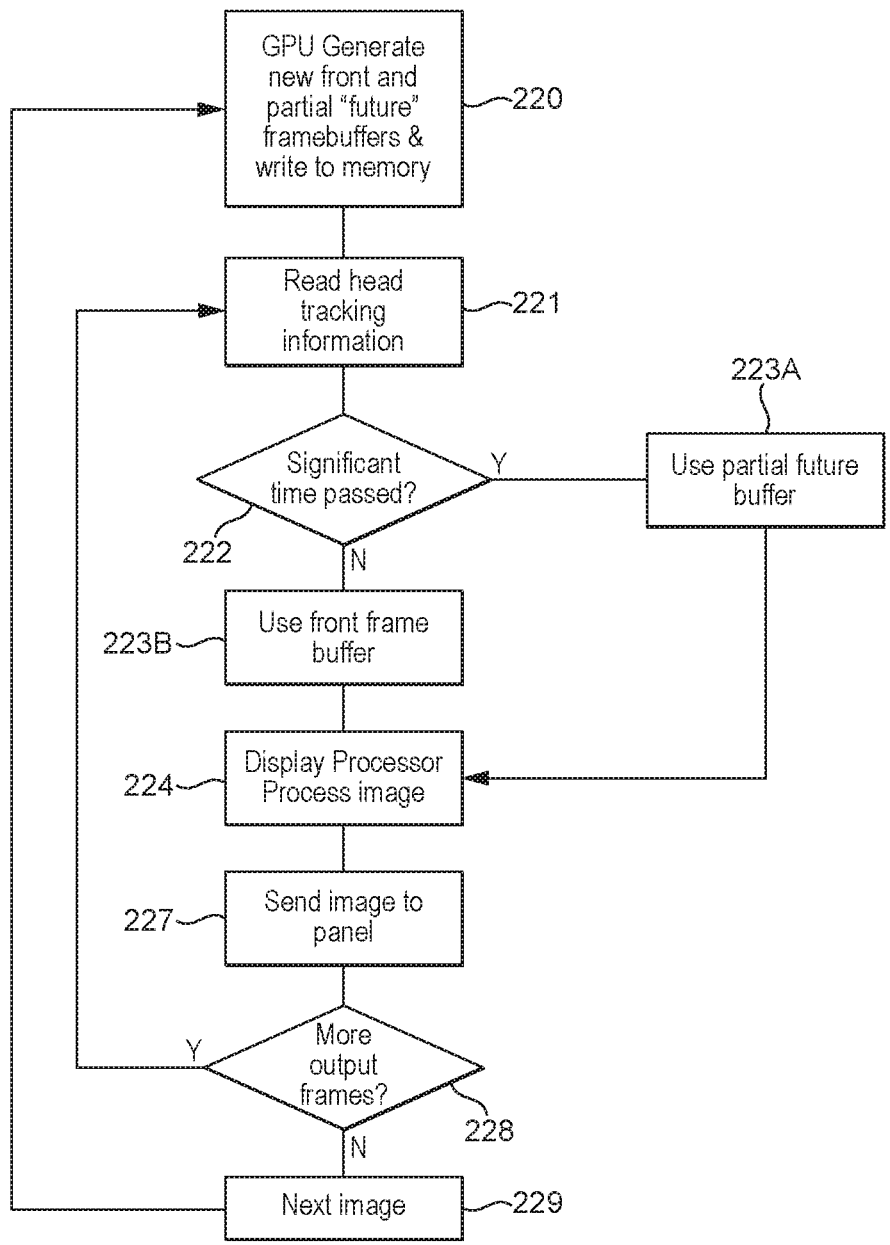
FIG. 22 is a flowchart showing schematically the operation of a graphics processing system according to an embodiment of the technology described herein.

FIG. 22 shows schematically the operation of a graphics processing system, such as is illustrated in FIG. 1, in accordance with another embodiment of the technology described herein. In this embodiment, the display controller 4 processes frames, rather than the graphics processing unit (GPU) 2, as in the embodiment shown in FIG. 21.

As shown in FIG. 22, in this embodiment, as in the embodiment of FIG. 21, a graphics processing unit (GPU) 2 of the graphics processing system first renders front (forward) and partial future frames (views), and writes these to memory 7 (step 220).

Then, (second) head tracking (orientation (pose)) information is read at a second point in time (step 221). If the second point in time is significantly later than the first point in time that the front frame was rendered based on (and thus closer to the further point in time that the future frame was rendered based on) (step 222), then for regions of the output frame where rendered future frame data is available, rendered data from the partial future frame is selected and subsequently used (step 223A); otherwise, rendered data from the front frame is selected and used (step 223B).

The selected rendered data is then processed by the display controller 4 (step 224), and the processed ("timewarped" and/or "spacewarped") output image is sent directly to the display panel 8 for display by the display controller 4 (step 227). The selected rendered data may also or instead be subjected, for example, to a lens distortion correction transformation and/or a chromatic aberration (distortion) correction transformation by the display controller 4.

If there are more processed ("timewarped" and/or "spacewarped") output frames to be generated from the current front and partial future frames (views), then further head tracking (orientation (pose)) information is read at a further point in time, and the process is repeated using this further head tracking (orientation (pose)) (step 228). Otherwise, new front and partial future frames (views) are rendered by the graphics processing unit (GPU) 2, and the overall process is repeated using the new front and partial future frames (views) (step 229). A sequence of processed ("timewarped" and/or "spacewarped") output frames is thus provided for display.

Figure 23:
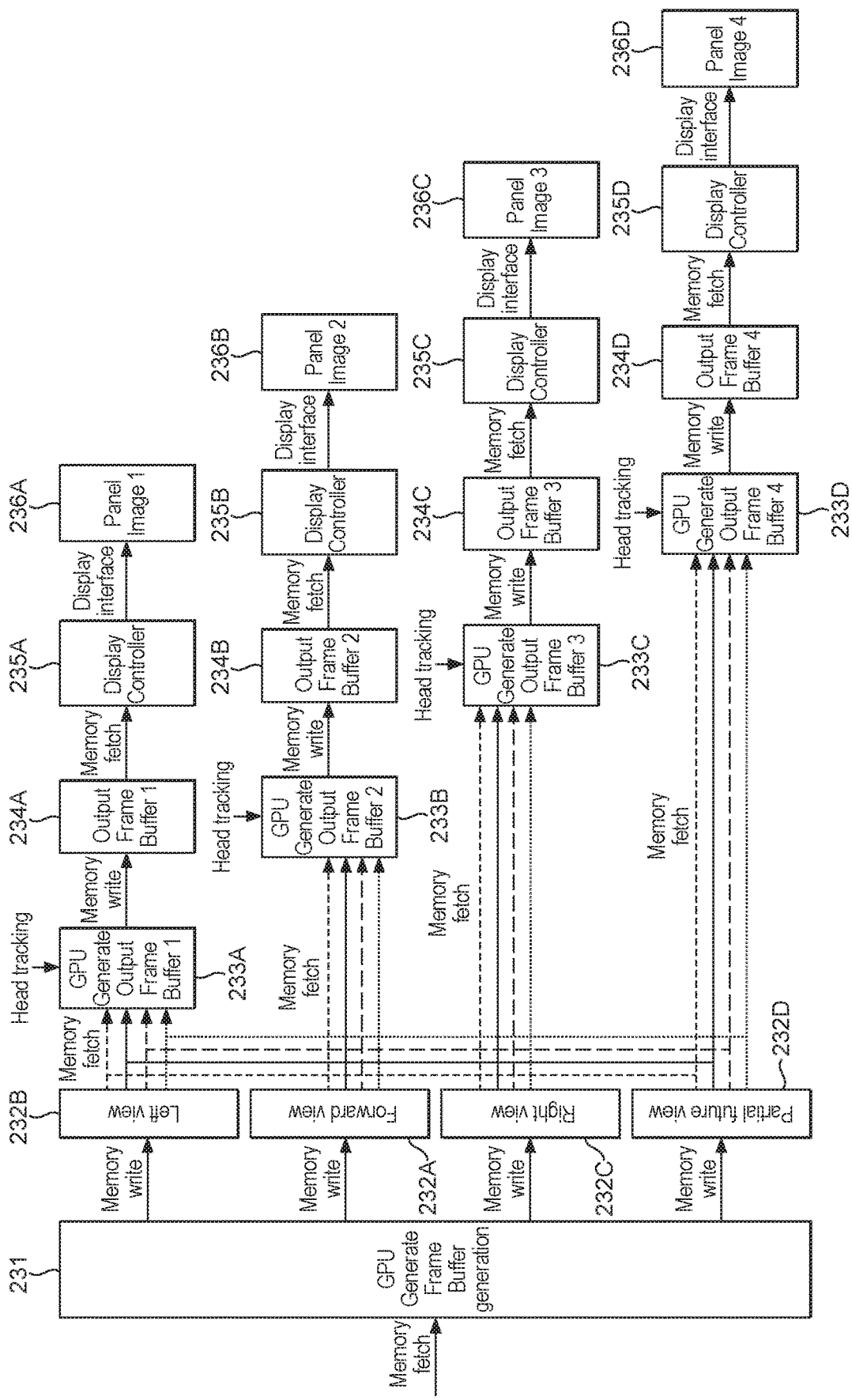
FIG. 23 shows schematically the flow of data and relative timings of processes in a graphics processing system when performing "timewarp" and/or "spacewarp" processing according to an embodiment of the technology described herein.

Another embodiment will now be described. FIG. 23 schematically illustrates the flow of data and the relative timings of processes in a graphics processing system, such as is illustrated in FIG. 1, when performing "timewarp" and/or "spacewarp" processing in accordance with an embodiment of the technology described herein.

In the present embodiment, as in the embodiments of FIGS. 15 and 20, the graphics processing unit (GPU) 2 generates a set of rendered data representing multiple different views (versions) of the scene, and selected rendered data of the set of rendered data is then subjected to "timewarp" and/or "spacewarp" processing.

Thus, as shown in FIG. 23, in the present embodiment, as in the embodiments of FIGS. 15 and 20, graphics processing unit (GPU) 2 fetches appropriate commands and data (generated by the driver for the GPU 2 executing on the CPU 1) from memory 7, which cause the graphics processing unit (GPU) 2 to generate (render) a forward view (application frame) based on head tracking (orientation (pose)) data sensed at a first point in time at the beginning of the graphics processing unit (GPU) 2 rendering the forward view (application frame) (block 231), and to store the rendered forward view (application frame) in a frame buffer in main memory 7 (block 232A). The rendered forward view (application frame) represents a (first) forward view of the scene being rendered from a (first) head orientation (pose) corresponding to the head tracking (orientation (pose)) data sensed at the first point in time.

In the present embodiment, as in the embodiment of FIG. 15, the graphics processing unit (GPU) 2 also generates (renders) (in block 231) two further versions of the scene representing a left view and a right view of the scene. The two further versions are stored in respective frame buffers in main memory 7 (blocks 232B and 232C).

Furthermore, in the present embodiment, as in the embodiment of FIG. 20, the graphics processing unit (GPU) 2 also generates (renders) (in block 231) a future view of the scene representing a view of the scene at a further point in time after the first point in time that the forward view (application frame) (and the left and right views) represents a view of the scene at. The future view is stored in a frame buffer in main memory 7 (block 232D).

Then, in the present embodiment, as in the embodiments of FIGS. 15 and 20, before an image is actually displayed on the display 8, further (second) head tracking (orientation (pose)) data is sensed at a second point in time. The further sensed head tracking (orientation (pose)) data, as well as the second point in time at which it was sensed, are then used by the graphics processing unit (GPU) 2 to select appropriate rendered data to be used for display from the rendered forward view, left view, right view and future view.

For example, if the further sensed head tracking (orientation (pose)) data indicates that the user has moved (rotated and/or translated) their head significantly to the right (e.g. more than a certain angle and/or distance) (compared to their head orientation (pose) sensed at the first point in time at the beginning of the graphics processing unit (GPU) 2 rendering the forward view (application frame) (in block 231)), then rendered right view data may be selected; if the sensed head tracking (orientation (pose)) data indicates that the user has moved (rotated and/or translated) their head significantly to the left (e.g. more than a certain angle and/or distance) (compared to their head orientation (pose) sensed at the first point in time at the beginning of the graphics processing unit (GPU) 2 rendering the forward view (application frame) (in block 231)), then rendered left view data may be selected; if the second point in time at which the further head tracking (orientation (pose)) data is sensed is closer to the further point in time that the future view was rendered based on than the first point in time that the forward view was rendered based on, then rendered future view data may be selected; and otherwise, rendered forward view data may be selected.

Then, in the present embodiment, the selected rendered data is transformed by the graphics processing unit (GPU) 2 by "timewarp" and/or "spacewarp" processing using the further (second) sensed head tracking (orientation (pose)) data to generate a first "timewarped" and/or "spacewarped" output frame (block 233A).

The first "timewarped" and/or "spacewarped" output frame is stored in a (first) output frame buffer in main memory 7 (block 234A), and the display controller 4 then reads the first "timewarped" and/or "spacewarped" output frame stored in the (first) frame buffer (block 235A), and provides it for display on the display panel of the head mounted display 8 (block 236A).

Meanwhile, once the graphics processing unit (GPU) 2 has finished transforming the selected rendered data to generate the first "timewarped" and/or "spacewarped" output frame (in block 233A), it will be available to perform another instance of "timewarp" and/or "spacewarp" processing based on new (second) head tracking (orientation (pose)) data. Thus, new head tracking (orientation (pose)) data is sensed, and that updated head tracking (orientation (pose)) sensor data, together with the point in time that is was sensed, are used by the graphics processing unit (GPU) 2 to select and transform rendered data again to generate a second "timewarped" and/or "spacewarped" output frame for display (block 233B), which is stored in a (second) output frame buffer in main memory 7 (block 234B).

The display controller 4 then reads the second "timewarped" and/or "spacewarped" output frame stored in the (second) frame buffer (block 235B), and provides it for display on the display panel of the head mounted display 8 (block 236B).

In the present embodiment, the above steps are then repeated to generate and display two further "timewarped" and/or "spacewarped" output frames on the display panel of the display 8 (blocks 233C, 234C, 235C and 236C; and blocks 233D, 234D, 235D and 236D). The entire process may then be repeated one or more times to generate one or more new front, left, right, and future (and up, down, past) views, and to select and subject the selected rendered data to four "timewarp" and/or "spacewarp" processes, so as to display an appropriate sequence of "timewarped" and/or "spacewarped" output frames on the head mounted display 8.

(In another embodiment, the display controller 4 selects rendered data and/or transforms the selected rendered data by "timewarp" and/or "spacewarp" processing to generate "timewarped" and/or "spacewarped" output frames, and then provides the "timewarped" and/or "spacewarped" output frames directly for display to the head mounted display 8.)

Figure 24:
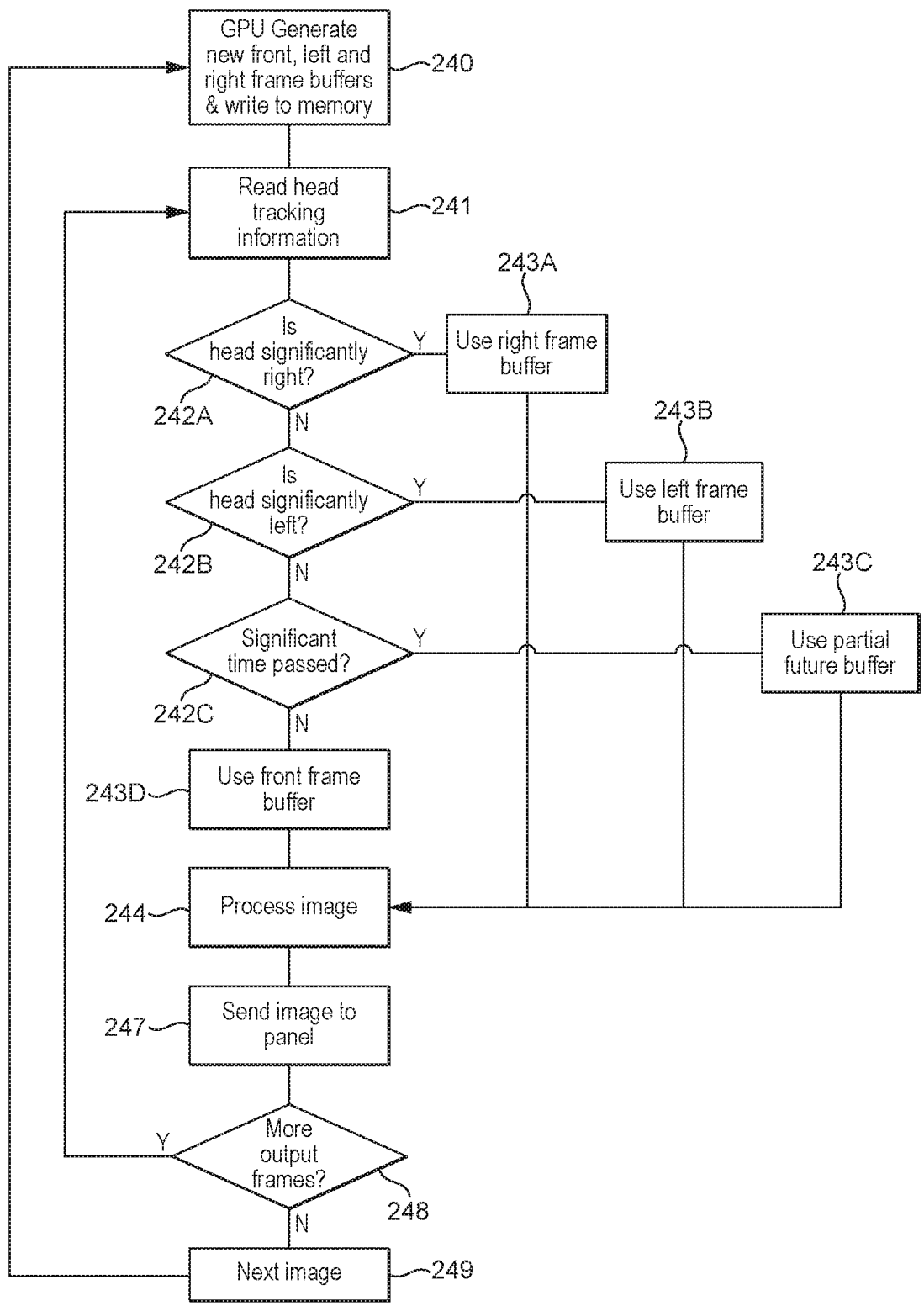
FIG. 24 is a flowchart showing schematically the operation of a graphics processing system according to an embodiment of the technology described herein.

FIG. 24 shows schematically the operation of a graphics processing system, such as is illustrated in FIG. 1, in accordance with an embodiment of the technology described herein. As shown in FIG. 24, in the present embodiment, a graphics processing unit (GPU) 2 of the graphics processing system first renders front (forward), left, right and partial future frames (views) and writes these to memory 7 (step 240).

In this embodiment, as discussed above, the front (first) frame represents a first view of a scene from a first viewpoint and in a first view direction based on a first head orientation (pose) that was sensed at a first point in time at the beginning of rendering the front frame. The left frame represents a second view of the scene based on an assumed turning (rotation and/or translation) of the head to the left starting from the sensed first head orientation (pose), the right frame represents a third view of the scene based on an assumed turning (rotation and/or translation) of the head to the right starting from the sensed first head orientation (pose), and the future view represents a view of the scene at a further later point in time.

Then, (second) head tracking (orientation (pose)) information is read at a second point in time (step 241), and used to determine where the user's head is actually positioned with respect to the first head orientation (pose) sensed at the first point in time at the beginning of rendering the front (first) frame. If the user's head is positioned significantly to the right (e.g. more than a certain angle and/or distance) compared to the sensed first head orientation (pose) (step 242A), then rendered data from the right frame is selected and subsequently used (step 243A); if the user's head is positioned significantly to the left (e.g. more than a certain angle and/or distance) compared to the sensed first head orientation (pose) (step 242B), then rendered data from the left frame is selected and subsequently used (step 243B); if the second point in time is significantly later than the first point in time (steps 242C), then rendered data from the future frame is selected and subsequently used (step 243C); otherwise, rendered data from the front frame is selected and used (step 243D).

The selected rendered data is then processed, e.g. by "timewarp" and/or "spacewarp" processing, by the graphics processing unit (GPU) 2 (step 244), and the output processed ("timewarped" and/or "spacewarped") image is sent to the display panel 8 for display (step 247). The selected rendered data may also or instead be subjected, for example, to a lens distortion correction transformation and/or a chromatic aberration (distortion) correction transformation by the graphics processing unit (GPU) 2.

If there are more processed ("timewarped" and/or "spacewarped") output frames to be generated from the current front, left, right and future frames (views), then further head tracking (orientation (pose)) information is read and the process is repeated using this further head tracking (orientation (pose)) information (step 248). Otherwise, new front, left, right and future frames (views) are rendered by the graphics processing unit (GPU) 2, and the overall process is repeated using the new front, left, right and future frames (views) (step 249). A sequence of processed ("timewarped" and/or "spacewarped") output frames is thus provided for display.

It will be appreciated that although the above embodiments have been described with particular reference to rendering a set of views including further left and right views (versions), in addition to a (frame representing a) forward or front view, other further views (versions) could also or instead be rendered. For example, plural left/right views (versions) could be rendered, with each view (version) being based on turning (rotating) and/or moving (translating) the head to the left/right by a different angle and/or distance. Similarly, views (versions) based on other head movements (rotations and/or translations), such as up and/or down, could also or instead be rendered.

Similarly, although the above embodiments have been described with particular reference to rendering a set of views including a future view (version), in addition to a (frame representing a) forward or front view, other further views (versions) could also or instead be rendered. For example, plural future views (versions) could be rendered, with each future view (version) being based on a different future point in time. Similarly, past views (versions) based on past points in time, could also or instead be rendered.

Furthermore, a further view (or views) could be rendered based on both a head movement (rotation and/or translation) and a future (or past) point in time. The further views (versions) that are rendered are, in an embodiment, selected to encompass an appropriate range of further views (versions) based on, e.g. predicted or assumed head movements (rotations and/or translations) that the user of the head mounted display might make relative to the sensed (first) head orientation (pose) that the (frame representing the) forward view is rendered based on, predicted or assumed object movements, and/or points in time at which output ("timewarped" and/or "spacewarped") versions of the forward view are to represent views of the scene at.

Furthermore, it will be appreciated that although the above embodiments have been described with reference to rendering a single set of views (including e.g. a single forward view, a single left view, a single right view and a single future view), there may be plural sets of views rendered, e.g. one set of (plural) views for each eye. Thus, there may be, e.g. a first set of views (including e.g. a single forward view, a single left view, a single right view and a single future view) rendered for the left eye; and another set of views (including e.g. a single forward view, a single left view, a single right view and a single future view) rendered for the right eye, etc. The respective sets of views may then each be subjected to "timewarp" and/or "spacewarp" processing (as described above), and a respective sequence of "timewarped" and/or "spacewarped" output frames may thus be displayed to each eye appropriately using the head mounted display 8 so as to provide a three-dimensional effect when the images are viewed.

Furthermore, in the above embodiments, a single set of views (including e.g. a forward, left, right view and future view) is subjected to four "timewarp" and/or "spacewarp" processes. Thus, "timewarp" and/or "spacewarp" processing is performed at a rate (such as 120 frames per second) that is four times faster than the graphics processing unit (GPU) 2 renders frames at (such as 30 frames per second). It will be appreciated, however, that any desired number of "timewarp" and/or "spacwarp" processes, such as one or two, could be performed for each set of rendered views.

It can be seen from the above, the technology described herein, in its embodiments at least, provides an improved graphics processing system that provides "timewarped" images for display for virtual reality (VR) and/or augmented reality (AR) (head mounted) display systems. This is achieved, in embodiments of the technology described herein at least, by, before generating an output version of a first rendered frame, rendering one or more further versions of the first frame, with each of the further versions of the first frame representing a different view of the scene to the first frame.

One embodiment includes a graphics processing system comprising a rendering circuit operable to render frames each representing a view of a scene of one or more objects and an output frame generating circuit operable to generate output frames for display from rendered frames by transforming rendered frames based on received view orientation data and/or object motion. The graphics processing system is configured to render by the rendering circuit a first rendered frame representing a first view of a scene at a first point in time, from a first viewpoint, and in a first view direction; render by the rendering circuit one or more further versions of the first frame, each further version representing a further view of the scene at a further point in time, and/or from a further viewpoint and/or in a further view direction; and then generate by the output frame generating circuit an output frame for display using rendered data from the rendered first frame and/or rendered data from one or more of the one or more rendered further versions of the first frame.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system that renders frames each representing a view of a scene of one or more objects, and generates output frames for display from rendered frames by transforming rendered frames based on received view orientation data and/or object motion, the method comprising:
   rendering a first frame representing a first view of a scene at a first point in time, from a first viewpoint, and in a first view direction; and before generating an output frame for display using rendered data from the rendered first frame;
   rendering one or more further versions of the first frame, each further version representing a further view of the scene at a further point in time after the first point in time, and/or from a further viewpoint and/or in a further view direction; and then
   selecting rendered data to use to generate an output frame for display from the rendered first frame and the one or more rendered further versions of the first frame; and
   generating the output frame for display using the selected rendered data.

2. The method of claim 1, further comprising:
   rendering the first frame using first input data; and
   rendering at least one of the one or more further versions of the first frame using at least some of the first input data.

3. The method of claim 1, further comprising:
   determining whether an object in the first view of the scene is close to the first viewpoint; and
   rendering at least one of the one or more further versions of the first frame only when it is determined that an object in the first view of the scene is close to the first viewpoint.

4. The method of claim 1, further comprising:
   determining whether an object in the first view of the scene is moving; and
   rendering at least one of the one or more further versions of the first frame based on a respective further point in time only when it is determined that an object in the first view of the scene is moving.

5. The method of claim 1, further comprising:
   determining whether rendering at least one of the one or more further versions of the first frame, would, if performed, not exceed a processing limit of the graphics processing system; and
   rendering the at least one of the one or more further versions of the first frame only when it is determined that the processing limit would not be exceeded.

6. The method of claim 1, further comprising:
   selecting the further point in time, and/or further viewpoint and/or further view direction for at least one of the one or more further versions based on at least one of:
   (i) one or more properties of an object determined to be close to the first viewpoint and/or moving;
   (ii) received view orientation data;
   (iii) information provided by an application that the first frame is rendered for; and
   (iv) a processing capability of the graphics processing system.

7. The method of claim 1, further comprising:
   rendering and/or storing at least one of the one or more further versions of the first frame at a lower quality to the first frame; and/or
   updating at least one of the one or more further versions of the first frame less frequently than the first frame.

8. The method of claim 1, further comprising:
for at least one of the one or more further versions:
determining a region of the scene that contains:
an object close to the first viewpoint and/or moving; and
a part of the scene that is occluded by the object in the first view of the scene that the first frame represents, but that is not occluded by the object in a view of the scene that the respective further version represents; and
rendering the respective further version for only some but not all of the first frame based on the respective determined region of the scene.

9. The method of claim 1, wherein generating the output frame for display using the selected rendered data comprises:
transforming the selected rendered data based on received view orientation data and/or object motion.

10. A method of generating an output frame for display for a display system, the method comprising:
receiving view orientation data sensed by the display system; and
selecting, based on the received view orientation data, rendered data to use to generate the output frame from:
(i) rendered data for a first frame rendered based on a first point in time and a first view orientation; and
(ii) rendered data for one or more further versions of the first frame, each further version rendered based on a further point in time after the first point in time and/or further view orientation and rendered before generating an output frame for display using rendered data from the rendered first frame; and
generating the output frame for display using the selected rendered data.

11. A graphics processing system comprising:
a rendering circuit operable to render frames each representing a view of a scene of one or more objects; and
an output frame generating circuit operable to generate output frames for display from rendered frames by transforming rendered frames based on received view orientation data and/or object motion;
wherein the graphics processing system is configured to:
render by the rendering circuit a first rendered frame representing a first view of a scene at a first point in time, from a first viewpoint, and in a first view direction;
before generating an output frame for display using rendered data from the rendered first frame, render by the rendering circuit one or more further versions of the first frame, each further version representing a further view of the scene at a further point in time after the first point in time, and/or from a further viewpoint and/or in a further view direction; and then
select rendered data to use to generate an output frame for display from the rendered first frame and the one or more rendered further versions of the first frame; and
generate by the output frame generating circuit the output frame for display using the selected rendered data.

12. The system of claim 11, wherein the graphics processing system is further configured to:
render the first frame using first input data; and
render at least one of the one or more further versions of the first frame using at least some of the first input data.

13. The system of claim 11, wherein the graphics processing system is further configured to:
determine whether an object in the first view of the scene is close to the first viewpoint; and
render at least one of the one or more further versions of the first frame only when it is determined that an object in the first view of the scene is close to the first viewpoint.

14. The system of claim 11, wherein the graphics processing system is further configured to:
determine whether an object in the first view of the scene is moving; and
render at least one of the one or more further versions of the first frame based on a respective further point in time only when it is determined that an object in the first view of the scene is moving.

15. The system of claim 11, wherein the graphics processing system is further configured to:
determine whether rendering at least one of the one or more further versions of the first frame, would, if performed, not exceed a processing limit of the graphics processing system; and
render the at least one of the one or more further versions of the first frame only when it is determined that the processing limit would not be exceeded.

16. The system of claim 11, wherein the graphics processing system is further configured to select the further point in time, and/or further viewpoint and/or further view direction for at least one of the one or more further versions based on at least one of:
(i) one or more properties of an object determined to be close to the first viewpoint and/or moving;
(ii) received view orientation data;
(iii) information provided by an application that the first frame is rendered for; and
(iv) a processing capability of the graphics processing system.

17. The system of claim 11, wherein the graphics processing system is further configured to:
render and/or store at least one of the one or more further versions of the first frame at a lower quality to the first frame; and/or
update at least one of the one or more further versions of the first frame less frequently than the first frame.

18. The system of claim 11, wherein the graphics processing system is further configured to:
determine, for at least one of the one or more further versions of the first frame, a region of the scene that contains:
an object close to the first viewpoint and/or moving; and
a part of the scene that is occluded by the object in the first view of the scene that the first frame represents, but that is not occluded by the object in a view of the scene that the respective further version represents; and
render the respective further version for only some but not all of the first frame based on the respective determined region of the scene.

19. A display system comprising:
view orientation sensing circuitry operable to sense a head or display orientation of a user of the display system and to provide view orientation data indicative of a sensed head or display orientation; and
processing circuitry configured to select, based on view orientation data provided by the view orientation sensing circuitry, rendered data to use to generate an output frame from at least one of:
(i) rendered data for a first frame rendered based on a first point in time and a first view orientation; and (ii) rendered data for one or more further versions of the first frame, each further version rendered based on a further point in time after the first point in time and/or further view orientation and rendered before generating an output frame for display from the rendered first frame; and to generate the output frame for display using the selected rendered data.

20. A non-transitory computer readable storage medium storing software code which when executing on a processor performs a method of operating a graphics processing system that renders frames each representing a view of a scene of one or more objects, and generates output frames for display from rendered frames by transforming rendered frames based on received view orientation data and/or object motion, the method comprising:

rendering a first frame representing a first view of a scene at a first point in time, from a first viewpoint, and in a first view direction; and before generating an output frame for display using rendered data from the rendered first frame;

rendering one or more further versions of the first frame, each further version representing a further view of the scene at a further point in time after the first point in time, and/or from a further viewpoint and/or in a further view direction; and then selecting rendered data to use to generate an output frame for display from the rendered first frame and the one or more rendered further versions of the first frame; and generating the output frame for display using the selected rendered data.

* * * * *

UNITED STATES PATENT AND TRADEMARK OFFICE
CERTIFICATE OF CORRECTION

PATENT NO. : 10,733,789 B2
APPLICATION NO. : 16/012012
DATED : August 4, 2020
INVENTOR(S) : D. Croxford et al.

Page 1 of 1

It is certified that error appears in the above-identified patent and that said Letters Patent is hereby corrected as shown below:

In the Claims

Column 60, Line 12 (Claim 1, Line 11), please change "frame;" to -- frame: --.

Column 62, Line 65 (Claim 19, Line 9), please change "from at least one of:" to -- from: --.

Column 63, Line 21 (Claim 20, Line 13), please change "frame;" to -- frame: --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*